United States Patent [19]
Komori et al.

[11] Patent Number: 5,666,535
[45] Date of Patent: Sep. 9, 1997

[54] MICROPROCESSOR AND DATA FLOW MICROPROCESSOR HAVING VECTOR OPERATION FUNCTION

[75] Inventors: Shinji Komori; Hidehiro Takata; Toshiyuki Tamura; Fumiyasu Asai; Hirono Tsubota, all of Itami, Japan

[73] Assignee: Mitsubishi Denki Kabushiki Kaisha, Tokyo, Japan

[21] Appl. No.: 330,880

[22] Filed: Oct. 28, 1994

Related U.S. Application Data

[62] Division of Ser. No. 819,164, Jan. 2, 1992.

[30] Foreign Application Priority Data

| Jan. 9, 1991 | [JP] | Japan | 3-13959 |
| Feb. 12, 1991 | [JP] | Japan | 3-40981 |
| Apr. 24, 1991 | [JP] | Japan | 3-122338 |

[51] Int. Cl.[6] ........................... G06F 9/00
[52] U.S. Cl. .................................. 395/674
[58] Field of Search ........................... 395/650, 800

[56] References Cited

U.S. PATENT DOCUMENTS

| 4,953,083 | 8/1990 | Takata | 395/250 |
| 5,050,072 | 9/1991 | Ernshaw et al. | 395/288 |
| 5,182,799 | 1/1993 | Tamura et al. | 395/400 |
| 5,218,706 | 6/1993 | Komori et al. | 395/775 |
| 5,280,597 | 1/1994 | Takata et al. | 395/425 |
| 5,404,553 | 4/1995 | Komori et al. | 395/800 |

*Primary Examiner*—Thomas M. Heckler
*Assistant Examiner*—Dennis M. Butler
*Attorney, Agent, or Firm*—Townsend and Townsend and Crew LLP

[57] ABSTRACT

A microprocessor which can execute a test and set instruction for an exclusive control by combination of a few simple instructions, and data flow microprocessor which realizes high operation performance mainly in vector operation by reading out of data to be operated, writing in operation result and executing memory access in short time period and in parallel, and whose running efficiency of program is high in multi-processor construction.

3 Claims, 82 Drawing Sheets

DATA FLOW GRAPH FOR OPERATION
(I+[n])×J→K (1),(2)…:NUMBER OF PIPLINE STAGE

Fig. 20

| VECT | OUT/IN | PE | PM_Thru | OUT/IN | OPERATION OF OUT UNIT | PE# AT OUT |
|---|---|---|---|---|---|---|
| 0 | 0 | 0 | 1 | 1 | OUT (PM_Thru FLAG IS RESET AT EACH PASSAGE OF OUT UNIT) | HIGHER 8 BITS OF RIGHT DATA |
| 0 | 0 | 1 | 1 | 0 | OUT | HIGHER 8 BITS OF LEFT DATA |
| 0 | 0 | 0 | 0 | 1 | IN | — (DM ADDRESS IS STORED IN RIGHT DATA) |
| 0 | 0 | 0 | 0 | 0 | IN | HIGHER 8 BITS OF LEFT DATA |
| 0 | 0 | 1 | 1 | 1 | OUT | HIGHER 8 BITS OF LEFT DATA |
| 0 | 0 | 1 | 0 | 0 | OUT | PE# FIELD |
| 0 | 0 | 1 | 0 | 1 | OUT | — (DM ADDRESS IS STORED IN RIGHT DATA) |
| 0 | 1 | 0 | * | * | OUT | PE# FIELD |
| 1 | 1 | * | * | * | OUT | PE# FIELD |
| 1 | 0 | * | * | * | IN | — |

Fig. 25

| 55 | 54 53 | 52       21 | 20  12 | 11            0 |
|----|-------|-------------|--------|-----------------|
|PB(1)|FLG(2)|LEFT OPERAND(32)|C/G(9)|UPPER OF NODE(12)|

PB:PRESENCE BIT
(IDENTIFYING FLAG OF
DATA EXISTENCE)

Fig. 32

| HIT | PB | EQ | PROCESSING CONTENT AT 6th STAGE |
|---|---|---|---|
| 1 | x | x | GENERATING ASSOSIATIVE MEMORY READ RESULT AND OPERAND PAIR |
| 0 | 0 | x | WRITE IN HASH MEMORY |
| 0 | 1 | 0 | WRITE IN ASSOCIATIVE MEMORY |
| 0 | 1 | 1 | GENERATING HASH EMMORY READ RESULT AND OPERAND PAIR |

HIT: COMPARING RESULT IN ASSOCIATIVE RESULT
PB: SIGNIFICANT DATA IDENTIFYING BIT IN HASH MEMORY
EQ: GENERATING HASH MEMORY READ CONTENT AND TAG INFORMATION RESULT OF INPUT PACKET

Fig. 42(a)

| INSTRUCTION | DV | CV | NUMBER OF INPUT | CODE | FUNCTION | | |
|---|---|---|---|---|---|---|---|
| | | | | | DATA MEMORY ADDRESS | WRITE DATA | ACK |
| DATA MEMORY WRITE INHIBITION INSTRUCTION | | | | | | | |
| DMW  (WRITE) | | | 2 | D8 | LEFT DATA | RIGHT DATA | ABSENCE |
| DMWA | | | 2 | D9 | LEFT DATA | RIGHT DATA | PRESENCE |
| DMWB | | | 2 | DA | LEFT DATA+[BA] | RIGHT DATA | ABSENCE |
| DMWBA | | | 2 | DB | LEFT DATA+[BA] | RIGHT DATA | PRESENCE |
| DMWI | | | 1 | D0 | SEL8 | LEFT DATA | ABSENCE |
| DMWIA | | | 1 | D1 | SEL8 | LEFT DATA | PRESENCE |
| DMWIB | | | 1 | D2 | SEL8+[BA] | LEFT DATA | ABSENCE |
| DMWIBA | | | 1 | D3 | SEL8+[BA] | LEFT DATA | PRESENCE |

Fig. 42(b)

| | | | | DATA MEMORY ADDRESS |
|---|---|---|---|---|
| DATA READ INSTRUCTION | | | | |
| DMR | | | C9 | LEFT DATA |
| DMRB | | | CB | LEFT DATA+[BA] |
| DMRI | | | C1 | SEL8 |
| DMRIB | | | C3 | SEL8+[BA] |
| TSTLOC | U | 1 | CD | CONDITION OF THIS INSTRUCTION IS THAT LOCK FLAG (lock) OF DATA MEMORY WHOSE ADDRESS=1 OR BIT 0(tstdat) OF CONTENT OF DATA MEMORY WHOSE ADDRESS IS INDICATED BY LEFT DATA. WHEN FAILING, OVERFLOW FLAG AND CARRY FLAG ARE SET AS FOLLOWS. ① ovf:SET, cyf:SET → lock=1 AND tstdat=0 ② ovf:RESET, cyf:SET → lock=0 AND tstdat=1 WHEN lock=0 AND tstdat=0, LOCK FLAG OF DATA MEMORY IS SET AND OVERFLOW FLAG AND CARRY FLAG OF PACKET ARE RESET. |
| SETULC | U | 1 | DD | LSB OF CONTENT OF DATA MEMORY WHOSE ADDRESS IS INDICATED BY LEFT DATA OF PACKET IS UPDATED TO "1", AND LOCK FLAG OF DATA MEMORY IS RESET. THIS SET AND LOCK (S&UNLC) INSTRUCTION IS COMBINED WITH TEST AND LOCK (T&LOCK) INSTRUCTION AND CONTINUOUSLY USED IN ADDITION, BIT VALUE OF OTHER THAN LSB IS NOT ASURRED. |
| READ | | | | TEST AND SET |

*"SEL8" INDICATE HIGHER BIT OF SELECTION CODE, "BA" INDICATE CONTENT OF BASE ADDRESS REGISTER IN NORMAL ADDRESS GENERATOR OF DATA MEMORY.
*WHEN DMWI, DMWIA, DMWIB, OR DMWIBA INSTRUCTION IS ISSUED, IM FLAG MUST BE SET.

Fig. 43(a)

| INSTRUCTION | | DV | CV | NUMBER OF INPUT | CODE | FUNCTION |
|---|---|---|---|---|---|---|
| INSTRUCTION RELATING TO VECTOR OPERATION | SETAG | | | 2 | E1 | SET MODE OF ADDRESS GENERATOR. STORE SET CONTENT IN LEFT DATA AND SET ITEM No. (CONTROL REGISTER No.) IN RIGHT DATA. |
| | TRGRB | | | 1 | F6 | CHANGE STATE OF READ CONTROL CIRCUIT FROM WAIT TO ACTIVE. START CONTINUOUS GENERATION OF OPERAND PAIR FOR VECTOR OPERATION. AFTER COMPLETION OF SPECIFIED NUMBER, ACKNOWLDGE PACKET IS OUTPUTTED. |
| | TRGRB2 | | | 2 | F4 | AS SAME AS TRGRB. IN ADDITION, STATE OF ITEM SELECTED BY RIGHT INPUT IS STORED AND OUTPUT AS BOOLEAN VALUE. |
| | TRGDMA | | | 1 | FA | CHANGE STATE OF INTERNAL AND EXTERNAL DMA CONTROL FROM WAIT TO ACTIVE. |
| | TRGW | | | 1 | FE | CHANGE STATE OF READ CONTROL CIRCUIT FROM WAIT TO ACTIVE. START VECTOR OPERATION. AT COMPLETION OF READ OPERAND PAIR, ACKNOWLDGE PACKET IS OUTPUTTED. |
| | RGW2 | | | 2 | FC | AS SAME AS TRIGW. IN ADDITION, STATE OF ITEM SELECTED BY RIGHT INPUT IS STORED AND OUTPUT AS BOOLEAN VALUE. |

Fig. 43(b)

| INSTRUCTION RELATING TO VECTOR OPERATION | CHKAG | | | | 1 | | F3 | INDICATE EACH ADDRESS GENERATOR BY PREDETERMINED FORMAT. |
|---|---|---|---|---|---|---|---|---|
| | CHKAG2 | | | | 2 | | FC | AS SAME AS CHKAG. IN ADDITION, STATE OF ITEM SELECTED BY RIGHT INPUT IS STORED AND OUTPUT AS BOOLEAN VALUE. |

\*IN DATA OF ACKNOWLEDGE PACKET OF TRGRB AND TRIGW INSTRUCTIONS, SAME INFORMATION AS STATUS OF EACH ADDRESS GENERATOR OBTAINED BY CHKAG INSTRUCTION IS STORED. INFORMATION OBTAINED BY CHKAG INSTRUCTION IS AS FOLLOWS.

| 31 | 6 | 5 | 4 | 3 | 2 | 1 | 0 |
|---|---|---|---|---|---|---|---|
| DON'T CARE | RAG&WAG | WAG&DMA | RAG&DMA | WAG | RAG | ALL | DMA |

Fig. 46(a)

| ADDRESS GENERATOR | REGISTER | NUMBER OF BIT | FUNCTION |
|---|---|---|---|
| RAG | rbase_l | 10 | BASE ADD. FOR LEFT DATA |
| | rbase_r | 10 | BASE ADD. FOR RIGHT DATA |
| | rstep_l | 9 | INCREMENT OF ADD. FOR RIGHT DATA |
| | rstep_r | 9 | INCREMENT OF ADD. FOR LEFT DATA |
| | rrepeat | 10 | NUMBER OF REPETITION OF READ |
| | rlinknum_l | 3 | NUMBER OF MEMORY BANK BY 128 WORD ALLOCATED TO LEFT DATA |
| | rlinknum_r | 3 | NUMBER OF MEMORY BANK BY 128 WORD ALLOCATED TO RIGHT DATA |
| | rlinkfl_l | 1 | BANK MEMORY ACCESS MODE FLAG. rlinknum_l=1 IS SIGNIFICANT. |
| | rlinkfl_r | 1 | BANK MEMORY ACCESS MODE FLAG. rlinknum_r=1 IS SIGNIFICANT. |
| WAG | wbase | 10 | BASE ADD. |
| | wrepeat | 10 | NUMBER OF REPETITION OF WRITE |
| | wstep | 9 | INCREMENT OF ADD. |
| | wlinknum | 3 | NUMBER OF MEMORY BANK TO BE ALLOCATED |
| | wlinkfl | 1 | BANK MEMORY ACCESS MODE FLAG. wlinknum=1 IS SIGNIFICANT. |
| DMAAG | dbase | 10 | BASE ADD. |
| | drepeat | 10 | NUMBER OF REPETITION OF DMA |
| | dstep | 9 | INCREMENT OF ADD. |
| | dlinknum | 3 | NUMBER OF MEMORY BANK TO BE ALLOCATED |
| | dlinkfl | 1 | BANK MEMORY ACCESS MODE FLAG. dlinknum=1 IS SIGNIFICANT. |

Fig. 46(b)

| | | | |
|---|---|---|---|
| VECTOR MODE (PARAMETER SET IN ACKNOWLEDGE PACKET OUTPUTTED AT COMPLETION OF CONTINUOUS READ OF RAG.) | vopc | 8 | CONTENT SET IN OPERATION CODE FIELD OF VECTOR PACKET OUTPUTTED FROM RAG. |
| | vpeno | 8 | CONTENT SET IN PE No. FIELD OF VECTOR PACKET OUTPUTTED FROM RAG. (THIS FIELD CAN BE SET, SO VECTOR OPERATION RESULT CAN BE STORED IN MEMORY BANK OF DIFFERENT PE.) |
| | v_out | 1 | CONTENT SET IN OUT/IN BIT OF SELECTION CODE OF VECTOR PACKET OUTPUTTED FROM RAG. (WHEN THIS BIT=1, VECTOR OPERATION RESULT IS STORED IN MEMORY BANK OF DIFFERENT PE.) |

Fig. 48(a) ★ REGISTER ADDRESS (RIGHT DATA)···12h
★ BIT PATTERN (LEFT DATA)
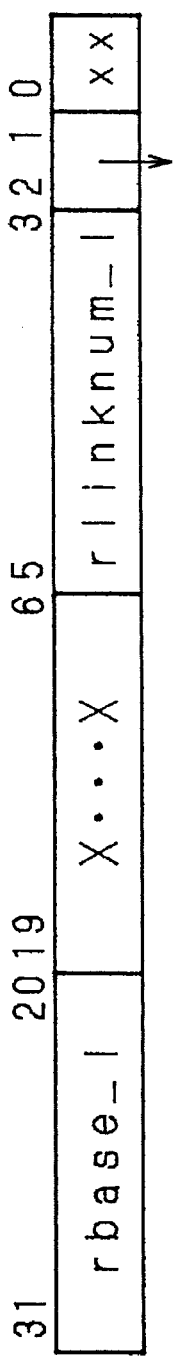
Fig. 48(b) ★ REGISTER ADDRESS (RIGHT DATA)···11h
★ BIT PATTERN (LEFT DATA)
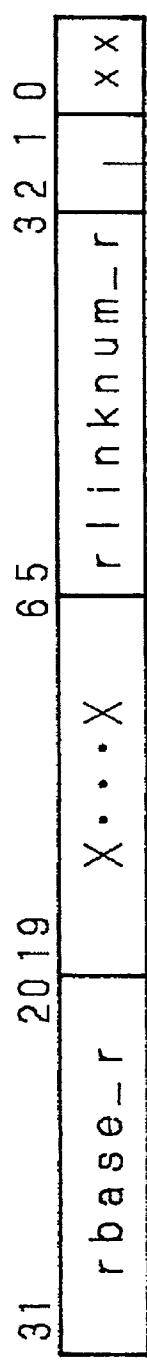
Fig. 48(c) ★ REGISTER ADDRESS (RIGHT DATA)···10h
★ BIT PATTERN (LEFT DATA)
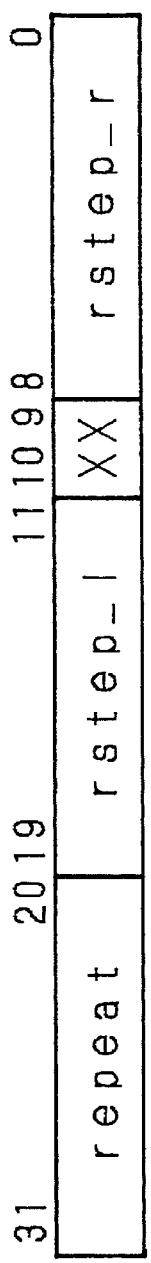

Fig. 50(a) ★ REGISTER ADDRESS (RIGHT DATA)...21h
★★ BIT PATTERN (LEFT DATA)
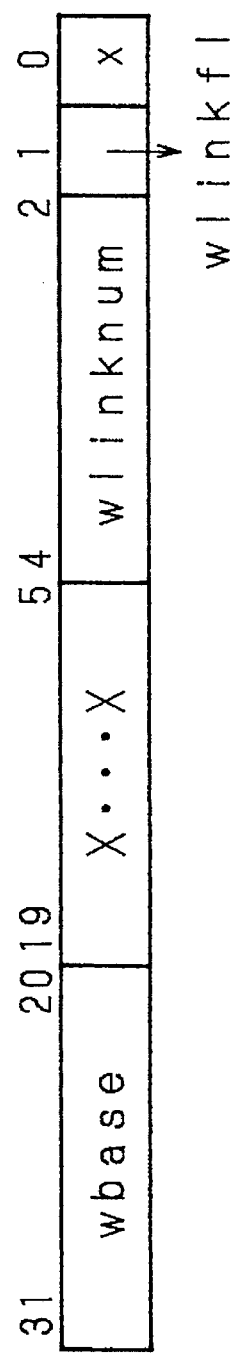
Fig. 50(b) ★ REGISTER ADDRESS (RIGHT DATA)...20h
★★ BIT PATTERN (LEFT DATA)
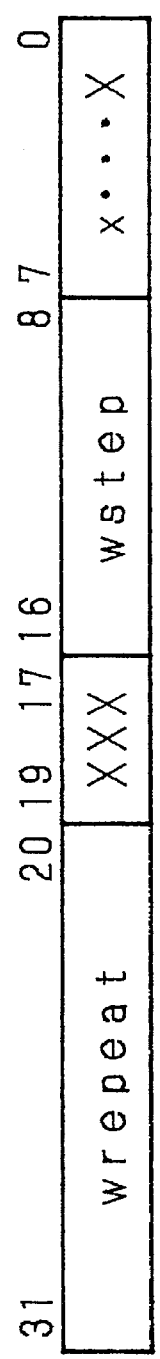

Fig. 52

BIT LIST AT INPUT SIDE OF PM BLOCK 127 bit
| 126 | ABSORB |
| 125<br>124 | SPAIR FLAG(2) |
| 123<br><br>112 | SELECTION<br>CODE<br>(12) |
| 111<br><br>104 | OPERATION<br>CODE<br>(8) |
| 103<br><br>83 | NODE No.<br>(21) |
| 82<br><br>74 | COLOR<br>(9) |
| 73<br>72 | FLAG(2) |
| 71<br><br>40 | LEFT DATA<br>(DATAL)<br>(32) |
| 39<br><br>8 | RIGHT DATA<br>(DATAR)<br>(32) |
| 7<br>0 | VPE No./PE No.<br>(8) |

BIT LIST AT OUTPUT SIDE OF PM BLOCK

Fig. 54

| AAN (1) | cpy1 (1) | cpy0 (1) | sel (9) | opc (8) | node# (RELATIVE) (12) |
|---|---|---|---|---|---|
| 0 | 0 | 1 | | | |
| 0 | 0 | 0 | COPY | PACKET | |
| 0 | 1 | 0 | | | |
| 0 | 0 | 0 | | PE No.(8) | EXTENSION ADDRESS |
| 0 | 1 | 1 | S1 | | |
| 0 | MSB OF CONSTANT | | | CONSTANT(31) | |
| | | | | | |
| | | | | | |
| | | | | | |
| | | | | | |
| | | | | | |
| | | | | | |

```
COPY1  COPY 0     0    NOT USED 0     1    COPY-COPY PACKET IS STORED
                  NEXT ADDRESS 1     0    EXTENSION ADDRESS-EXTENSION ADDRESS
                  AND PE No. ARE STORED
                  IN NEXT ADDRES 1     1    CONSTANT-CONSTANT DATA IS STORED
                  IN NEXT ADDRESS
```

Fig. 55

| OUT/IN | PAIR | L/R | D_COPY | PE | PM_Thru | DISP/ABS | LSB | IM |
|---|---|---|---|---|---|---|---|---|
| 28 | 27 | 26 | 25 | 24 | 23 | 22 | 21 | 20 |

CONSTRUCTION OF 1 WORD OF CONVENTIONAL PROGRAM MEMORY

CONSTRUCTION OF 1 WORD OF PRESENT INVENTION OF PROGRAM MEMORY

Fig. 57

| OUT/IN | PAIR | L/R̄ | D_COPY | PE | PM_Thru | DISP/ABS̄ | LSB | IM |
|---|---|---|---|---|---|---|---|---|
| 0 | 0 | 1 | 0 | 0 | 0 | 1 | 0 | 1 |

Fig. 62

(1) SELECTION CODE

*S8: IN/OUT
*S7: PAIR(1 INPUT/2 INPUT)
*S6: L/R
*S5: DCOPY
*S4: PE(CONSIDER HIGHER 8 BIT OF LEFT DATA AS PE*)
*S3: PM_Thru
S2: DISP/ARS(RELATIVE/ABSOLUTE DESTINATIOPN NODE N)
S1: LSB(AT S0 IS ON, INDICATE LSB OF DATA MEMORY ADD. AND SIGNIFICANT)
S0: IM(AT IM FLAG IS ON, DATA MEMORY ADD. IN WHICH 2nd OPERAND IS STORED IS INDICATED BY HIGHER 8 BIT OF SELECTION CODE.)

(2) SPECIAL FLAG

C2: MEM_ACCESS VIOL(PM,ALU,MM THROUGH)→GENERATING IN DM. RESETTING IN NEXT DM.
*C1: VECTOR INSTR.(PM,MM THROUGH)→GENERATING IN DM. ABSORBING PACKET AT EXITE OF PM OR IN NEXT DM.
C0: HASH CONFLICT(DM,PM,ALU THROUGH)→GENERATING IN MM. RESETTING AT ENTER OF NEXT MM.

FLAG WITH * INCLUDED IN INTER PE PACKET.
FLAG WITH ** IS SIGNIFICANT FROM DM TO IF.
SELECTION CODE MAPPED IN PM MEMORY IS 9b INDICATED BY (1).
MAX. CONSTRUCTION OF SEL_CODE(MAX. 12) IN Fig.61 IS 12 BIT OF (1) AND (2).

Fig. 64

| | SEL-CODE | OPC | MODE# | C/G | FLG | DATA(L) | DATA(R) | PE# |
|---|---|---|---|---|---|---|---|---|
| P1 | | NOOP | 000000(H) | | | A | DON'T CARE | |

| | SEL-CODE | OPC | MODE# | C/G | FLG | DATA(L) | DATA(R) | PE# |
|---|---|---|---|---|---|---|---|---|
| P2 | | INC | 000002(H) | | | A | DON'T CARE | |

| | SEL-CODE | OPC | MODE# | C/G | FLG | DATA(L) | DATA(R) | PE# |
|---|---|---|---|---|---|---|---|---|
| P4 | | MUL | 1FFFFF(H) | | | A+1 | DON'T CARE | |

| | SEL-CODE | OPC | MODE# | C/G | FLG | DATA(L) | DATA(R) | PE# |
|---|---|---|---|---|---|---|---|---|
| P3 | | MUL | 000004(H) | | | A | DON'T CARE | |

| | SEL-CODE | OPC | MODE# | C/G | FLG | DATA(L) | DATA(R) | PE# |
|---|---|---|---|---|---|---|---|---|
| P5 | ↑ | + | 000007(H) | | | A×B | CONSTANT | |

S7=PAIR=1(ONE INPUT INSTRUCTION)
S6=L/R̄=1
OTHERS=0

| | SEL-CODE | OPC | MODE# | C/G | FLG | DATA(L) | DATA(R) | PE# |
|---|---|---|---|---|---|---|---|---|
| P6 | ↑ | MUL | 000004(H) | | | B | DON'T CARE | |

S6=L/R̄=0(RIGHT OPERAND)

| | SEL-CODE | OPC | MODE# | C/G | FLG | DATA(L) | DATA(R) | PE# |
|---|---|---|---|---|---|---|---|---|
| P7 | | MUL | 000004 | | | A | B | |

Fig. 65

ABSOLUTE MODE No.
SHOWN BY Mode# FIELD(215)

| ADD. (HEX) | AAN (1) | cpy1 (1) | cpy0 (1) | sel (9) | opc (8) | node# (RELATIVE) (12) |
|---|---|---|---|---|---|---|
| 0~0 | 0 | 0 | 1 | xxx$S_1^5$xxx | INC | 002(H) |
| 0~01 | 0 | 0 | 0 | xxx$S_1^5$xxx | MUL | 004(H) |
| 0~02 | 0 | 1 | 0 |  | MUL | 7FD(H) |
| 0~03 | 0 | 0 | 0 |  | PE No.(8) | 3FF EXT.ADD.(115) |
| 0~04 | 0 | 1 | 1 | S1 | + | 002(H) |
| 0~05 | 0 | MSB OF CONSTANT | | | CONSTANT(31) | |
| 0~06 | | | | | | |
| 0~07 | | | | | | |
| 0~08 | | | | | | |
| 0~09 | | | | | | |
| 0~0A | | | | | | |
| 0~0B | | | | | | |

←——————MEMORY IMAGE——————→

COPY1 COPY0
- 0  0  NOT USED
- 0  1  COPY—COPY PACKET IS STORED IN NEXT ADD.
- 1  0  EXTENSION ADDRESS—EXT.ADD. AND PE NO. ARE STORED IN NEXT ADDRESS
- 1  1  CONSTANT—COSTANT DATA IS STORED IN NEXT ADD.

COPY PACKET

| | AAN | CPY1 | CPY0 | SSSSSSSSS 876543210 | OPERATION CODE | RELATIVE ADD. OF DESTINATION NODE No. |
|---|---|---|---|---|---|---|
| | ⋮ | ⋮ | ⋮ | ⋮ | ⋮ | ⋮ |
| #1 | 0 | 0 | 0 | //ADD// 1 | AND | 1 |
| #2 | 0 | 0 | 0 | 1 0 1 1 0 0 1 * 0 | OR | 1 |
| #3 | 0 | 1 | 1 | 1 1 1 0 0 1 1 * 0 | MUL | 2 |
| [DM IMMEDIATE ADD.] | 0 | * | * | ///////// | //ADD// | //////// |
| #5 | 0 | 0 | 0 | 1 1 1 0 0 0 1 * 1 | INC | |
| | ⋮ | ⋮ | ⋮ | ⋮ | ⋮ | ⋮ |

※ (# INDICATE ADDRESS CONTENT OF DM)

Fig. 71(a)

■ SETUP 1st VECTOR BANK

◎ RELATION SET OF MEMORY BANK AND ADDRESS GENERATOR
 ★ REGISTER ADDRESS (RIGHT DATA)···50h
 ★ BIT PATTERN (LEFT DATA)

| LEFT DATA | 29  25 24 | 20 19 | 15 14 | 10 9 | 5 4 | 0 |
|---|---|---|---|---|---|---|
|  | 00000 | 00000 | 00001 | 00010 | 01000 | 10000 |
| BANK# | 7 | 6 | 5 | 4 | 3 | 2 |
| AG | NONE | NONE | DWAAG | WAG | RAG_R | RAG_L |

◎ SET OF BANK No.
 ★ REGISTER ADDRESS (RIGHT DATA)···51h
 ★ BIT PATTERN (LEFT DATA)

| LEFT DATA | 29  25 24 | 20 19 | 15 14 | 10 9 | 5 4 | 0 |
|---|---|---|---|---|---|---|
|  | xxxx | xxxx | x001x | x001x | x001x | x001x |
| BANK# | 7 | 6 | 5 | 4 | 3 | 2 |

Fig. 71(b)

◎ SET OF RAG REGISTER(RAG_L) ①

★ REGISTER ADDRESS (RIGHT DATA)···12h
★ BIT PATTERN (LEFT DATA)

| 31 | 20 19 | 6 5 | 3 2 1 | 0 |
|---|---|---|---|---|
| 0h | X····X | 1h | 0 | xx |
| BASE ADD. | LEFT DATA | NUMBER OF LINK BANK | FLAG | |

◎ SET OF RAG REGISTER(RAG_R) ②

★ REGISTER ADDRESS (RIGHT DATA)···11h
★ BIT PATTERN (LEFT DATA)

| 31 | 20 19 | 6 5 | 3 2 1 | 0 |
|---|---|---|---|---|
| 0h | X····X | 1h | 0 | xx |
| BASE ADD. | LEFT DATA | NUMBER OF LINK BANK | FLAG | |

Fig. 72(a)

◎ SET OF RAG REGISTER ③

★ REGISTER ADDRESS (RIGHT DATA)···10h
★★ BIT PATTERN (LEFT DATA)

| 31 | 20 19 | 11 10 9 8 | 0 |
|---|---|---|---|
| LEFT DATA 126 | 0 | XX | 0 |

NUMBER OF REPETITION  ADD. STEP(L)···60h  ADD. STEP(R)

★ REGISTER ADDRESS (RIGHT DATA)
★★ BIT PATTERN (LEFT DATA)

| 31 29 28 | 21 20 19 | 16 15 | 8 7 | 0 |
|---|---|---|---|---|
| x···x  XXXX | 0  x···x | ADD | x···x |

PE#  OUT/IN  OPC

Fig. 72(b)

◎ SET OF WAG REGISTER
WAG REGISTER IS SET BY FOLLOWING TWO SET OF DATA

★ REGISTER ADDRESS (RIGHT DATA)···21h
★★ BIT PATTERN (LEFT DATA)

| 31 | 20 19 | 5 4 | 2 1 | 0 |
|---|---|---|---|---|
| | 0h | X···X | 1 | 0 0 |
| BASE ADD. | | | NUMBER OF LINK BANK | FLAG |

★ REGISTER ADDRESS (RIGHT DATA)···20h
★★ BIT PATTERN (LEFT DATA)

| 31 | 20 19 | 17 16 | 8 7 | 0 |
|---|---|---|---|---|
| | 126 | XXX | 0 | X···X |
| NUMBER OF REPETITION | | | ADD. STEP | |

Fig. 73(a)

◎ SET OF DMAAG REGISTER
DMAAG REGISTER IS SET BY FOLLOWING TWO SET OF DATA
★ REGISTER ADDRESS (RIGHT DATA)...32h
★★ BIT PATTERN (LEFT DATA)

| 31 | 20 19 | 5 4 | 2 1 | 0 |
|---|---|---|---|---|
| 0h | X...X | 1 | 0 | 0 |
| BASE ADD. | | NUMBER OF LINK BANK | FLAG | |

★ REGISTER ADDRESS (RIGHT DATA)...30h
★★ BIT PATTERN (LEFT DATA)

| 31 | 20 19 17 16 | 8 7 | 0 |
|---|---|---|---|
| 126 | XXX | 0 | x...X |
| NUMBER OF REPETITION | | ADD. STEP | |

Fig. 73(b)

■ SETUP 2nd VECTOR OPERATION

◎ RELATION SET OF MEMORY BANK AND ADDRESS GENERATOR

★ REGISTER ADDRESS (RIGHT DATA)···50h
★ BIT PATTERN (LEFT DATA)

| LEFT DATA | 29   25 | 24   20 | 19   15 | 14   10 | 9    5 | 4    0 |
|-----------|---------|---------|---------|---------|--------|--------|
|           | 00000   | 00000   | 00001   | 00010   | 01000  | 10000  |
| BANK#     | 7       | 6       | 5       | 4       | 3      | 2      |
| AG        | NONE    | NONE    | NONE    | RAG_L   | RAG_R  | WAG    |

MICROPROCESSOR AND DATA FLOW MICROPROCESSOR HAVING VECTOR OPERATION FUNCTION

This is a division of application Ser. No. 07/819,164 filed on Jan. 2, 1992.

BACKGROUND OF THE INVENTION

1. Field of the Invention

The present invention relates to a microprocessor capable of realizing exclusive control and a data flow microprocessor having vector operation function making use thereof.

2. Description of the Related Art

Along with the progress of VLSI technology, the price of microprocessors has been lowered and the reliability has been enhanced, and it has come to be popular to process in parallel by coupling multiple microprocessors and processing data at high speed. However, when the processes divided into multiple microprocessors are processed quite independently, a certain inconvenience may occur. In particular, when shared resources represented by memory devices are used in plural processes simultaneously, matching of processing may not be often assured unless the process to be used simultaneously is limited to be one so as to execute exclusively.

To solve such problem, in the conventional microprocessor, for example, the processor resource has been managed by test and set instructions.

For example, on pages 222 and 223 of "User's Manual for Mitsubishi M32 Family MPU M32/100 M33210" published by Mitsubishi Denki Kabushikikaisya, BSETI instruction for realizing exclusive control is described. The function of BSETI instruction is to set bit with interlock, that is, the inverted value of a specified bit is copied in Z flag, and then that bit is set. At this time, these two operations are done by locking the bus.

A similar mention is found from pages 6–185 to 6–187 of "Series 32000 Programmer's Reference Manual" published by Prentice-Hall Inc., Englewood Cliffs, N.J. 07632, in which the content of the memory or register is copied in F flag of processor status register (PSR) by SBITI instruction, and the content is set to "1", and in this period the interlocked operation output pin of the CPU is under active state so as to interlock the access to the semaphore bit.

These prior arts are microprocessors belonging to the so-called complex instruction set computer type, and macro instructions such as BSETI and SBITI are realized by execution of microprogram of plural steps. In order to prevent suspension of processing by interruption from other processor or sacrifice of assurance of integrity of execution of instruction, the bus is locked or the interlock operation signal is made active.

In such methods, however, in the case of a general processor having a pipeline processing structure for processing the flow such as instruction fetch, data fetch, execution and storing of result, the number of running cycles at pipeline stage of instruction execution increases, and the stage following the pipeline stage becomes empty, and moving of data in the preceding stares is stopped, which may result in pipeline stalling or lowering of processing efficiency.

To solve such problems, the processor of so-called RISC (reduced instruction set computer) type has been proposed, in which one instruction is, as a rule, executed within one machine cycle, and commercial microprocessors on the basis of the RISC architecture are already on market.

The instruction set of Am29000 known as a typical RISC microprocessor is disclosed on pages MC1-303-151 to MC1-303-163 of "Nikkei Data Processor, Microprocessor" published by Nikkei BP. In the case of Am29000 which executes an instruction in one clock cycle, instructions requiring complicated steps in execution such as test and set are not supported. According to this published material, by making active the ninth bit of the exclusive register (the existing processor status register) that can be accessed only under the privilege mode called the supervisor mode, the lock pin of the processor is made active, and it is controlled not to open the bus despite of input of bus open request by BREQ signals from other processors. By this function, accordingly, the integrity of processing is guaranteed.

In the case of the conventional CISC processor, as mentioned herein, the problem is that the pipeline processing efficiency is lowered when a complicated instruction such as test and set is executed. To the contrary, in the case of RISC processor for executing one instruction in one clock cycle, the complicated instruction such as test and set cannot be realized in the hardware.

In the case of the Am29000, to realize exclusive control, first the supervisor mode is set, the bus is exclusively occupied by writing into exclusive register and making the lock signal pin active, the memory address representing the resource for exclusive control is read out, the read-out result is judged, in the case where the read-out result is, for example, "0", "1" is written into the same address, and then by writing again in the exclusive register to made the lock signal pin inactive, and the bus is opened to other processors and this procedure must be realized in the software. Thus, complicated procedure must be executed, the program running efficiency is very poor, and the bus is kept occupied in this period, and execution of other processes may be prevented.

An example of data flow computer introducing the vector operation mechanism is disclosed in the preprints for the 38th (first-half 1989) national meeting of Japan Society of Information Processing published in March 1989 under the title of "Outline of high parallel data flow type computer EDDEN."

This published paper points, as one of the problems of the data flow computer, that the performance is lowered in typical calculations of repeating simple processing on array or other typical structure and suggests that this problem can be solved by introducing the vector operation mechanism in the instruction executing unit, and executing the vector operation instruction locally on the array data stored external memory. Furthermore, it is also shown that the usual scalar data and vector operation control mechanism can enhance the filling rate of the operation pipeline by a method of sharing the arithmetic unit by time sharing. The data flow computer unveiled in this publication is composed as shown in FIG. 1. By reference to this diagram, the operation of the prior art is described below.

A one-chip data flow computer shown in FIG. 1 comprises network control unit NC, input control unit IC, queue unit Q, program storage unit PS, output control unit OC, firing control/color management unit FCCM, instruction executing unit EXE, and vector operation control unit VC.

FIG. 2 shows a simple example of a program (data flow graph) for explaining the practical operation of the known data flow computer, showing the processing of delivering the operation result of A+B as C. The data flow graph is composed of plural nodes allocated with node numbers, and arcs for showing the data depending relation among them. In the diagram, the pentagonal nodes are special nodes showing input and output with outside, and are not responsible for operation. On the other hand, the circular node performs the operation shown in the node on the input data.

Packet (data having tag information) A entered from outside through network control Unit NC is provided with #0 as the destination node number by the host computer. The other input packet B has the destination node number #1. These packets are temporarily stored in the queue unit Q via the input control unit IC, and the program memory is read out in the program storage unit PS by the respective destination node numbers as the input addresses, and the next destination node number, that is, #2, and the instruction code "+" corresponding to the node of #2 are read out. Afterwards, these packets reach the firing control/color management unit FCCM through the output control unit OC.

In the firing control/color management unit FCCM, since the destination node numbers of these packets are both as soon as the both packets A and B reach the firing control/color management unit FCCM, firing is processed, and an executing packet having two operands is generated, and is sent to the instruction executing unit EXE.

In the instruction executing unit EXE, the operation of A+B is done according to the instruction code stored in this packet, that is, "+" and a result packet C containing result data C is delivered. The result packet reaches the program storage unit PS via the input control unit IC and queue unit Q.

In the program storage unit PS, the program memory is read out with the destination node number possessed by the packet C as the input address, and the next destination node number #3 and instruction code "OUT" are read out. This packet having the instruction code "OUT" is branched to outside by the output control unit OC, and is sent into the network control unit NC in order to deliver outside the processor.

By the chain procedure of such processing, the operation corresponding to the data flow graph shown in FIG. 2 is performed, and the program execution is terminated. A simplest example is shown in FIG. 2, but the execution may be done exactly in the same manner even in the case of further complicated data flow graph composed of multiple instruction nodes and arcs showing the data depending relation among these instruction nodes.

During program execution, processing of nodes having data depending relation is executed sequentially, but processing of nodes having no data dependent relation can be execute parallel as far as permitted by the processing resource. The data dependent relation means, herein, such connective relation that the input data necessary for other processing is supplied only after completion of processing of one node in the connective relation between two nodes.

So far is described the flow of processing of scalar data, and in addition the method used for vector data processing of the instruction executing unit EXE by scalar data processing and time sharing is also disclosed in the same published paper. The vector operation control unit VC is responsible for execution and control of vector operation related instructions and ordinary memory access instructions. Among the vector operation control unit VC, input control unit IC and output control unit OC, bypass lines for structure (vector) communications are disposed. The external data memory is the data memory for storing the structure, etc.

However, the data flow computer having the conventional vector operation mechanism disclosed in the above publication involves two problems.

The first problem is that the through-put in vector operation execution is low because there is no data memory inside. For example, when adding vector X and vector Y and storing the result as vector Z in the data memory, the process of reading element xi of vector X and element yi of vector Y, and writing the result of operation in the data memory as element zi of vector Z must be repeated as many times as the number of elements in the vector. However, the one-chip data flow computer disclosed in the publication does not have data memory inside, and the inside of the chip possesses only the access control function to the external data memory, and vector operation of one element requires three times of memory access sequentially, and the access of data memory is the bottleneck in processing, and the high performance of the instruction executing unit EXE cannot be fully utilized by the vector operation alone.

The second problem is that the processing of the instruction executing unit EXE in the cyclic pipeline alternative of access of data memory or execution of instruction. Accordingly, when the data stored in the data memory is used in operation, it requires one cycle of cyclic pipeline processing for reading out data from the memory, and another cycle is needed for execution of operation, and the efficiency is poor.

SUMMARY OF THE INVENTION

The invention is devised in the light of such background, and it is hence a first object thereof to provide a microprocessor capable of exclusive control by combination of a small number of simple instructions.

It is a second object of the invention to provide a data flow microprocessor capable of executing a program at high efficiency while achieving a high vector operation performance by simultaneous and parallel performance of reading of non-operation data, writing of operation result, and memory access processing in a short access time in vector operation.

The data flow microprocessor of the invention is provided with a data storage device for delaying execution of a test and set instructions used to realize exclusive control, by introducing storage means that stores a series of instructions into which the test and set instruction is divided are being executed.

In the invention, for example, when the test and lock instruction which is a first instruction constituting the test and set instruction is given, only in the conditions that the data storage device is not in locked state and that the result data of reading out the memory according to the address given simultaneously is "0", the data storage device installed in the microprocessor is set in the lock state (second state), and when "0" is delivered as the condition code and the set and unlock instruction which is a second instruction constituting the test and set instruction is given because its result condition code is "0", "1" is written into the same address, while the lock state of the data memory is cleared at the same time to set in the unlock state (first state).

The data flow microprocessor of the invention comprises an operation unit FALU, a program memory unit PM, an input/output interface unit IF to which the information updated in abovementioned operation unit FALU and program memory unit PM is sent, a matching memory unit MM, and a data memory Unit DM to and from which data are read out and written in simultaneously, parallelly and seriously, and each unit are connected in ring shape with each other, so that data to be operated are seriously read out from the matching memory unit MM to the data memory unit DM, and sent to the operation unit FALU with predetermined instruction code, thereby executing vector operation.

In the invention, thus, disposing the data memory unit DM of multiple ports inside the data flow microprocessor, reading of two sets of data to be operated for vector operation, writing of operation result data, ordinary memory access and other processings can be done in a short access time, and simultaneously and parallel, so that an extremely high vector operation performance may be achieved.

Besides, since the data memory unit DM is incorporated within the cyclic pipeline and disposed before the operation part, reading of data and execution of operation are completed in one cycle of the cyclic pipeline, so that an efficient program execution is enabled.

The above and further objects and features of the invention will more fully be apparent from the following detailed description with accompanying drawings.

BRIEF DESCRIPTION OF THE DRAWINGS

FIG. 20 is a schematic diagram for explaining the operation of the input/output interface unit of the data flow microprocessor/of the invention, FIG. 25 is a schematic diagram showing the information stored in a hash memory of the matching memory part, FIGS. 35a–c are a circuit diagram showing the connection of CAM and data RAM of the matching memory part, FIG. 36 a logic circuit diagram of empty word detection priority decoder of the associative memory, FIG. 42a–b are a schematic diagram showing the access related instructions in the data memory part, FIG. 43a–b are a schematic diagram showing the access related instructions in the data memory part, FIG. 44 schematic diagram showing the format of the bank register in the data memory part, FIGS. 46a–b are schematic diagram showing the mode setting register in the address generator in the data memory part, FIGS. 48a–c are schematic diagram showing the content set in the register of RAG in the explanation of data memory part, FIGS. 50a–b is a schematic diagram showing the content set in the register of WAG in the explanation of data memory part, FIG. 52 is a schematic diagram showing the format of packet inputting the program memory part, FIG. 54 is a schematic diagram showing the configuration of program memory in the program memory part, FIG. 55 a schematic diagram showing the bit alignment of selection code in the explanation of program memory part, FIG. 57 is a schematic diagram showing the set value of selection code outputted from the program memory part, FIG. 62 is a schematic diagram of selection code in the embodiment, FIG. 64 is a schematic diagram showing a packet format in the embodiment, FIG. 65 is a schematic diagram showing the configuration of program/memory in the embodiment, FIGS. 71a–b are a schematic diagram showing the content set by SETAG instruction in the embodiment, FIGS. 72a–b are a schematic diagram showing the content set by SETAG instruction in the embodiment, FIGS. 73a–b are a schematic diagram showing the content set by SETAG instruction in the embodiment.

DESCRIPTION OF THE PREFERRED EMBODIMENTS

Figure 1:
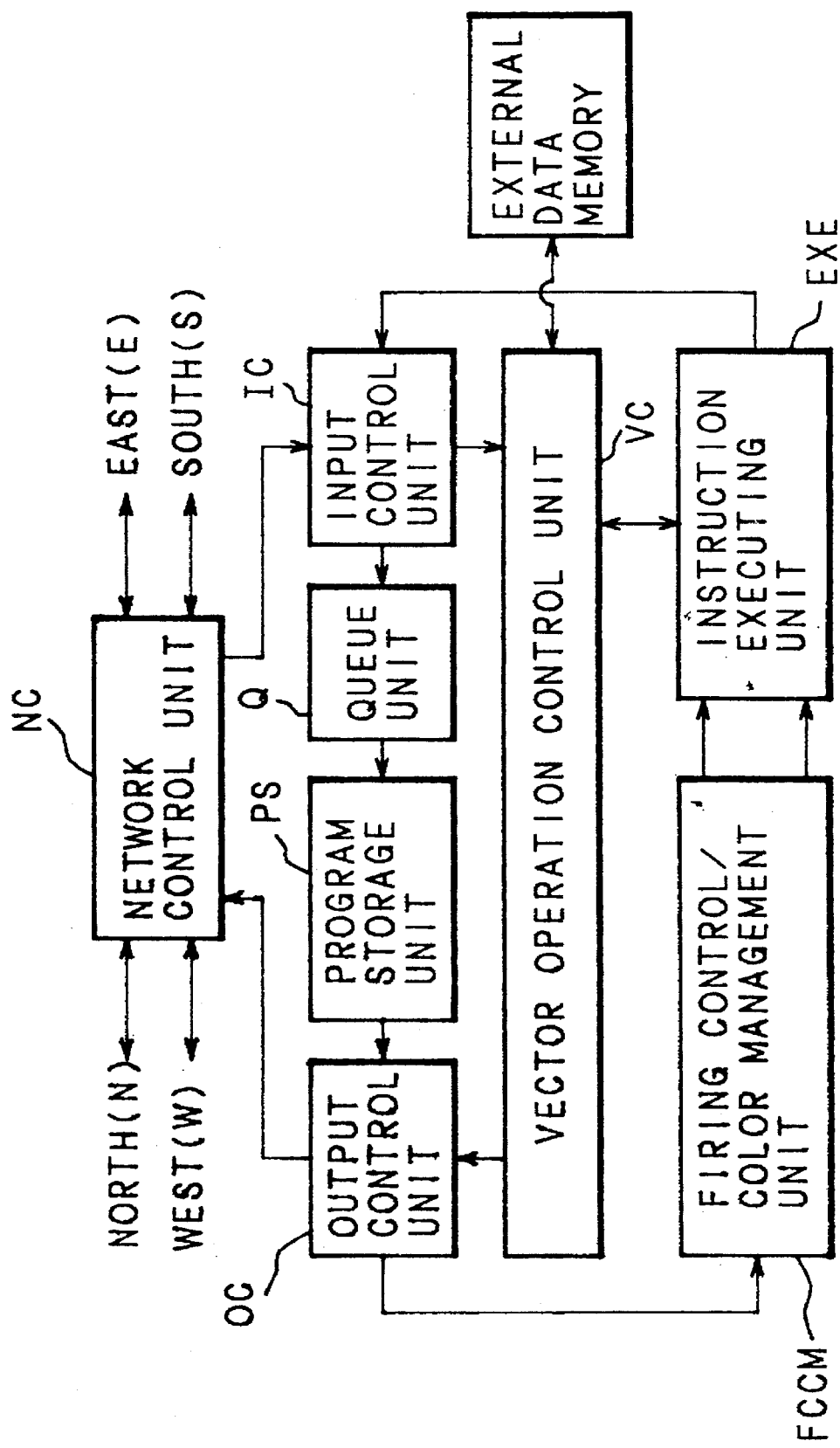
FIG. 1 is a block diagram showing the configuration of a conventional data processor.
Figure 2:
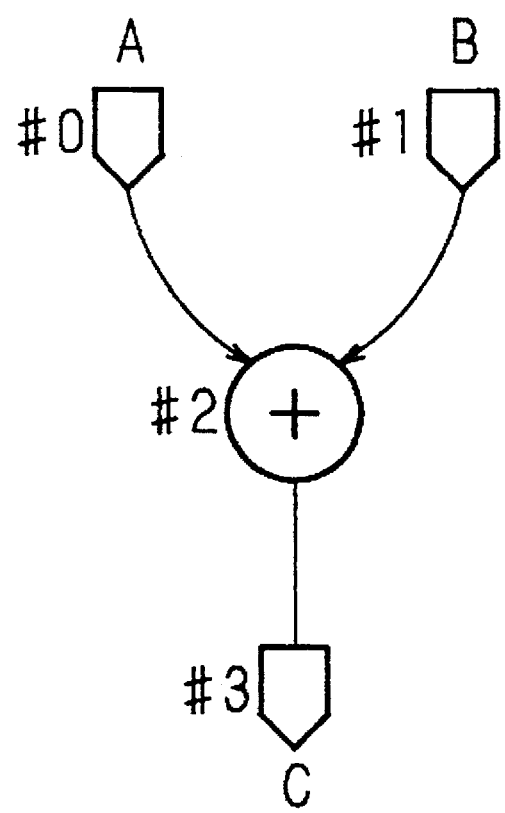
FIG. 2 is a schematic diagram showing its data flow graph.

Referring now to the drawings, some of the preferred embodiments of the invention are described in detail below.

Figure 3:
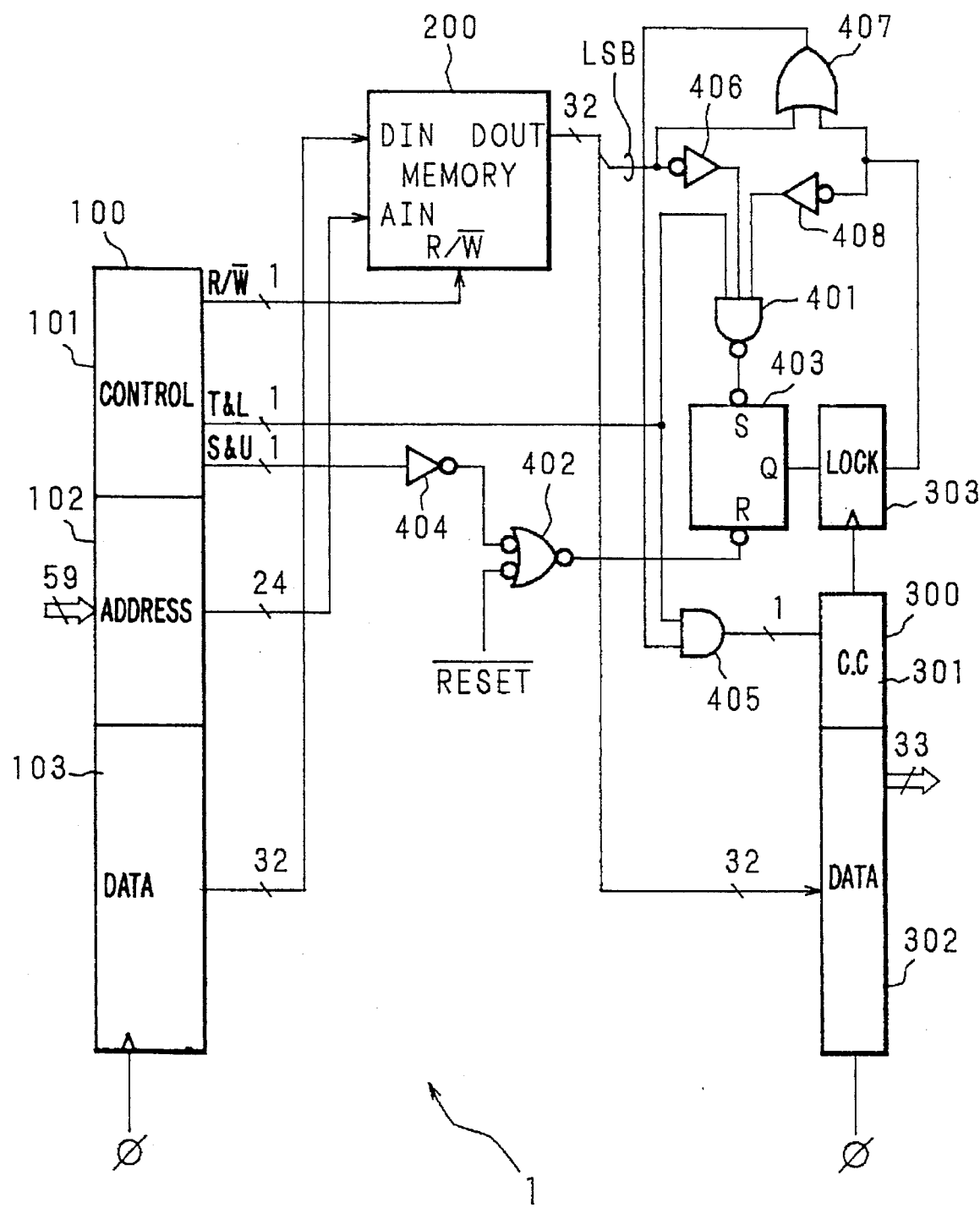
FIG. 3 is a block diagram showing the configuration of a data storage unit of a microprocessor of the invention.

FIG. 3 shows the data storage unit of the microprocessor of the invention, in which numeral 1 denotes a data storage unit, 100 is an input latch, and 101, 102, 103 are its control bit latch unit, address latch unit and input data latch unit. Numeral 200 is a memory unit as first storage means of addressing type, that is, capable of reading and writing data by specifying the address, 300 is an output latch unit, 301, 302 are its condition code latch unit and output data latch unit, and 303 is a lock state latch unit. Numeral 401 is a NAND gate, 402 is an AND gate for initially setting in unlock state (first state) when resetting the hardware, 403 is a set/reset flip-flop as second storage means, 404, 406, 408 are inverters, 405 is an AND Mate, and 407 is a NOR gate.

The operation is explained below. When the information having the control information, address and data reaches the data memory unit 1 according to pipeline control, the result control signals (R/$\overline{\text{W}}$, T&L, S&U) decoded by an instruction decoder not shown herein is latched in the control bit unit 101 of the input latch 100, the memory address indicating the data representing the resource subjected to exclusive control in the address unit 102, and the data to be written in the data unit 103, respectively according to the rise of the timing signal $\phi$.

In the instruction set of the microprocessor, when the test and lock instruction is given, the control bits of the control bit unit 101 become as follows, R/$\overline{\text{W}}$=1, T&L=1, S&U=0. At this time, the least significant bit of the data read out from the memory 200 is inverted by the inverter 406, and is fed as a second input to the NAND gate 401. The other two inputs of the NAND gate 401 are the T&L bit and an inverted output of the output of the lock state latch 303, and when all these inputs become "1", the output of the NAND gate 401 becomes "0" and the SR flip-flop 403 (hereinafter SRFF) is set, and it is stored that the memory is under lock state. That is, the test and lock instruction is given, and when the content of the data indicated by the address attached to this instruction is 0 and the memory is under unlock state, it is controlled to shift to the lock state.

In the case where the test and lock instruction is given, however, when the same address has been already set (called "lock disabled state 1") or when the memory has been already locked by the preceding test and lock instruction (called "lock disabled state 2"), the output of the OR gate 407 becomes 1, and therefore the output of the AND gate 405 becomes 1, and 1 is latched in the condition code unit 301 of the output latch 300, and it is stored that the execution of test and lock instruction was unsuccessful. At this time, the SRFF 403 is neither set not reset, so that the initial state is preserved in the lock state latch unit 303.

As a result of execution of test and lock instruction, when the condition code becomes "0" and the execution is successful, then a set and unlock instruction is issued. The set and unlock instruction takes with the same memory address used in execution of the test and lock instruction which makes a pair therewith, and data "1". The control bits of the control bit unit 101 are R/$\overline{\text{W}}$=0, T&L=0, S&U=1. At this time, the data "1" is latched in the input latch 100 is written into the corresponding address, showing that the resource subjected to exclusive control is being occupied exclusively. Besides, the S&U signal is inverted by the inverter 404, and is given to the SRFF 403 through the AND gate 402, so that the SRFF is reset to clear the lock state.

As apparent from the description herein, the term "lock" in this embodiment means prohibition of execution of a new test and lock instruction during the locked period, and is not meant, as in the conventional microprocessor, to totally prohibit the request to access bus to band the execution of other processors.

After execution of set and unlock instruction, the processing by using the resource allocated exclusively is executed. After execution of exclusive processing, "0" is written in the abovementioned address, and this resource is released to other processes.

Figure 4:
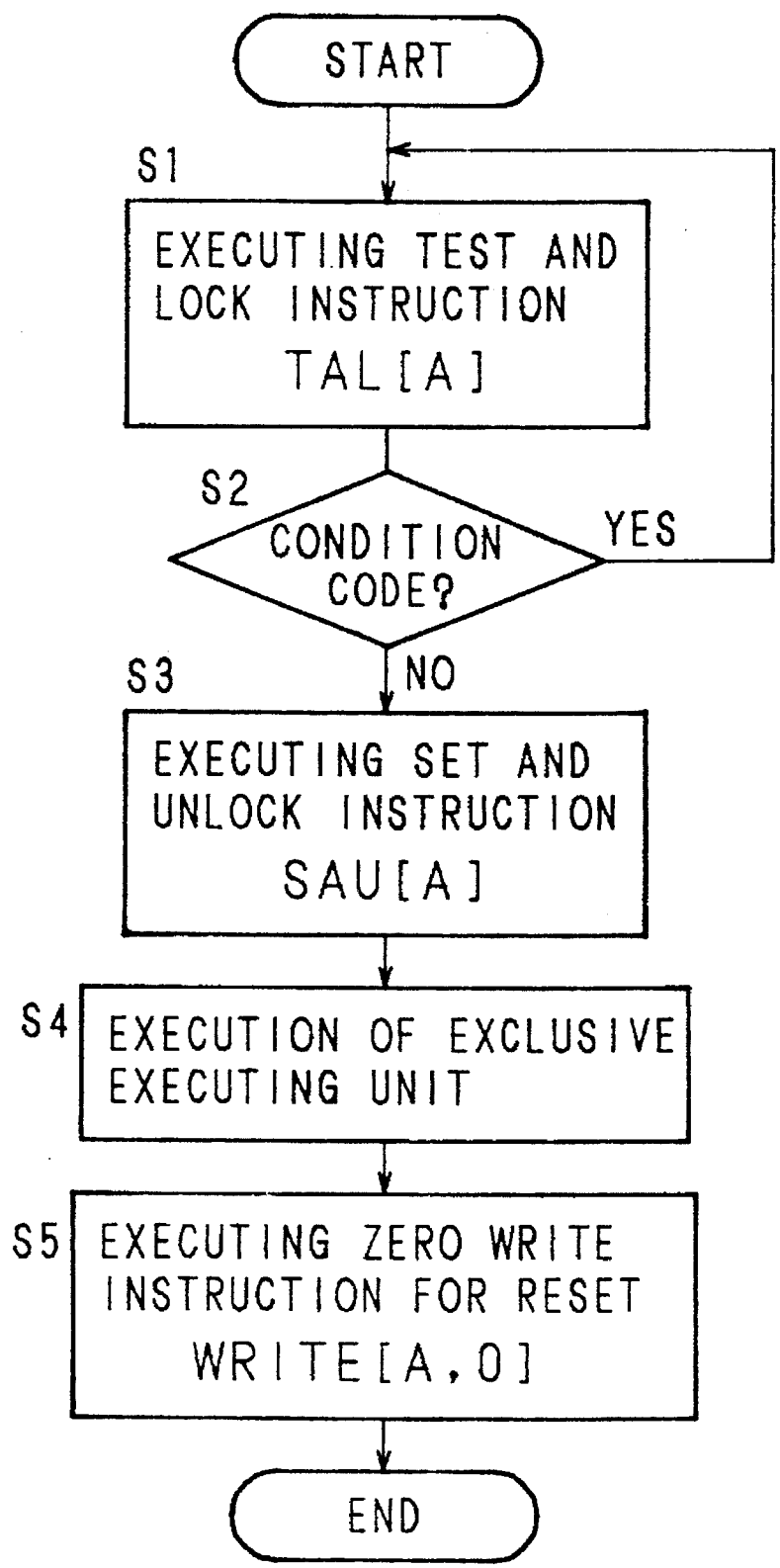
FIG. 4 is a flow chart showing the procedure of its exclusive process execution.

The above procedure for executing exclusive process is shown in the flow chart in FIG. 4.

In FIG. 4, the test and lock instruction is executed at step S1, and it is judged at step S2 whether the condition code CC is "1" or not. The operation returns to step S1 in the case where the result is "1" and advances to step S3 otherwise. At step S3, executing a set and unlock instruction, the exclusive execution process is executed at step S4. At step S5, a zero write instruction is executed for resetting. Meanwhile, the delay operation of the test and set instruction to return to step S1 at step S2 is actually done by the software.

In FIG. 4, meanwhile, [A] indicates that the pertinent address is address A, and [A, 0] means that the address is address A and the data value is "0".

Thus, in this embodiment, by installing the flip-flop for storing whether lock state or not in the data storage unit and delaying the execution of the instruction for newly requesting lock in the lock state, the following effects are obtained.

More specifically, during execution of an instruction taking many clock cycles required in processing and required to assurance integrity of processing (to always deliver correct result without being affected by other processes), such as test and set instruction, the flip-flop indicates that the data storage unit is in lock state, therefore simultaneous execution of instructions requesting the locking are prevented, and the instruction requesting integrity of processing may be executed by dividing into plural simple instructions, so that the pipeline running efficiency may be enhanced.

During execution of divided instruction, the data storage unit is locked, but it is possible to execute simultaneously instructions belonging to other processes, and only the execution of an instruction which may disturb the integrity of execution of instruction divided by using the resource shared by processes is automatically delayed, so that parallel execution of multiple processes including exclusive execution portion may be realized without particular restriction.

Figure 5:
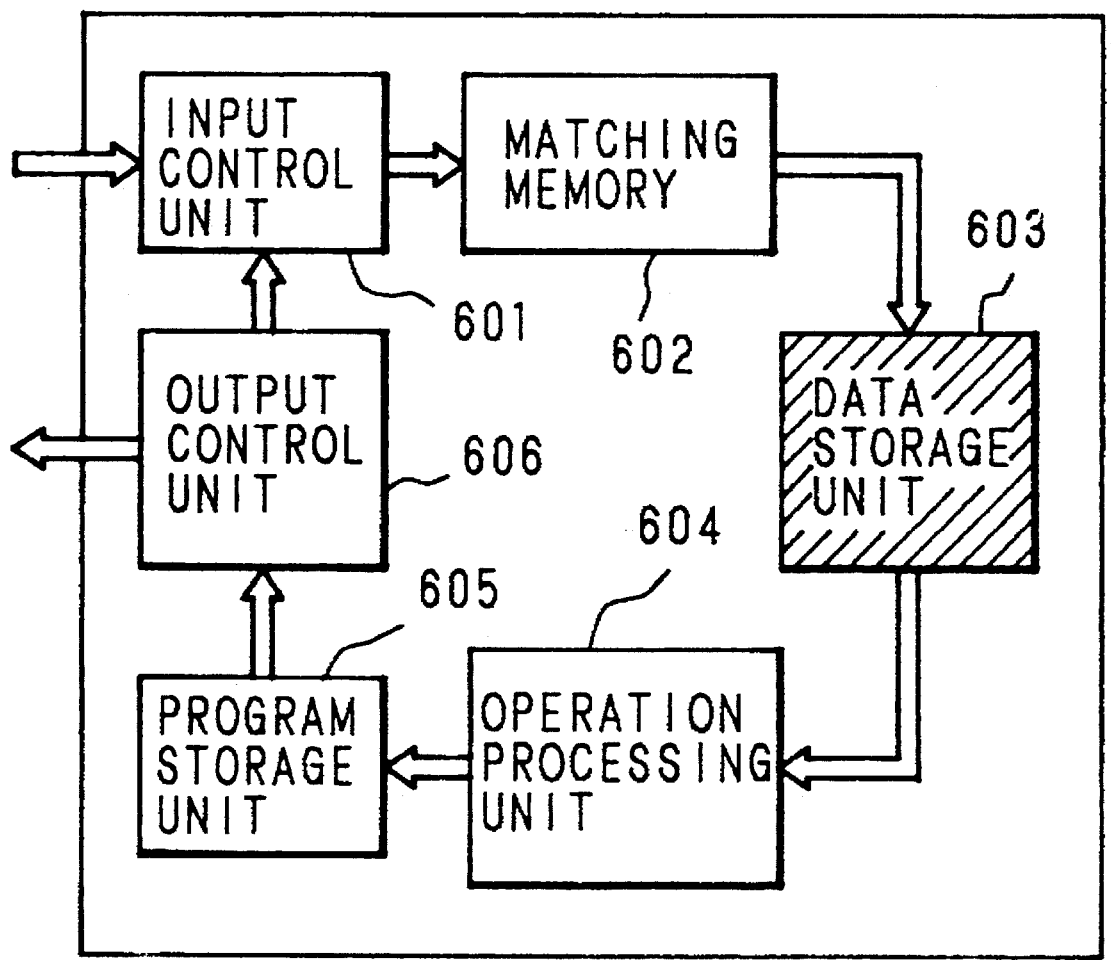
FIG. 5 is a block diagram showing a constitutional example of a data flow microprocessor in which the microprocessor of the invention may be applied.

Therefore, the instruction executing sequence is dynamically determined according to the data dependence as shown in FIG. 5, and the effect is particularly great when applied in the data flow microcomputer realizing parallel execution of multiple processes in parallel at instruction level. In FIG. 5, meanwhile, numeral 601 is an input control unit, 602 is a matching memory unit, 603 is a data storage unit, 604 is an operation unit, 605 is a program storage unit, and 606 is an output control unit.

In the above embodiment, incidentally, judgment of data stored in the address and setting of lock state are done by one-cycle instruction (test and lock), and rewriting of data value of the address and cancellation of lock state (set and lock) are done in one-cycle instruction, and therefore the number of instruction executing cycles is reduced on the whole, and efficient processing is realized even in comparison with the conventional RISC processor.

Besides, in this embodiment, only the decoded signals (R/$\overline{W}$, T&L, S&U) are shown, and instruction decoder is not shown, but the instruction decoder may be built in this memory unit. Or, without instruction decoder, each control signal maybe given directly.

Figure 6:
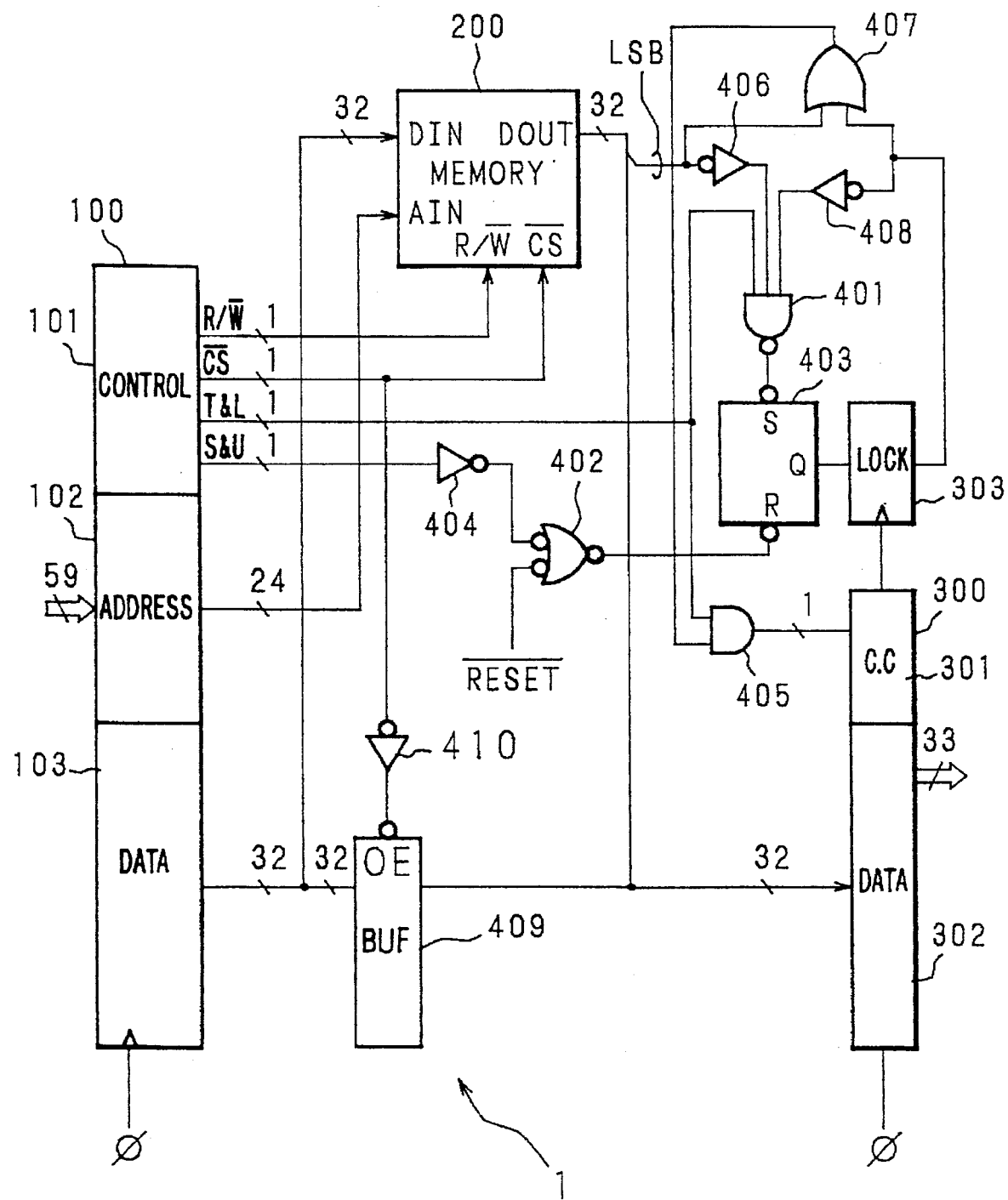
FIG. 6 is a block diagram showing a constitutional example of adding paths for saving and delivering the input data to the configuration of the data storage unit in FIG. 3.

In the foregoing embodiment, data read out from the memory is fed in the data unit 302 of the output latch, but as shown in FIG. 6, it may be also possible to compose to latch selectively either the input data or the memory readout result, and the same effect as in the above embodiment is realized. In FIG. 6, numeral 409 is a data buffer with output tristate control, and 410 is an inverter.

Figure 7:
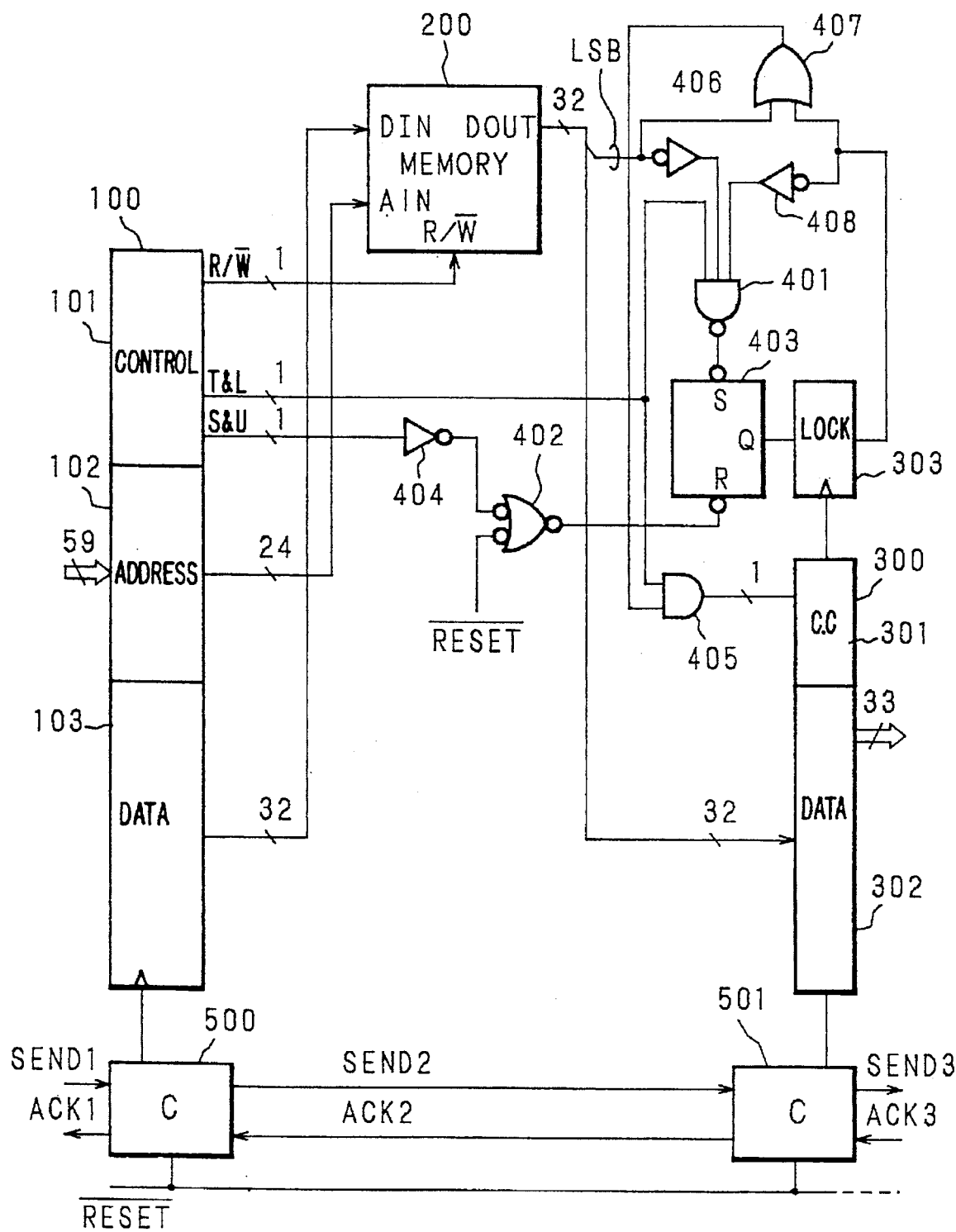
FIG. 7 is a block diagram showing the configuration of using the output of handshake control circuit (C element) as the control signal of input/output latch in the configuration of the data storage unit in FIG. 3.
Figure 8:
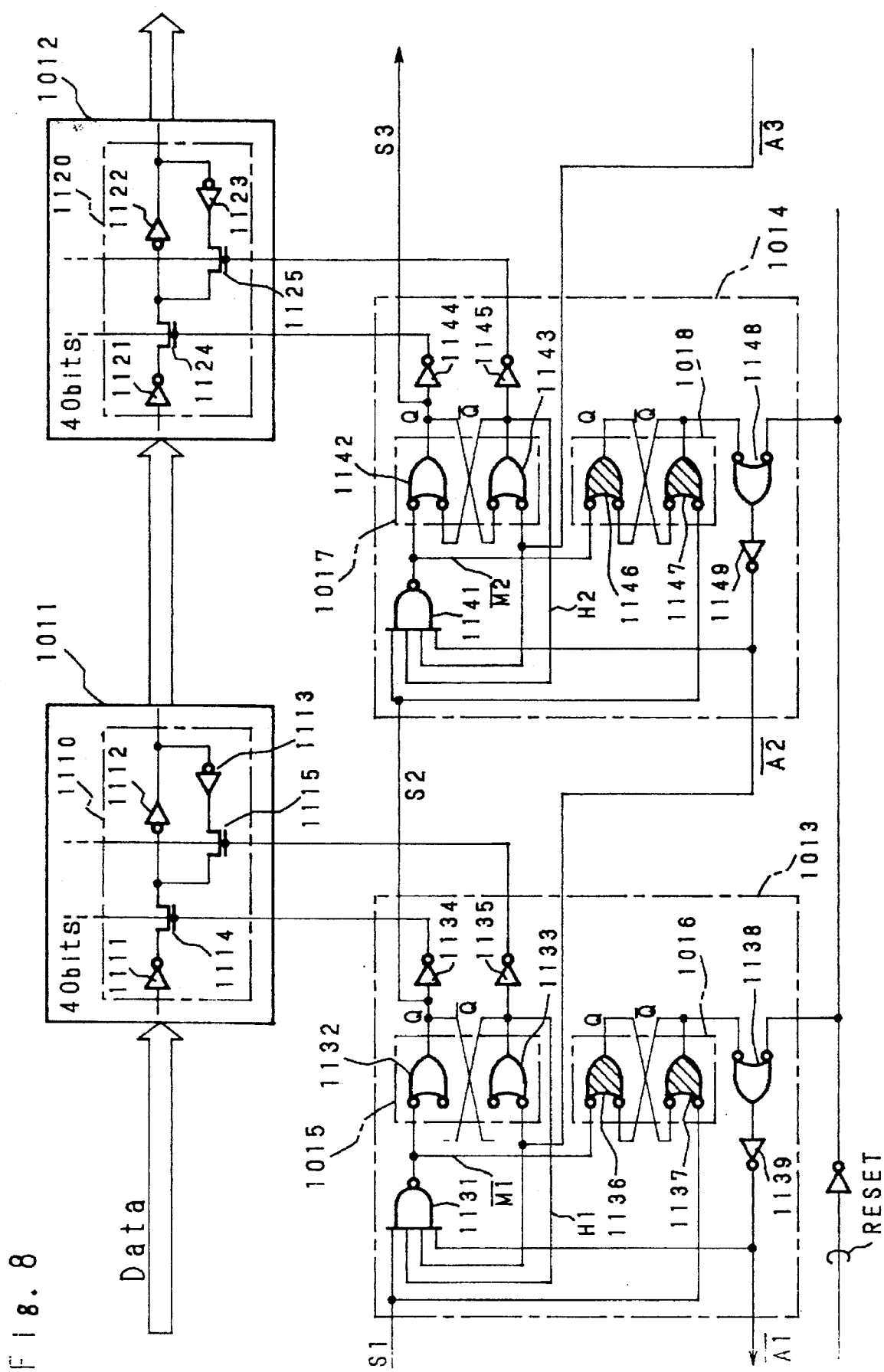
FIG. 8 is a logic circuit diagram showing the data latch control using C element together with a constitutional example of the circuit of the C element, FIG. 9 a block diagram showing the configuration of general data processor using the same C element.

Meanwhile, in the embodiment, latch is controlled by clock signal φ, bug as shown in FIG. 7, a latch signal may be generated by handshake circuits 500, 501 composed of C elements for detecting coincidence or not coincidence of two input signals. Concerning the circuit constitution example and operation of the C elements, the present applicant in Japan disclosed details in Japanese Patent Application Laid-Open 63-204355 (1988), and a circuit configuration example extracted from above application is shown in FIG. 8. In the diagram, numeral 1013 (1014) is a C element, which is composed of R-S flip-flops 1013, 1016 (1017, 1018), four-input NAND gate 1131 (1141), inverter buffers 1134, 1135, 1139 (1144, 1145, 1149), and two-input NAND gate 1138 (1148). Numeral 1011 (1012) is a data latch for 40 bits, and a one-bit latch 1110 (1120) is composed of inverter buffers 1111, 1112, 1113 (1121, 1122, 1123), and transfer gates 1114, 1115 (1124, 1125).

Figure 9:
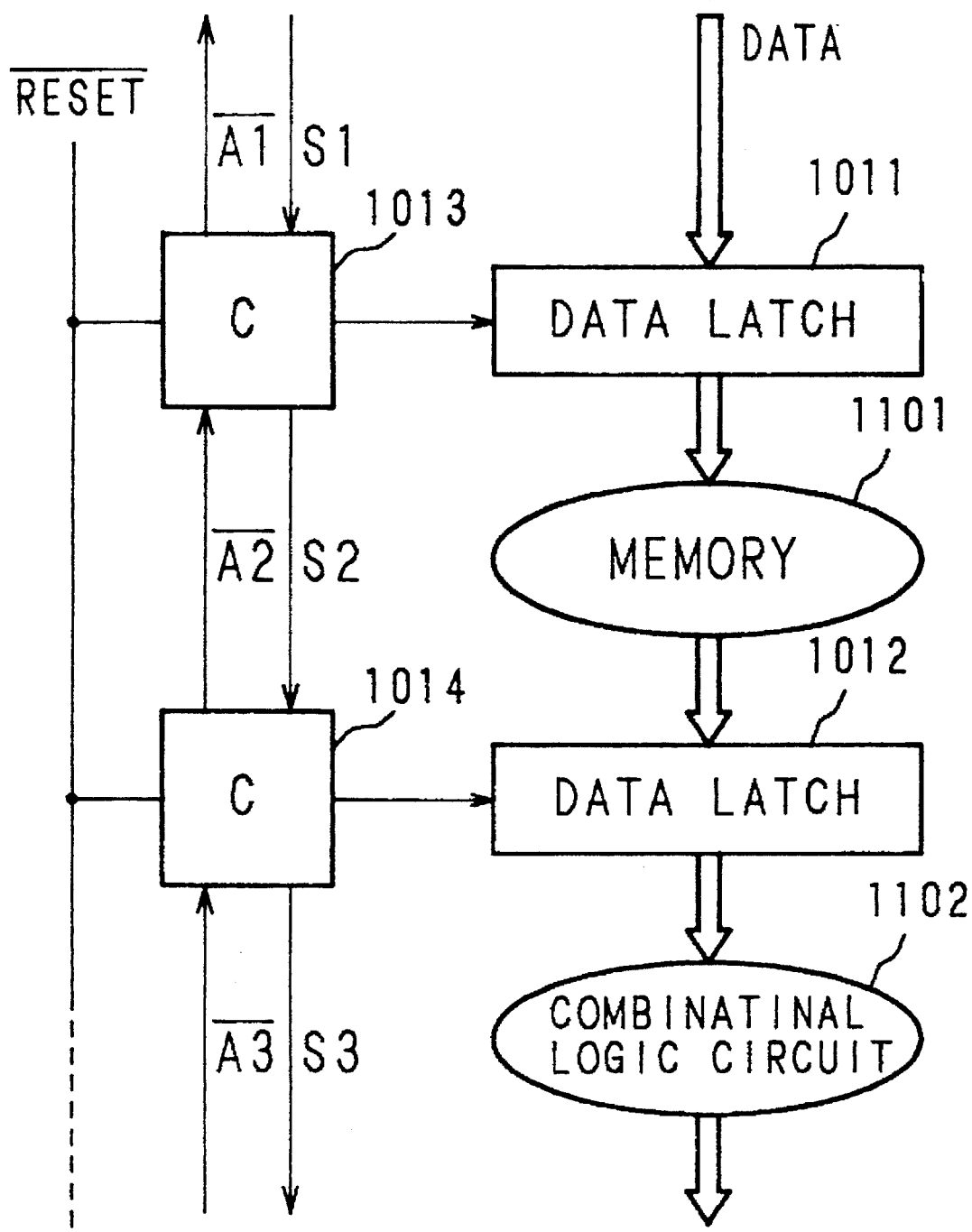

FIG. 9 shows a general configuration of data processor using the C elements shown in FIG. 8, and in the diagram the same reference numbers denote the same components as in FIG. 8. In FIG. 9, 1101 is a memory and 1102 is a combinational logic circuit.

In the embodiment, a one-bit condition code is outputted, but the condition code may be composed of plural bits In the embodiment, a one-bit condition code is outputted, be unsuccessful, whether it is due to the "lock disabled state 1" or "lock disabled state 2", by the condition code.

The embodiment does not specify whether the data storage device is external memory, internal memory or register, but, needless to say, the invention may be applied to any type of storage device.

Although only the test and set instruction for comparing in one bit is describe so far, it can be widely applied also when assuring the integrity of execution of compound instructions such as compare and set instruction for comparing in plural bits.

In the microprocessor of the invention, as described herein, by disposing the flip-flop for storing whether the data storage unit is in lock state or not, in the data storage unit, execution of an instruction newly requesting locking is delayed in the lock state, and therefore it is possible to execute by dividing into simple instructions in the case of an instruction having many clock cycles to be processed and requiring to assurance integrity of processing (to output always correct result without being affected by other processes), such as test and set instruction, so that the pipeline executing processing efficiency may be enhanced.

During execution of divided instruction, the data storage unit is in lock state, but it is possible to execute instructions belonging to other processes simultaneously, and only the execution of instruction that may disturb integrity of execution of instruction divided by using the resource shared among processes is delayed automatically, and parallel execution of multiple processes including exclusive running unit may be realized without particular restrictions, and hence it is effective to present effective technology in realizing the exclusive use of shared resources henceforth in parallel processing field.

Figure 10:
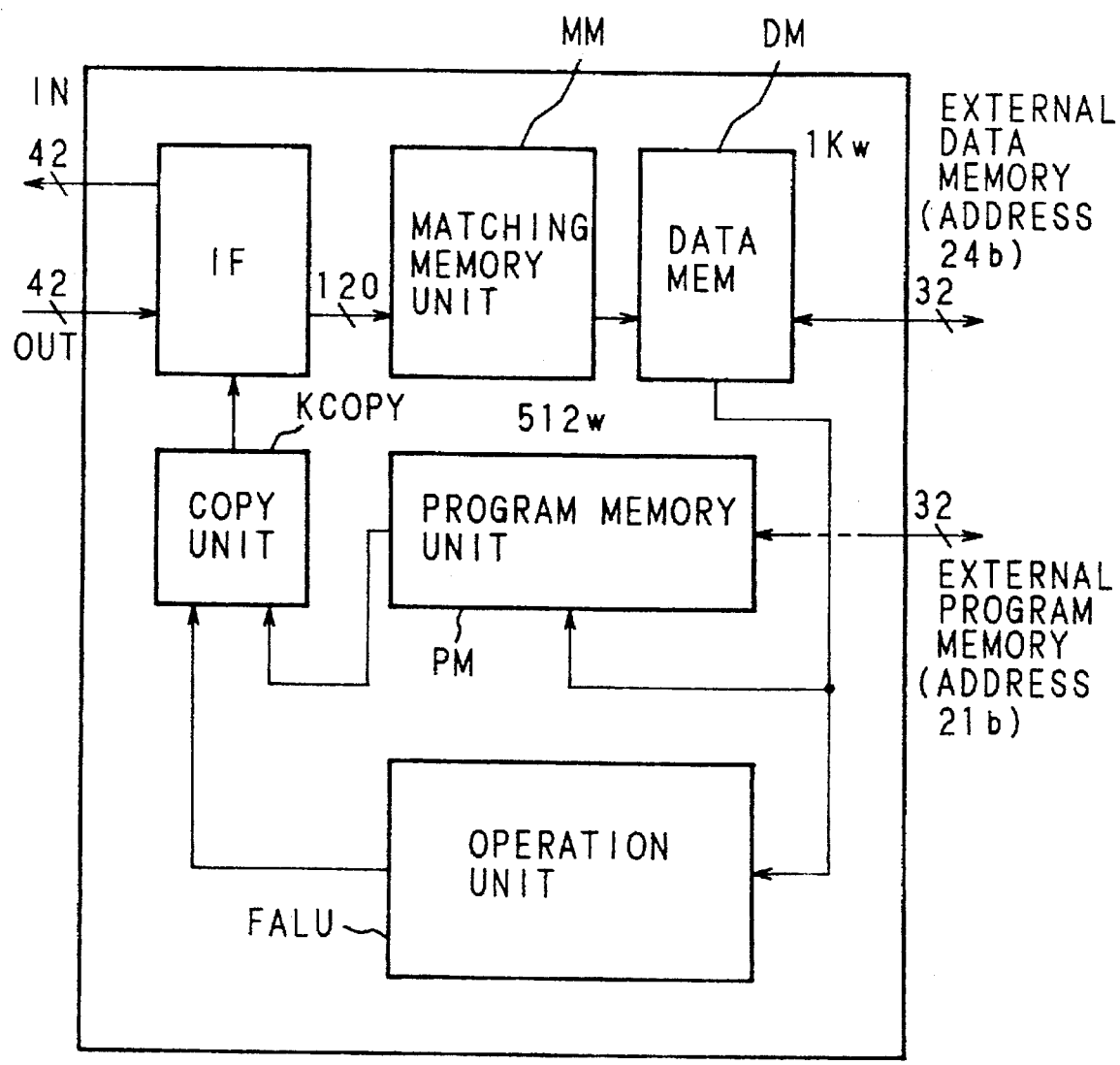
FIG. 10 is a block diagram showing a constitutional example of a data flow microprocessor of the invention.

FIG. 10 is a block diagram of a data flow microprocessor of the invention.

Figure 11:
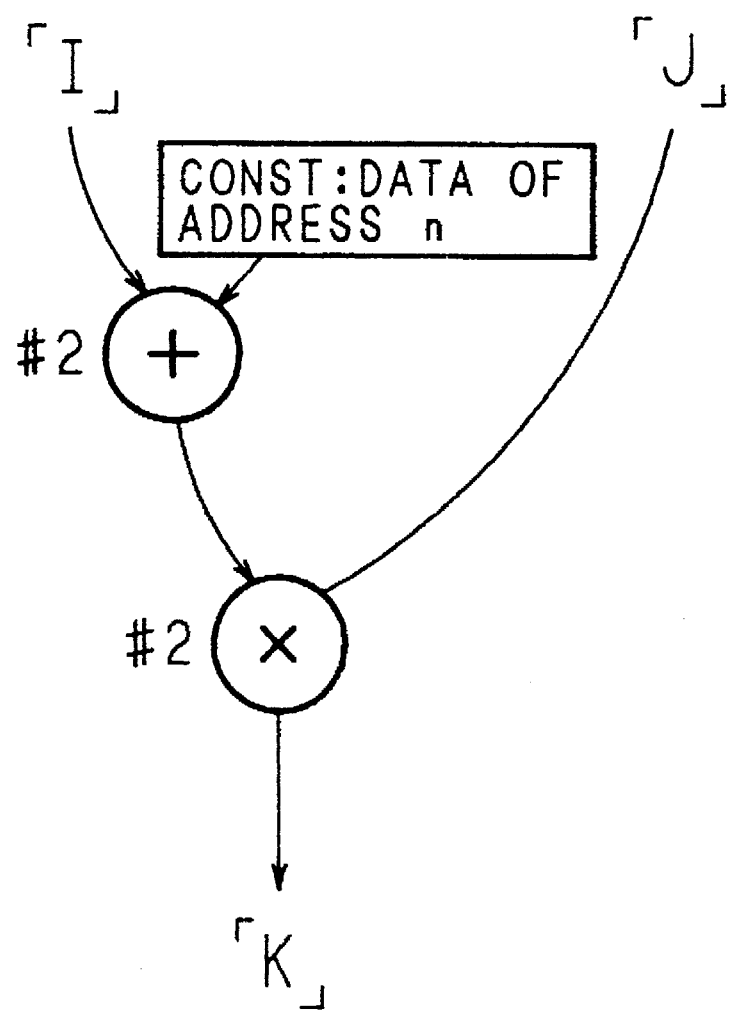
FIG. 11 is a schematic diagram showing its data flow graph.

The operation is described below, supposing to execute the program (data flow graph) shown in FIG. 11.

Figure 12:
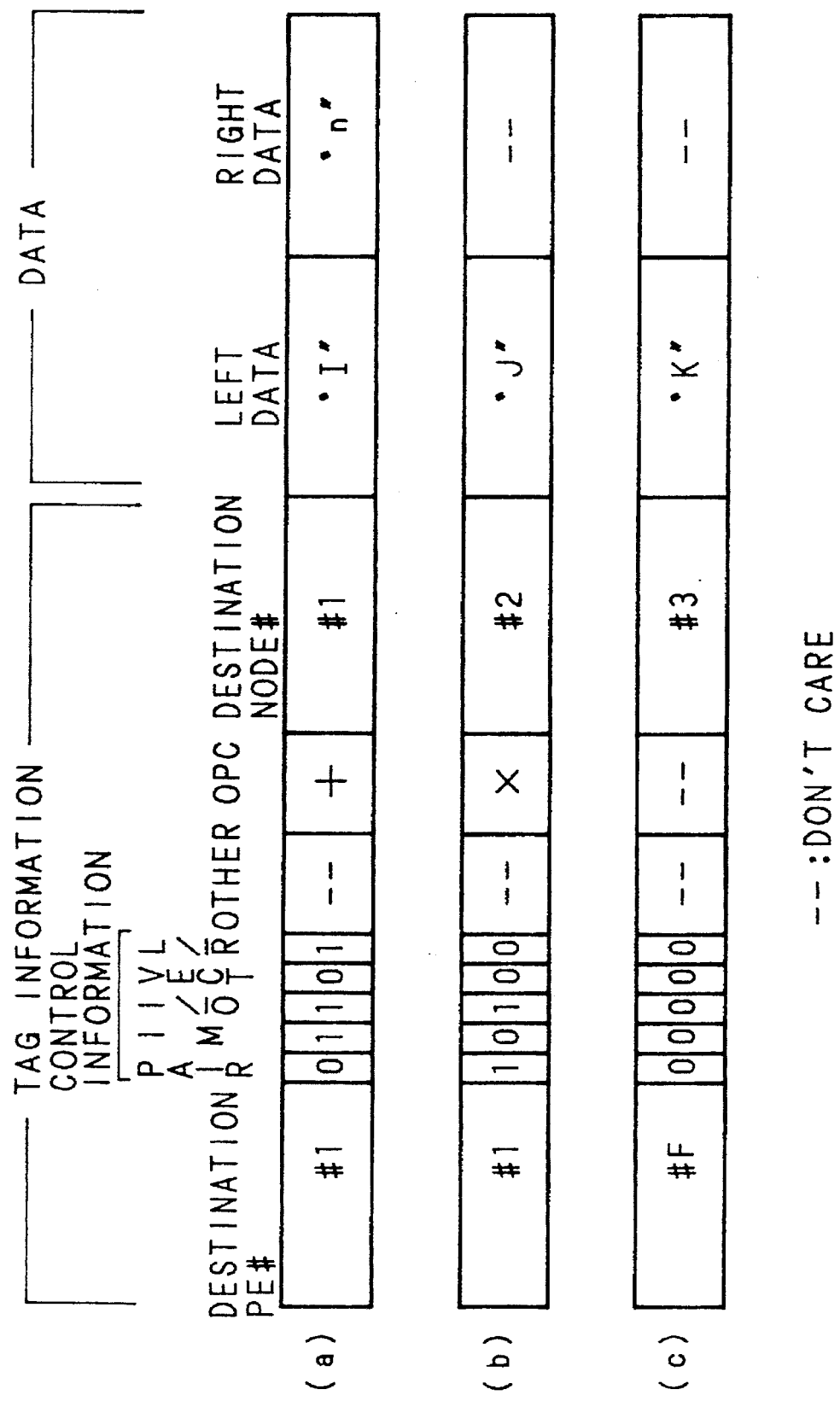
FIGS. 12a–c are a schematic diagram showing state changes of packet when the data flow graph in FIG. 11 is executed.

A packet inputted from outside through an input/output interface unit IF includes, as shown in FIG. 12(a), destination processor number (PE#) "1", control information (SEL-CODE), instruction code (OPC) "+", destination node number #1, and left data "T". Of the control information SEL-CODE, PAIR indicates whether firing processing is executed by matching memory or not, IM whether the operand (the data to be operated) is read out from the data memory or not, I/O whether processing is continued or not in the processor after the operation, VECT whether the data is subjected to vector operation or not, and L/R whether the data stored at the left data position before firing processing is the data to be the left data of dyadic operation or not.

The packet "T" inputted from outside reaches the matching memory unit MM through the input/output interface unit IF, but as shown in FIG. 12(a), since the IM flag of SEL-CODE is "1" the partner data of dyadic operation is interpreted to be read out from the data memory unit DM, and is sent to the data memory unit DM without being processed at all. In the data memory unit DM, since the IM flag is "1", the data stored in the address corresponding to the value "n" stored at the right data position of the packet is read out, and is stored at the right data position instead of "n".

From the data memory unit DM, packets are sent out simultaneously to the operation unit FALU and program memory unit PM. In the operation unit FALU, dyadic operation is executed according to the instruction code "+", and the result data is stored at the left data position of the packet.

On the other hand, in the program memory unit PM, according to the destination node number "#1", of the packet, the program memory is read out, and the next destination node number "#2" next instruction code "X", next control information and others are read out, and the corresponding portions in the packet are updated.

These pieces of information updated in the operation unit FALU and program memory unit PM are combined in the copy unit KCOPY, and are sent again to the input/output interface unit IF. In the copy unit KCOPY, in the case where plural destination nodes are present for the operation result of one node, the operation result data is copied, and is attached to plural pieces of tag information read out by the program memory unit PM, and plural packets having the same result data are delivered.

When the operation result packet reaches the matching memory unit MM again after passing through the input/output interface unit IF, in the case where the packet having the data "J" has already reached and been stored in the matching memory unit MM (See FIG. 12(b)), since the destination node numbers of these two packets are both "#2", firing processing is done, and packets for dyadic operation are created. On the other hand, in the case where the partner packet has not reached yet, the partner packet is waited for in the matching memory unit MM. The above said packet generated in the matching memory unit MM passes through the data memory unit DM because the IM flag is "0" and the instruction code is not DM instruction, and is sent to the operation unit FALU and program memory unit PM. In the operation unit FALU, multiplication is executed. In the program memory unit PM, next tag information is read out, and is attached to the packet as shown in FIG. 12(c). These pieces of information are combined in the copy unit KCOPY, and sent to the input/output interface unit IF, but are delivered outside because the I/O flag of SEL-CODE is "0".

As explained herein, the program (data flow graph) receiving two inputs terminates the predetermined processing, and outputs the result in the form of packet.

In this process, operation has been done on the data stored at address n in the data memory unit DM, but since the data memory unit DM is disposed before the operation unit FALU, an efficient program execution is realized without making extra circulating of the cyclic pipeline for memory access.

Figure 13:
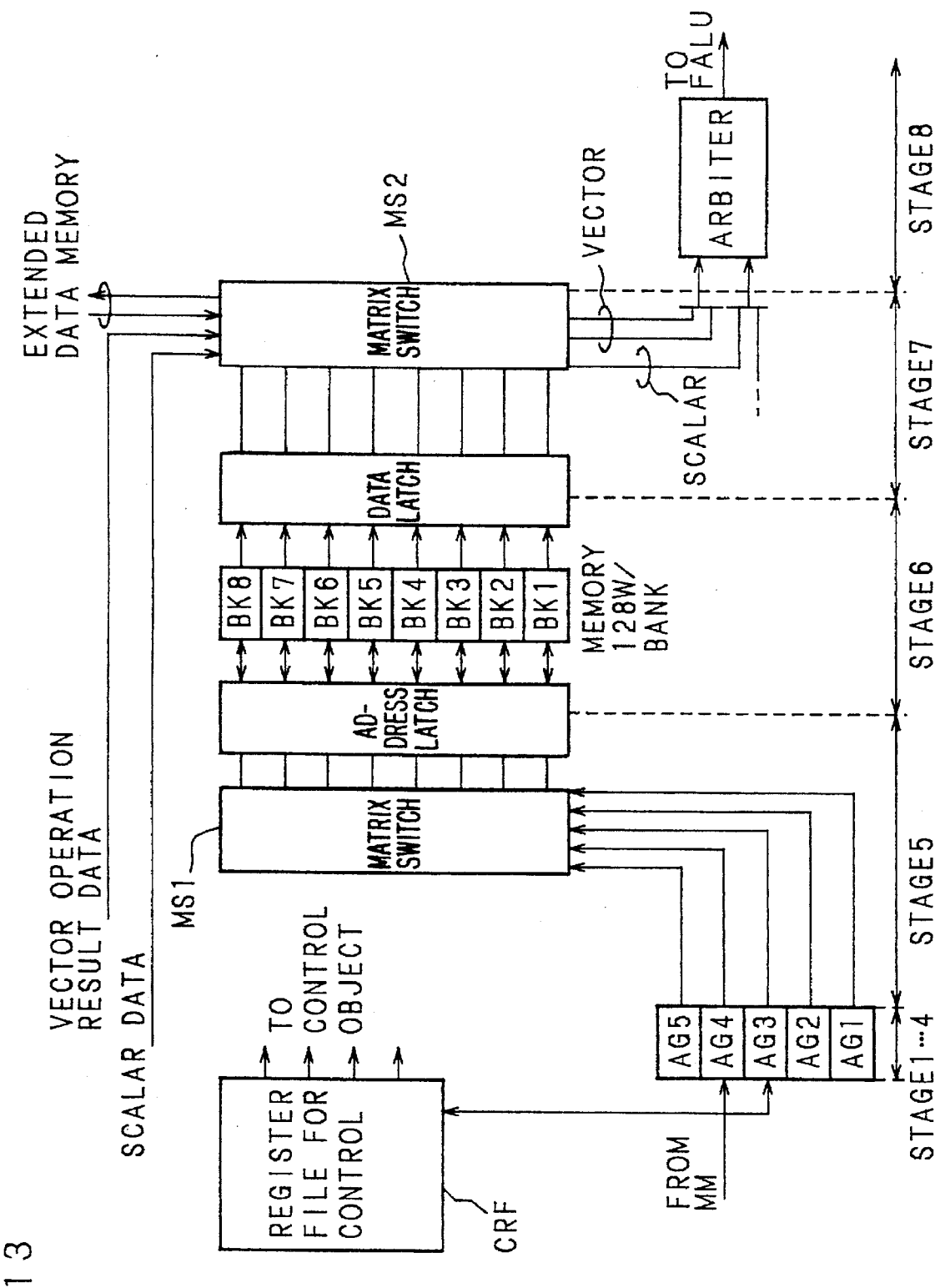
FIG. 13 is a block diagram showing the configuration of a data memory unit of the data flow microprocessor of the invention.

The vector operation is explained below. FIG. 13 is an embodiment showing the configuration of the data memory unit DM of the data flow microprocessor of the invention.

The data memory unit DM is composed of eight stages of pipelines. The first four stages are used for address generation. In order to access five memories simultaneously, there are five address generators AG1 to AG5 independently operating. Five memory accesses consist of reading of two operands for vector operation, writing of one result data, reading or writing of data for scalar data, and reading or writing of data for DMA data transfer with external data memory. The fifth stage comprises a matrix switch MS1 of memory address, and five address generators and eight memory banks may be composed arbitrarily. The sixth stage is for memory access, having eight memory Banks BK1 to BK8, and five memory banks out of these memory banks BK1 to BK8 can be accessed simultaneously. At this time, for example, by coupling the bank BK3 and bank BK4, One memory bank can be composed, by controlling switching of the matrix switch MS1 and by the address judging function disposed in each memory bank. The seventh stage is composed of matrix switch MS2 of data, and eight memory banks and input/output buses are arbitrarily combined to compose. At the eighth stage of pipeline, arbitration of vector processing packet and scalar processing packet is done, and either one is selected and delivered.

Various functions of the data memory unit DM can be set programmably by preliminarily sending of a packet having an instruction code for setting function, and writing the control register file CRF. The following functions can be set.

(1) Functions of various address generators, that is, the number of addresses generated continuously, the increment of address, modulo operation, address bit inverting, address least significant bit masking, start address setting, etc.

(2) Combination of address generator and memory bank.

(3) Combination of memory bank and input/output data bus.

(4) Instruction code and destination PE# attached to vector operation packet.

For example, execution of operation "X×Y+Z→W" among vector data composed of 128 elements is explained.

First, from the external data memory, vectors X and Y are respectively transferred to bank BK3 and bank BK4. For this purpose, the address generator AG5 in FIG. 13 is coupled with bank BK3 to generate addresses for 128 words continuously, and by DMA transfer to external data memory, the vector X is read in bank BK3, and likewise vector Y is read in bank BK4.

Next, from bank BK3 and bank BK4, using address generators AG1 and AG2, while reading out operand data simultaneously, the multiplication instruction code is attached, and operation packets are generated continuously, and sent into the operation unit FALU. At this time, the operation packet is simultaneously sent also to the program memory unit PM, but since the VECT flag in the packet is "1", it is not processed but is directly outputted, and is combined with the output from the operation unit FALU.

Simultaneously and parallel to this processing, reading of the next required vector Z from external data memory is executed by DMA transfer, and the vector Z is stored in bank BK6 according to the address generated by the address generator AG5.

On the other hand, the multiplication result of every pair of element data of vectors X and Y, having "1" as VECT flag, passes through the input/output interface unit IF and matching memory unit MM, and reaches the data memory unit DM, where the write addresses are generated continuously by the address generator AG4 since the VECT flag is 1, and are continuously written into the bank BK5 preliminarily allocated for writing of vector operation result.

After completion of multiplication of vectors X and Y, the vector addition is carried out similarly between the bank BK5 in which the multiplication result is stored and the bank BK6 in which the vector Z is read, and the addition result is stored in the bank BK7.

The final operation result W is transferred from the bank BK7 to the external data memory by DMA. In such processing, vector operation is executed at high speed.

Data exchange between external data memory and internal memory bank is increased in speed by DMA transfer of block transfer of data without address information after setting both start addresses, and the operation rate and the data feed rate are equalized, so that an efficient vector operation is realized. Furthermore, even during vector operation execution, single the address generator AG3 and the input/output data buses for scalar data are provided independently, ordinary memory accesses can be executed simultaneously.

Figure 14:
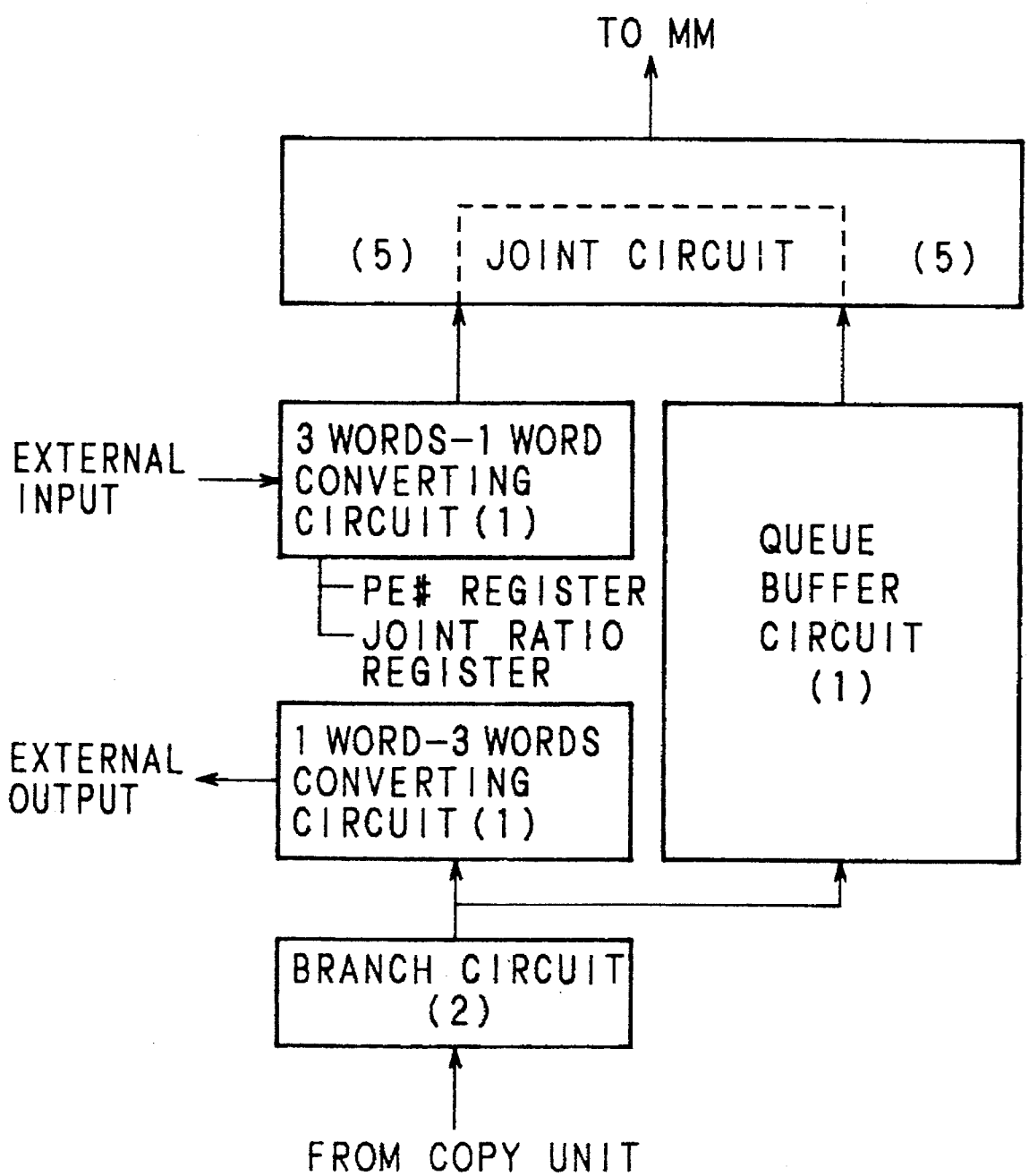
FIG. 14 is a block diagram showing the configuration of an input/output interface unit of the data flow microprocessor of the invention.

The input/output interface unit IF shown in FIG. 10 is described in detail below. FIG. 14 is a block diagram of this input/output interface unit IF.

Figure 16:
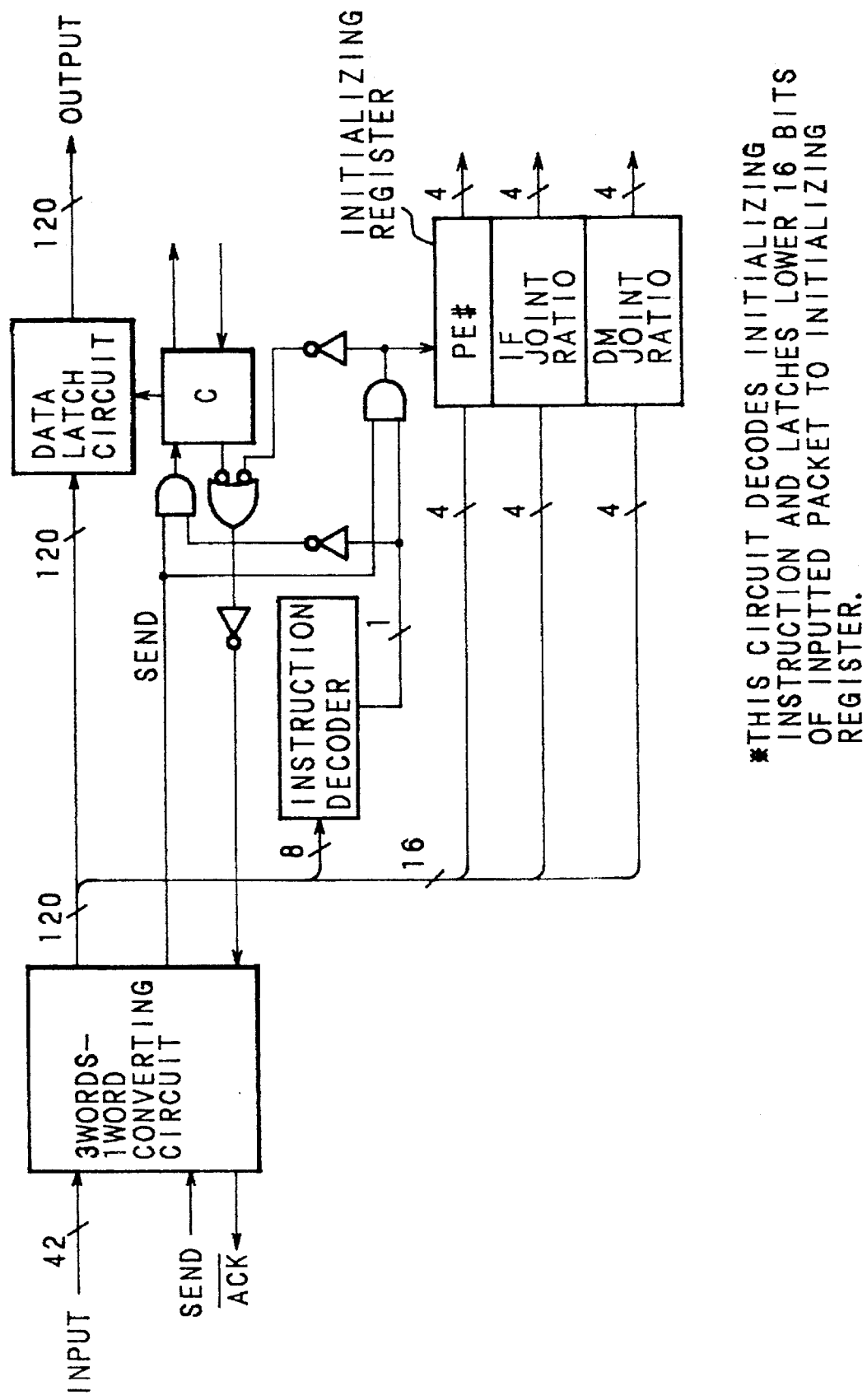
FIG. 16 is a block diagram showing the configuration of an initializing circuit of the input/output interface part.
Figure 17:
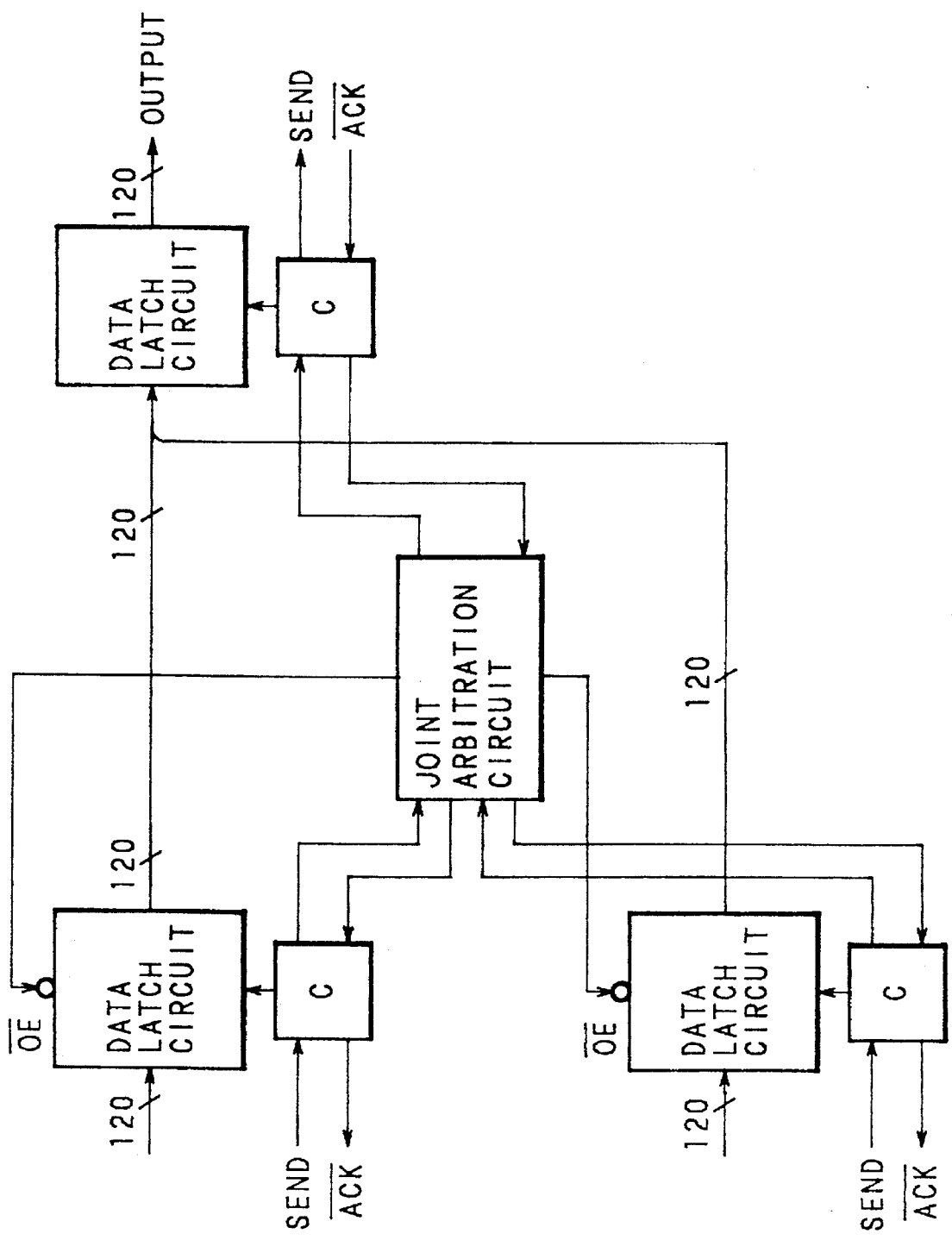
FIG. 17 is a block diagram showing the configuration of a delivered joint circuit of the input/output interface part, FIG. 18 block diagram showing the configuration of a branch circuit of the input/output interface part.
Figure 18:
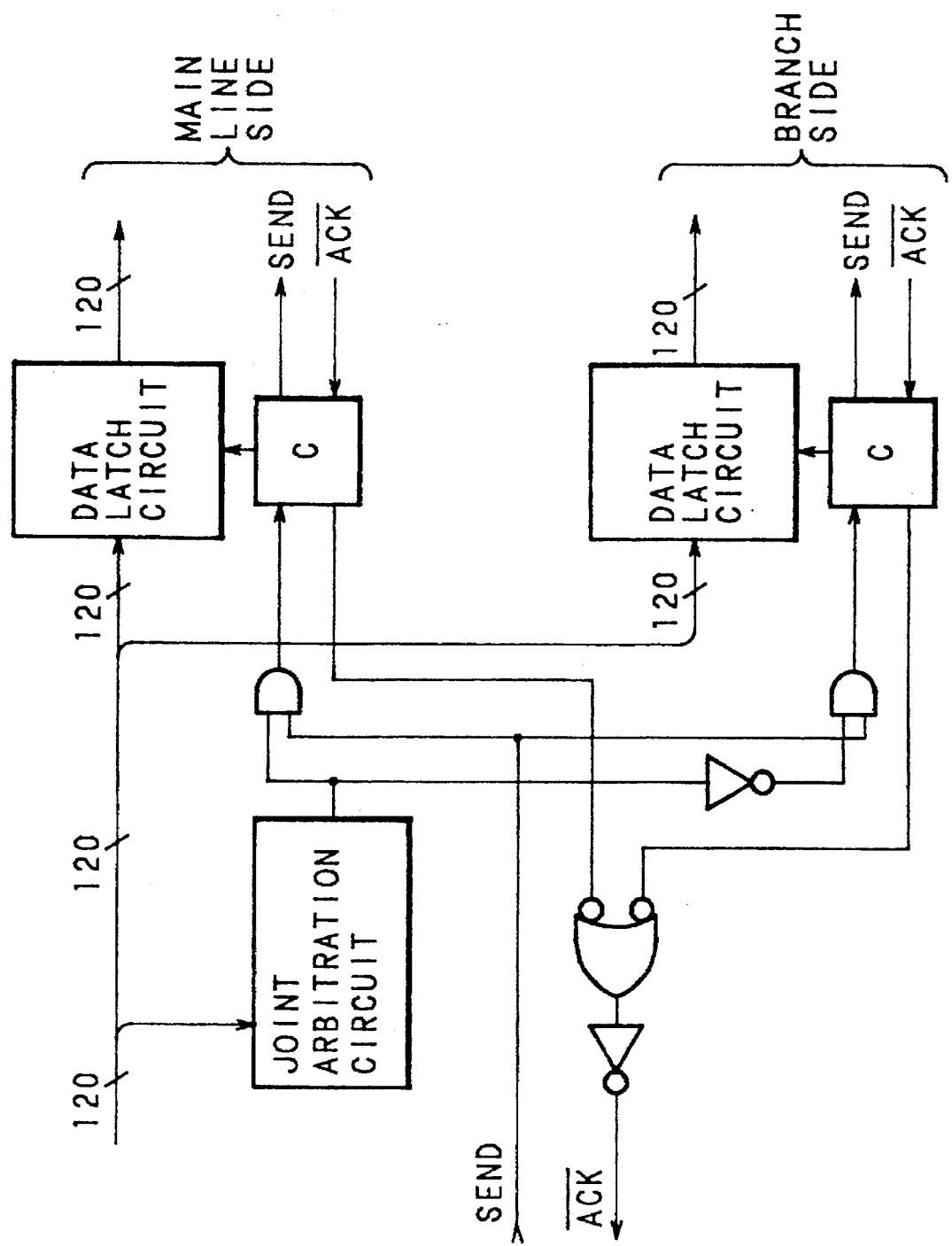
Figure 19:
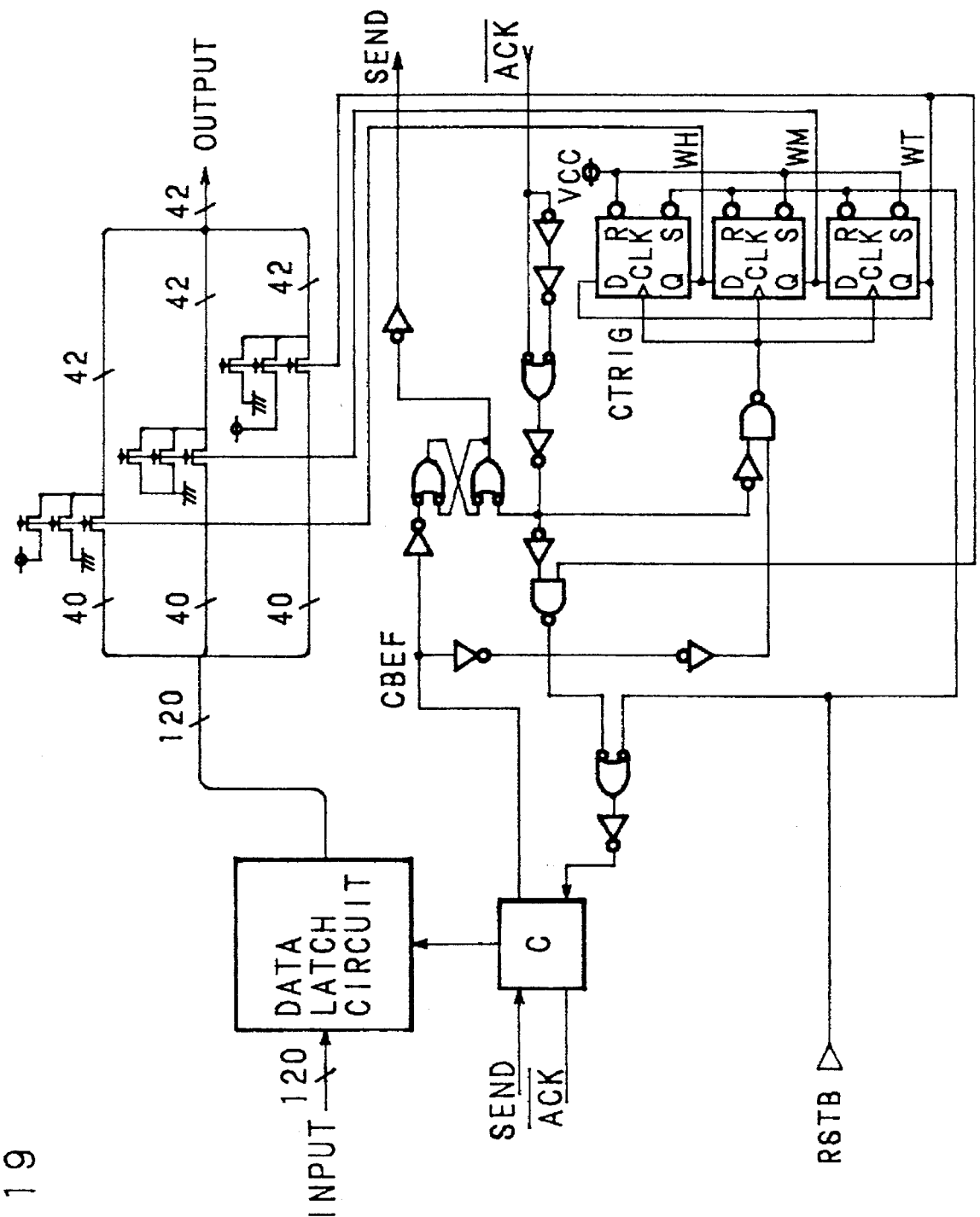
FIG. 19 is a block diagram showing the configuration of a 1 word-3 words converting circuit of the input/output interface part.

The input/output interface unit IF is composed of 3 words-1 word converting circuit, joint circuit, branch circuit, 1word-3words converting circuit, queue buffer circuit and initializing circuit (not shown). The 3 words-1word converting circuit in this input/output interface unit IF is shown, by way of example, in FIG. 15, the initializing circuit in FIG. 16, the joint circuit in FIG. 17 the branch circuit in FIG. 18, and the. 1word-3 words converting circuit in FIG. 19.

Thus composed input/output interface unit IF has the following functions.

(1) Initializing

Receiving an initializing packet inputted from outside, the processor element number (PE#) register, and block joint ratio (input/output interface unit IF, data memory unit DM register are initialized. The packet having an operation code for initialization is used in initialization of registers, and is then erased in the input/output interface unit.

(2) Conversion from 3words to 1word

The external packet inputted in a format of 42 bits×3 words is extended into 1-word format.

(3) Joint

The packet inputted from outside is joined in the internal cyclic pipeline by using asynchronous arbitration circuit. To reduced the path changeover overhead for joining, the block joining for changing over path at every plural packets is employed.

(4) Branch

In the packet on the cyclic pipeline, those to be outputted to outside the PE are branched off and delivered outside.

(5) Conversion from 1 word to 3 words

The internal packet of 1-word format is outputted by converting into external packet format of 42 bit×3 words.

Incidentally, in order to decrease the number of input and output pins of this processor, the packet is communicated in 3-word configuration outside the processor, and the packet entering from outside must be converted from 3 words to 1word inside the processor.

The input packet converted into 1-word packet of 120 bits in width is entered to the joint side of the asynchronous joint circuit. Inside the joint circuit, by asynchronous arbitration with the packet on the internal cyclic pipeline, the data is joined into one path and outputted to the matching memory unit MM.

The output packet runs through [MM]→[DM]→[PM/FALU]→[KCOPY], and enters again the input/output interface unit IF, and reaches the branch circuit.

In the branch circuit, it is judged whether or not to branch from the selection code of packet and the destination PE#.

The operation of the 3 words-1 word converting circuit is described specifically below.

Because the number of input and output pins is limited, the input packet is entered in a configuration of 42 bits×3 words. To convert it into one word of 120 bits, a circuit is provided.

In the 3 words-1word converting circuit, the upper 2 bits of the inputted 42-bit data are decoded t- judge which of Head/Middle/Tail word, and a Send signal on the C element is controlled so as to store in the corresponding data latch.

Next, the operation of the initializing circuit is explained.

In the initializing circuit, the instruction code included in the output packet of the 3 words-1 word converting circuit is decoded, and when it is judged to be an initializing packet, a latch signal for the initializing register is generated, and the initializing information stored in the lower 12 bits of the left data region in the packet is stored in the initializing register, and an acknowledge signal is returned to the 3 words-1word converting circuit at the same time.

On the other hand, since the packet for initialization is erased in the initializing circuit, in the case of an initializing packet, there is an AND gate for prohibiting propagation of Send signal to the next stage.

In the next joint circuit, in order to join the packets inputted from two paths into one output path, an asynchronous converging arbitration circuit is provided. Its detailed circuit is disclosed, for example, in the embodiment of "Data Transmission Apparatus" in the specification of the Japanese Patent Application Laid-Open 61-294949 (1985) already filed by the applicant of the present invention in Japan.

In the branch circuit, it is decided whether or not to decode and branch the selection code of 120-bit wide input packet, instruction code, etc., and the packet is sent to the main line side or branch side.

The branching condition in the branch circuit is shown below.

Branching condition=A+B+C
where

A=CONDX*CONDY*($\overline{\text{LEFT\_DATA=PE\_REG}}$)

B=$\overline{\text{CONDX}}$*CONDY*($\overline{\text{PE\_FIELD=PE\_REG}}$)

C=$\overline{\text{OUT}}$*PE*PMTH*$\overline{\text{VIOL}}$*VECT

CONDX=PE*$\overline{\text{VECT}}$

CONDY=$\overline{\text{VIOL}}$*HASHC*(OUT+PE)

However, in the case of the packet not branched because A is not established although CONDX and DONDY are established because the destination PE is the origin PE at the time of remote memory access, the function of clearing the PE and PMTH flags of the packet in the input/output interface unit IF, and changing to the ordinary local memory access packet is provided in the input/output interface unit IF. To realize this function, on the main line from the branch circuit to the joint circuit, the following processing is executed on the selection code.

PE(NEW)=PE*CONDX*CONDY

PMTH(NEW)=PMTH*CONDX*CONDY

Making reference to FIG. 20, the operation of the input/output interface unit IF is explained below.

When the value of PE flag is "1" that is when outputted the packet outside of PE, in the case where the destination PE# is the origin PE, no output is made. The data memory unit DM reads out the memory with the right data as the address and stores the result in the right data field when the input selection code is PE=0 and PM_Thru=1. As the same time, it is outputted by changing to PM_Thru=0.

When an instruction to access the data memory unit DM is executed, the upper 8 bits of the left data are always moved to the upper 8 bits of the right data (to save the return PE# of the memory access packet passing between PEs).

Furthermore, when PE#=1, PM_Thru=0, the data memory unit DM regards to be NOP (no operation) (in order to put through the data memory unit DM when returning to the initial PE after accessing the memory across PEs).

The queue buffer circuit is realized by a two-port memory having a write only port and a read only port.

Below is described the mechanism for efficiently accessing the distributed shared data memory in a multiprocessor system connecting a plurality of processors of the invention.

Figure 21:
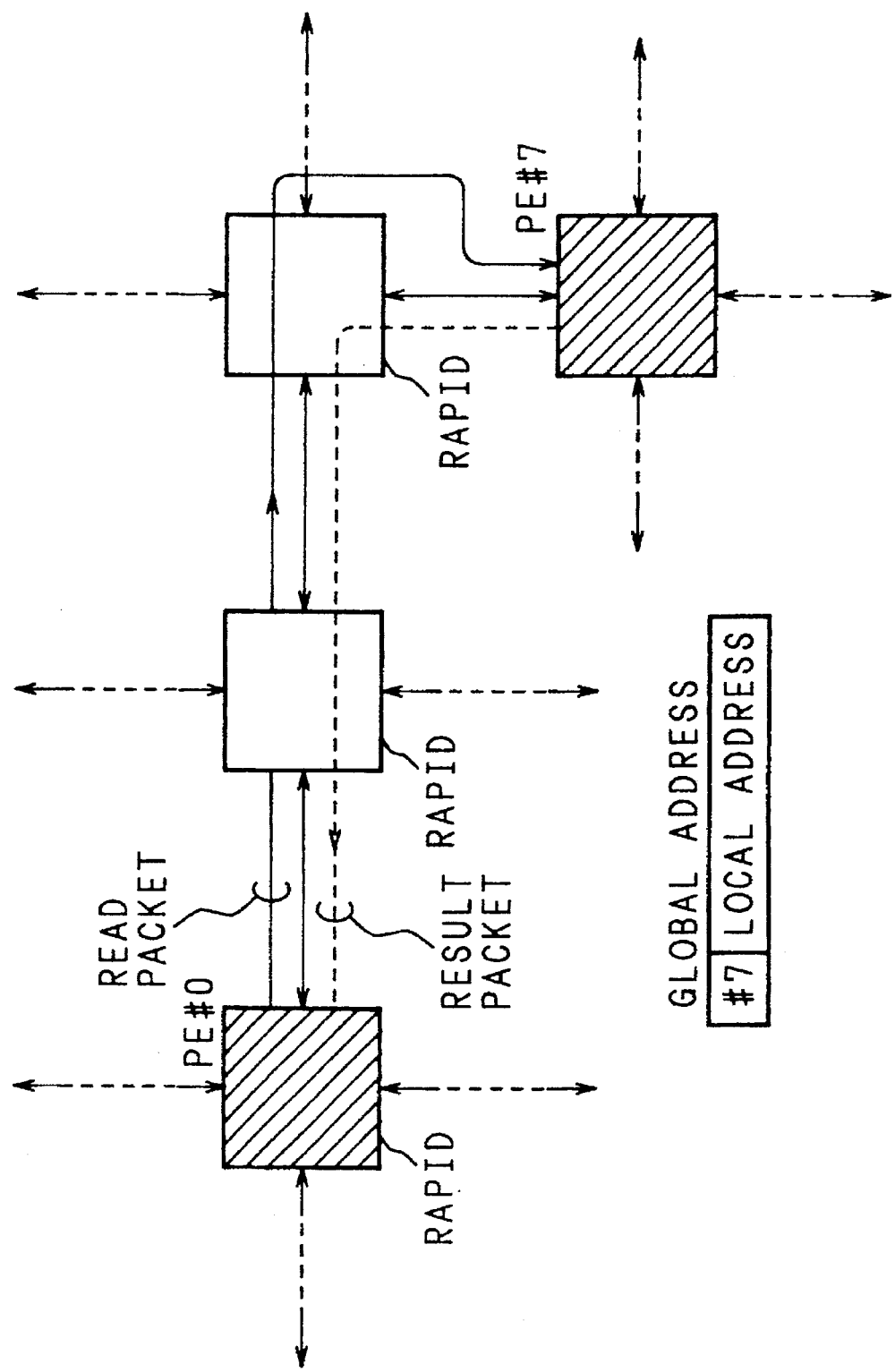
FIG. 21 is a schematic diagram for explaining an efficient access of a distributed shared data memory part.

FIG. 21 is a conceptual diagram showing the access mechanism of this distributed shared data memory. In the diagram, the reference code RAPID denotes the data flow microprocessor of the invention. The PE#0 side checks the address upper bits of the read request packet of the data memory (corresponding to PE#), and adds the return PE# ("0") of the packet as mentioned above, and outputted to the network. In consequence, the PE#7 side reads out the data memory, changes the destination PE#, and sends out to the request origin PE, and then the PE#0 side receives the result of reading.

In the case of bus-coupled type shared memory system, the entire performance is regulated by the bottleneck of the memory access. This microprocessor employs the distributed shared memory system, and through message communications between processors, the memories distributed simultaneously and parallel are accessed. Accordingly, such bottleneck is not present, and the performance is outstandingly enhanced. The details of this operation are, however, omitted.

Figure 15:
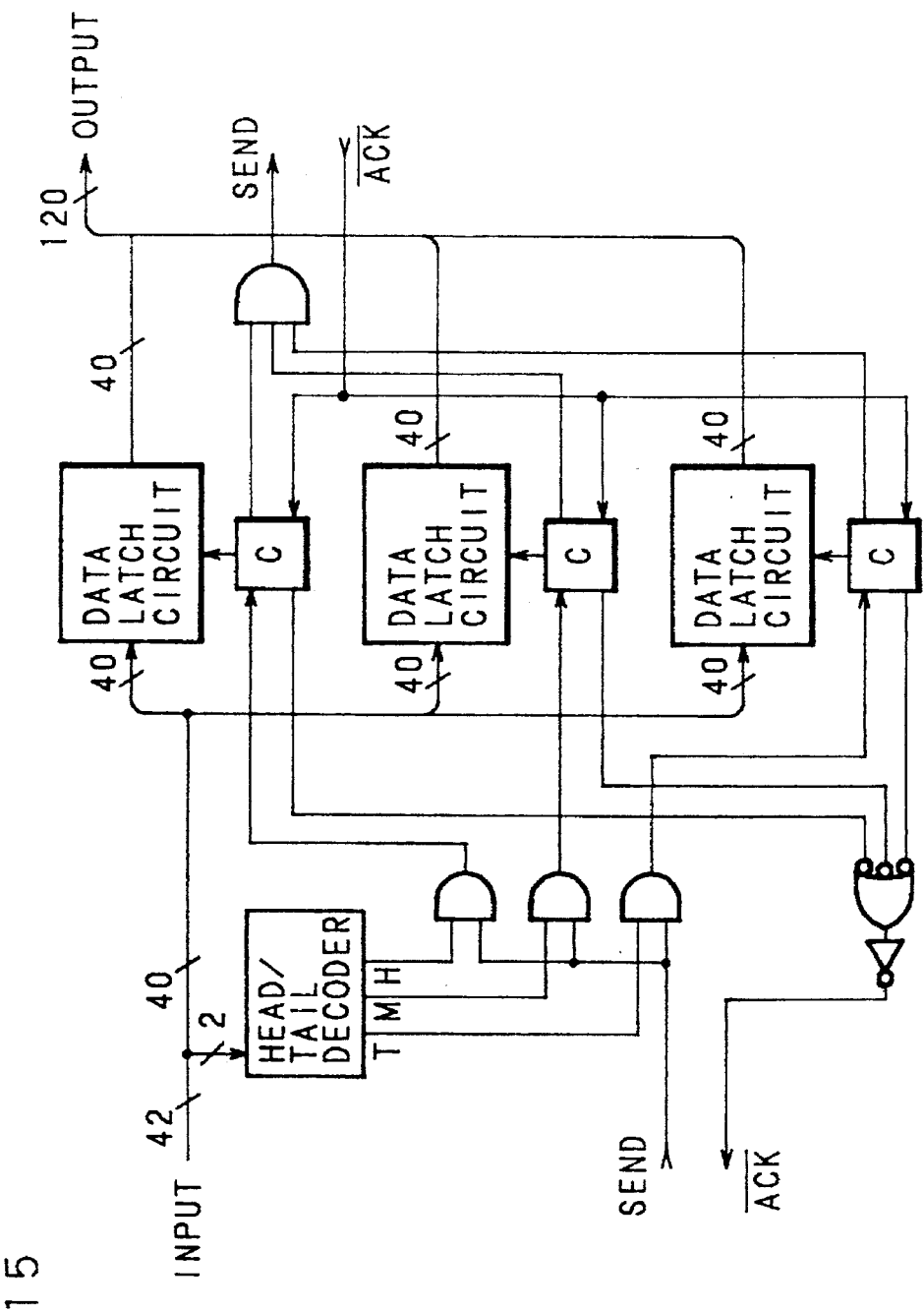
FIG. 15 is a block diagram showing the configuration of a 3 words-1 word converting circuit of the input/output interface part.

FIG. 15 is a block diagram showing the configuration of the matching memory MM in FIG. 10. The function of this matching memory unit MM is explained below.

(1) Creation of Operand Pair

In the matching memory unit MM, a pair of operands necessary for dyadic operation are generated and outputted. This function is basically realized by waiting for operands on the hash memory. That is, the hash value calculated from the tag information of the input packet is used as the waiting address on the memory, and the operand of the packet arriving first is stored, and when a packet having the same tag information arrives, an operable running packet is created.

In the matching memory unit MM, as this waiting memory, the hash memory and associative memory are combined. That is, usually the hash memory is used, and the associative memory is used as an overflow receiving tray of packet in the event of hash conflict. To generated hash address, the lower nine bits of the destination node number of the tag information of input packet and color/generation 9 bits are used. By determining EXNOR of these two pieces of information at every bit, the nine-bit has address is calculated. By this method, the frequency of hash collision can be lowered. This effect contributes to reduction of capacity of the associative memory which is the overflow receiving tray in the event of hash conflict. In the case where this associative memory overflows, a hash conflict flag is set up for the input packet, and the packet is delivered as a through-packet making no processing in other functional blocks, and after making one turn of the cyclic pipeline, it returns to the matching memory unit MM again.

(2) Pipeline Configuration

The matching memory unit MM is divided into six stages of pipeline stage. Processing at each stage is as follows.

First stage: Generation of hash address,

Second stage: Prior competition detection of hash memory by comparing addresses.

Third stage:
  (1) Predecoding of hash address.
  (2) Prior competition avoiding of hash memory.

Fourth stage: Reading of hash memory and associative memory.

Fifth stage:
  (1) Comparison of reading result of hash memory and tag information of input packet.
  (2) Selection of right operand (input packet/hash memory/associative memory.
  (3) Determination of processing at the sixth stage (writing into hash memory/paired generation with hash memory/writing into associative memory/ paired generation with associative memory).

Sixth stage:
  (1) Execution of memory writing by determination result at the fifth stage (even in the case of paired generation, "0" is written into the program memory unit PB).
  (2) Replacement of right and left operands,
  (3) Exclusive control of memory access.

Figure 23:
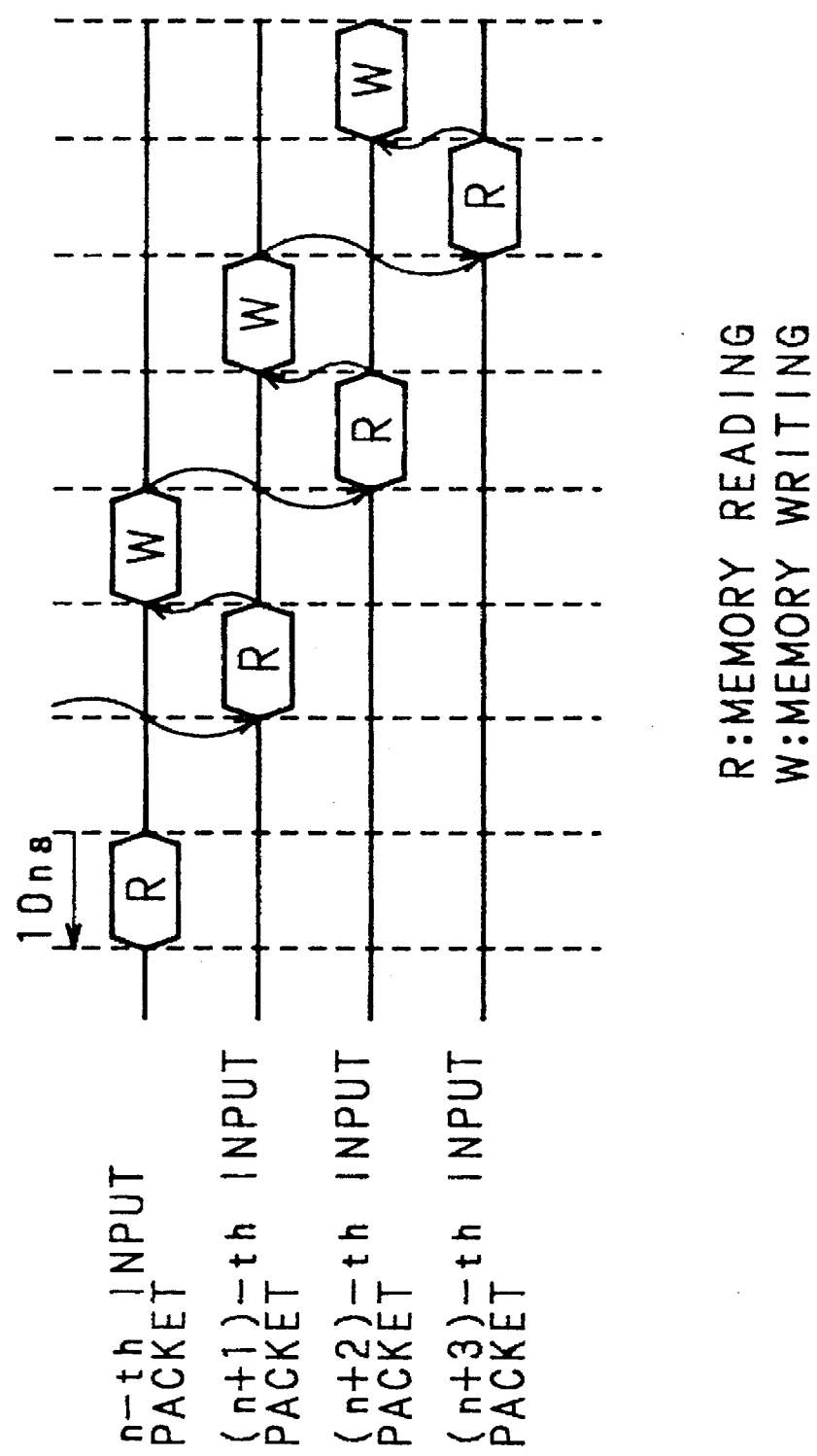
FIG. 23 is a timing chart for explaining its operation, FIG. 24 a schematic diagram showing the format of input packet the matching memory part.
Figure 24:
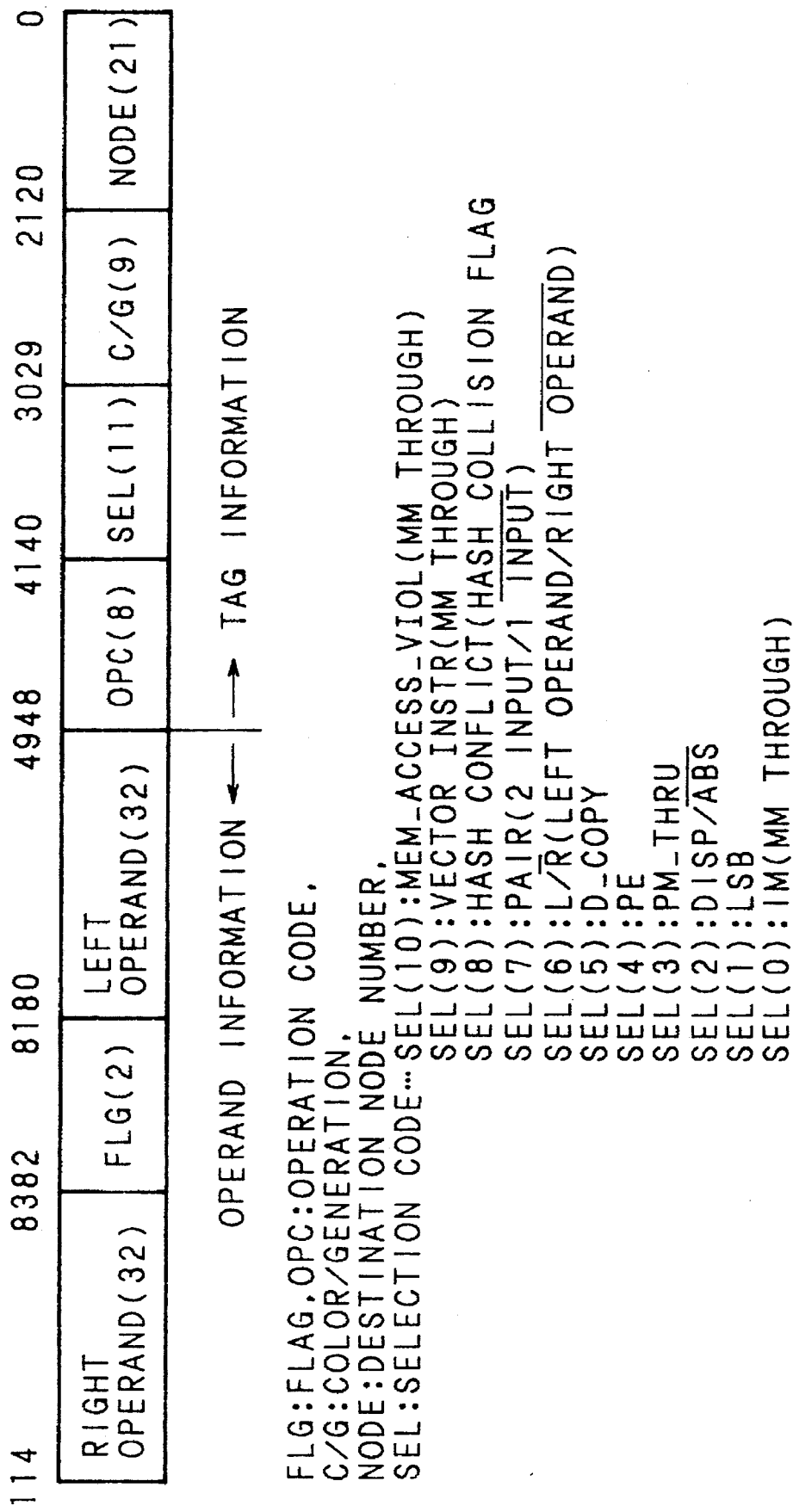

In the matching memory unit MM, every time one packet is inputted, two time memory accesses of reading and writing are executed each on the hash memory and associative memory. When input packets are inputted in succession, too, in order not to lower the transfer rate of packets, the cycle time of the memory access is minimized, and reading of the N+1-th input packet is executed before executing the writing of the N-th input packet. As a result, it is possible to read out the memory more efficiently and execute memory writing continuously, supposing the cycle time of the memory access to be 10 ns, the time chart is shown in FIG. 23.

In order to execute in the above sequence on the packets inputting asynchronously, exclusive control is executed to assure that memory reading and writing may not overlap.

In the matching memory unit MM, data transfer between pipeline stages is realized by self-synchronizing circuit. By manipulating the data transfer control signal of this self-synchronizing circuit, data transfer to the memory reading stage or memory writing stage may be locally stopped to realize exclusive control of memory access. In other words, while reading the memory, data transfer to the memory writing stage is stopped, or while writing the memory, data transfer to the memory reading stage is stopped.

(4) Prior Competition Detection of Hash Memory

As mentioned in (3), when input packets arrive in succession, before the N-th input packet is written, the N+1th input packet is read. In this case, in the case where the N-th input packet and the N+1-th input packet access the same address in the hash memory, it results in an error. To prevent this, at the second stage and third stage of the pipeline stage, competition of hash memory is avoided in advance. First, the hash address accessed by the preceding input packet at the second stage and the hash address to be accessed next are compared. In the case where matched as a result of this comparison, the next one is forced to wait at the third stage until the memory writing of the preceding input packet is over. In this processing, prior competition of hash memories is avoided.

This processing is necessary only on the dyadic operation instruction execution packet required to generate operand pair, and is not executed on the packets not related with processing in the matching memory unit MM mentioned in (5).

(5) Packet-Through of Matching Memory Unit MM

In the matching memory unit MM, when a packet for dyadic operation instruction execution as mentioned in (3) is inputted, the memory is accessed always twice in order to generate an operand pair. However, in the case of an input of a packet for executing monadic operation instruction or a special packet required to pass through the packet or matching memory unit MM by force, it is directly outputted without any processing made such as memory access and input packet process. The special packet to pass through the matching memory unit MM by force is one having "1" in any one of sel (0), sel (9), sel (10), out of the selection codes of the tag information of the packet. As an exception, however, among monadic operation instruction execution packets other than special packet, the packet setting up the right operand flag is replaced in the right and left operand positions.

Figure 22:
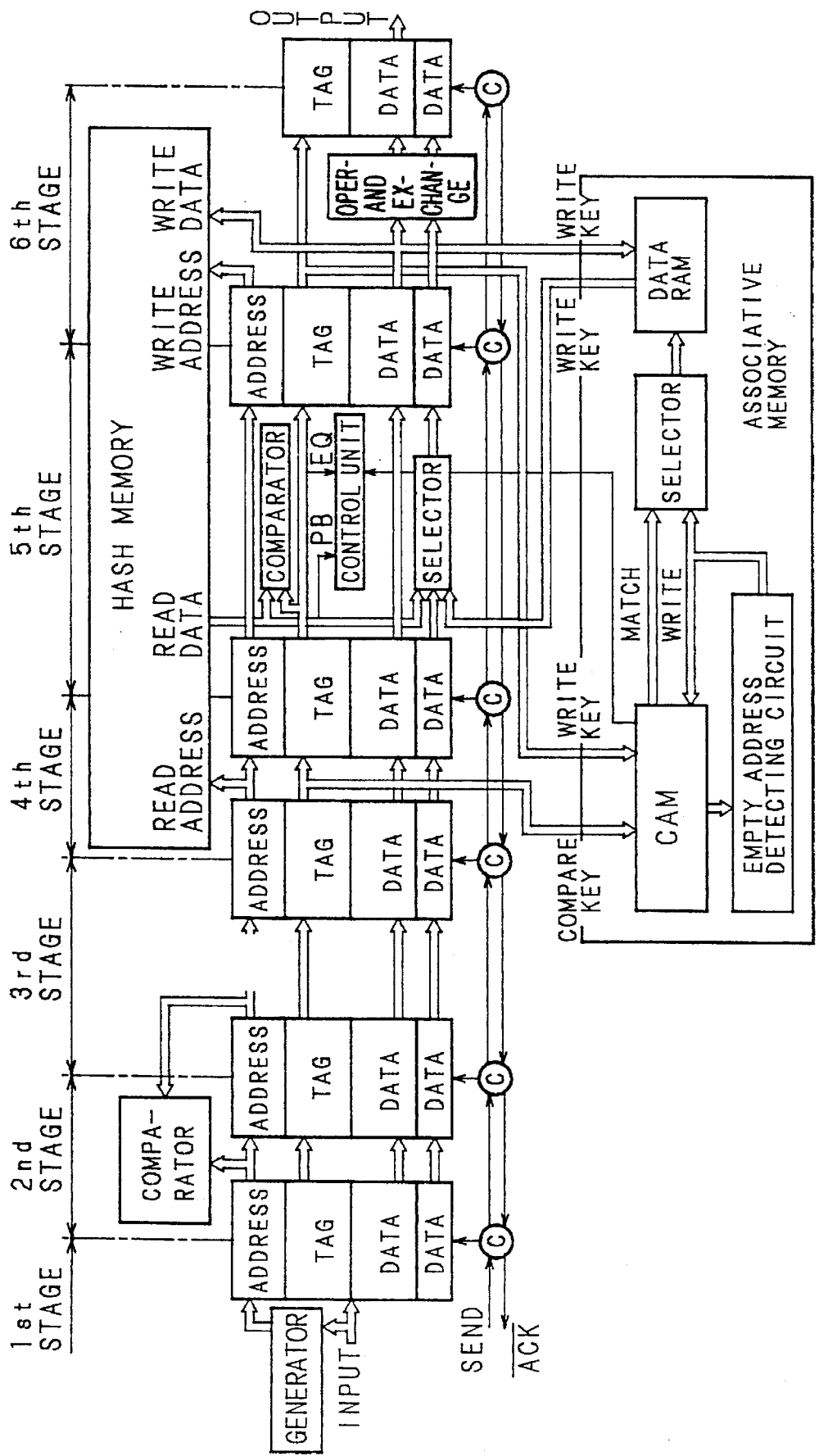
FIG. 22 is a block diagram showing the configuration of a matching memory unit of the data flow microprocessor of the invention

The matching memory unit MM is composed of, as shown in FIG. 22, hash memory, associative memory, data latch, data transfer control circuit "C" and other logic circuits. The input data is entered through the left input unit in a packet format. The format of input packet is shown in FIG. 25.

In FIG. 22, the arrow extending from "C" to the rectangular block is the latch control signal, and this rectangular block is the data latch. The content to be latched may include address, tag and data. The address is the hash address for accessing the hash memory, and it is composed of color/generation and the destination node number of input packet. The tag information of the input packet is inputted to the tag, and the operand information is inputted to the data. The left operand is fed to the upper path of the data, and the right operand, to the lower path.

The input data is sequentially transferred and processed, from left to right in the drawing, between data latches through the data transfer control circuit "C". The portion put between two adjacent data latches corresponds to one stage of the pipeline stage, and while being transferred between the data latches, the processing at that stage executed.

The hash memory in FIG. 22 is described in detail below.

(1) Hash Memory Main Body

The hash memory can store up to 512 words of 56-bit information that can be specified by 9-bit address as shown in FIG. 25.

Figure 26:
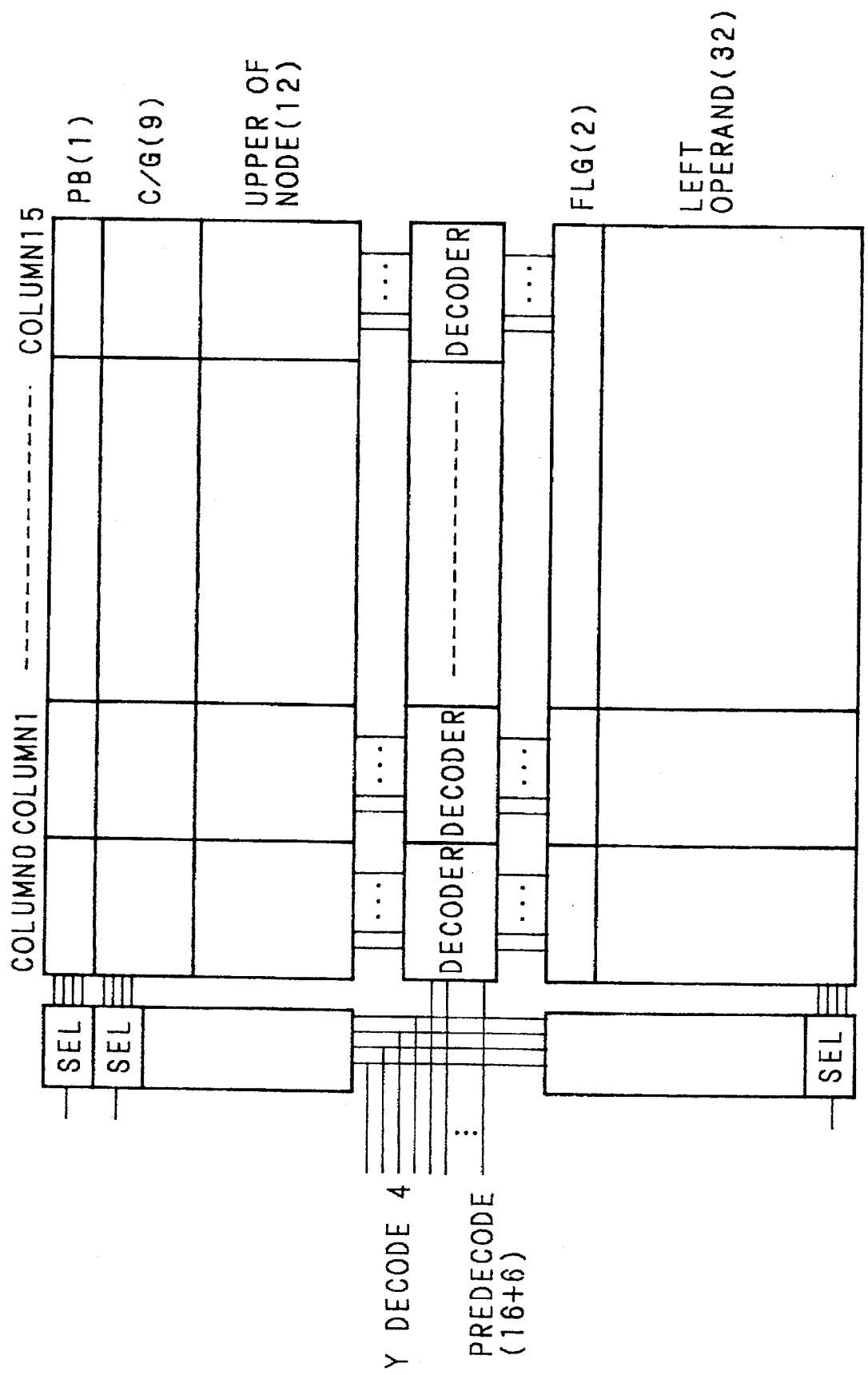
FIG. 26 is a block diagram showing the configuration of the hash memory.
Figure 27:
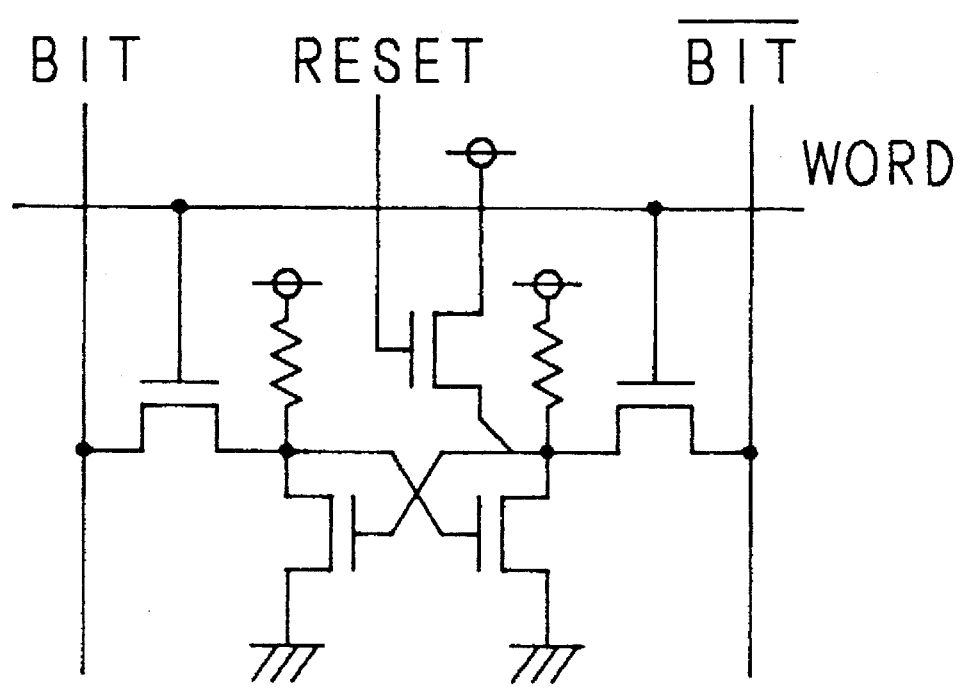
FIG. 27 is a circuit diagram showing the configuration of a memory cell with reset function of the hash memory.

The array configuration of hash memory is shown in FIG. 26. For Y-decoding of 2 bits out of 9 bits of the address, physically it is composed of 224 bits×128 words. Four bits out of 2-bit Y address and 7-bit X address are pre-decoded. Therefore, the address inputted to this block is a total of 26 bits, consisting of 4 bits of the Y-decoding result, 16 bits of pre-decoded result of X-address, and 3 positive bits and 3 negative bits of the undecoded X-address. Accordingly, one column in FIG. 26 contains 8 word lines obtained by decoding 3 bits of undecoded address.

In FIG. 26, SEL denotes a selector for selecting one set out of four sets of bit lines depending on the Y-decoding result, which is constructed of a transfer gate.

The memory cell is a four-transistor circuit configuration using high resistance polysilicon instead of load transistor.

The memory cell of the presence bit (PB) comprises a direct reset mechanism, and it is reset when the system is reset. Its circuit diagram is shown in FIG.

(2) Memory Peripheral Circuit

Figure 28:
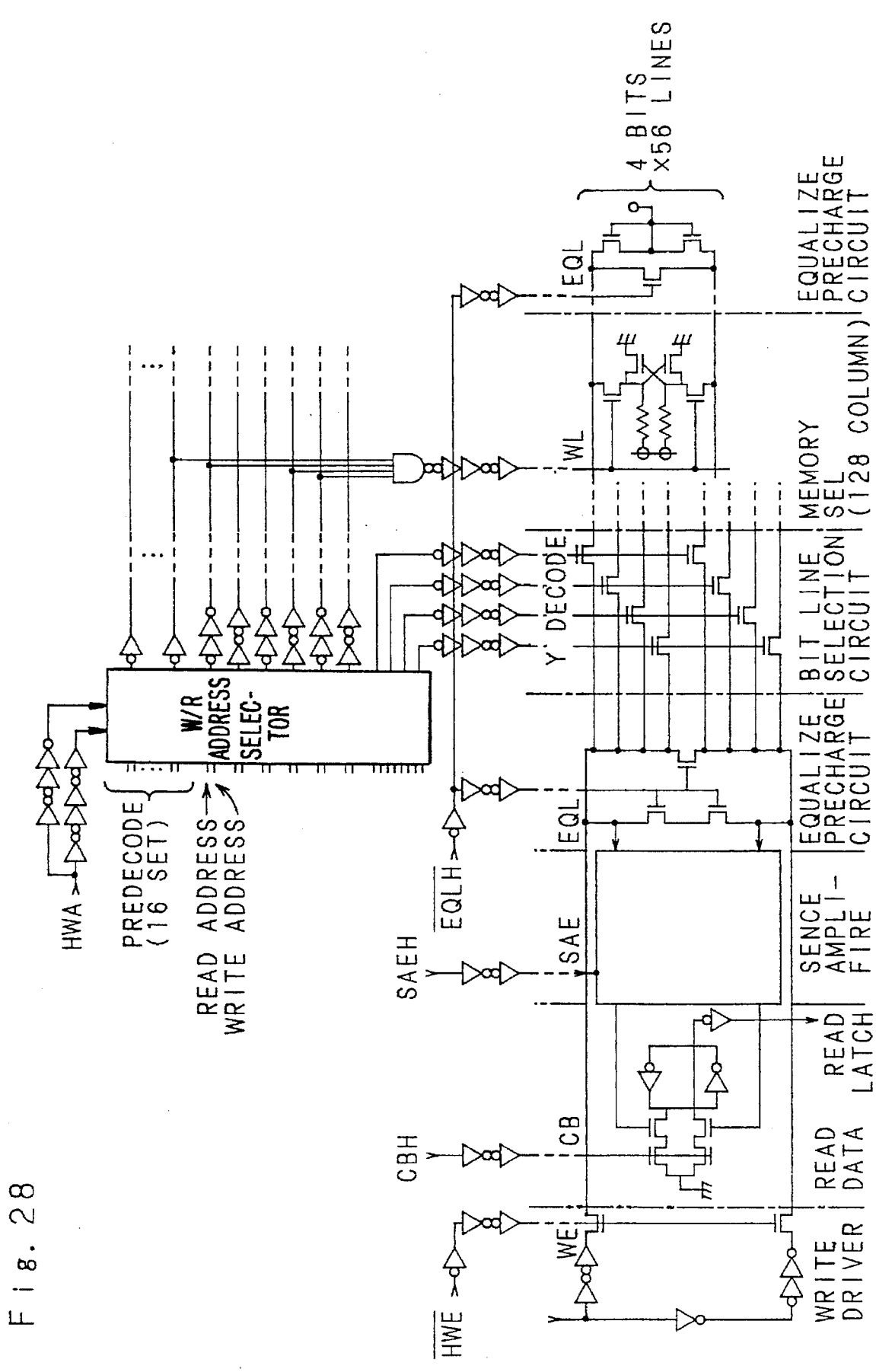
FIG. 28 is a logic circuit diagram showing the configuration of a peripheral circuit of the hash memory.

A logic circuit diagram of memory peripheral circuit is shown in FIG. 28.

Because two bits out of nine bits of the address are Y-decoded, four bit lines are individually assigned with write driver, read latch, sense amplifier, and equalize-precharge.

Regarding the equalize-precharge, in addition to the circuit for equalizing and precharging the bit inverting logic bit line of the sense amplifier synchronously by the inverting logic EALH signal, there is a circuit for equalizing and precharging the bit inverting logic bit line of the memory cell. Equalizing of the circuit relating to the memory cell is done synchronously by the inverting logic EQLH signal, but precharging is done always by the N-channel transistor narrow in the channel width W. Meanwhile, the physical layout configuration of the circuit for equalizing and precharging the bit inverting logic bit line of the memory cell is placed in the middle row of 128 rows of the memory cell.

The W/R address selector is composed of CMOS transfer gate. Memory writing/reading is changed over by HWA signal.

(3) Memory Access Control

Figure 29:
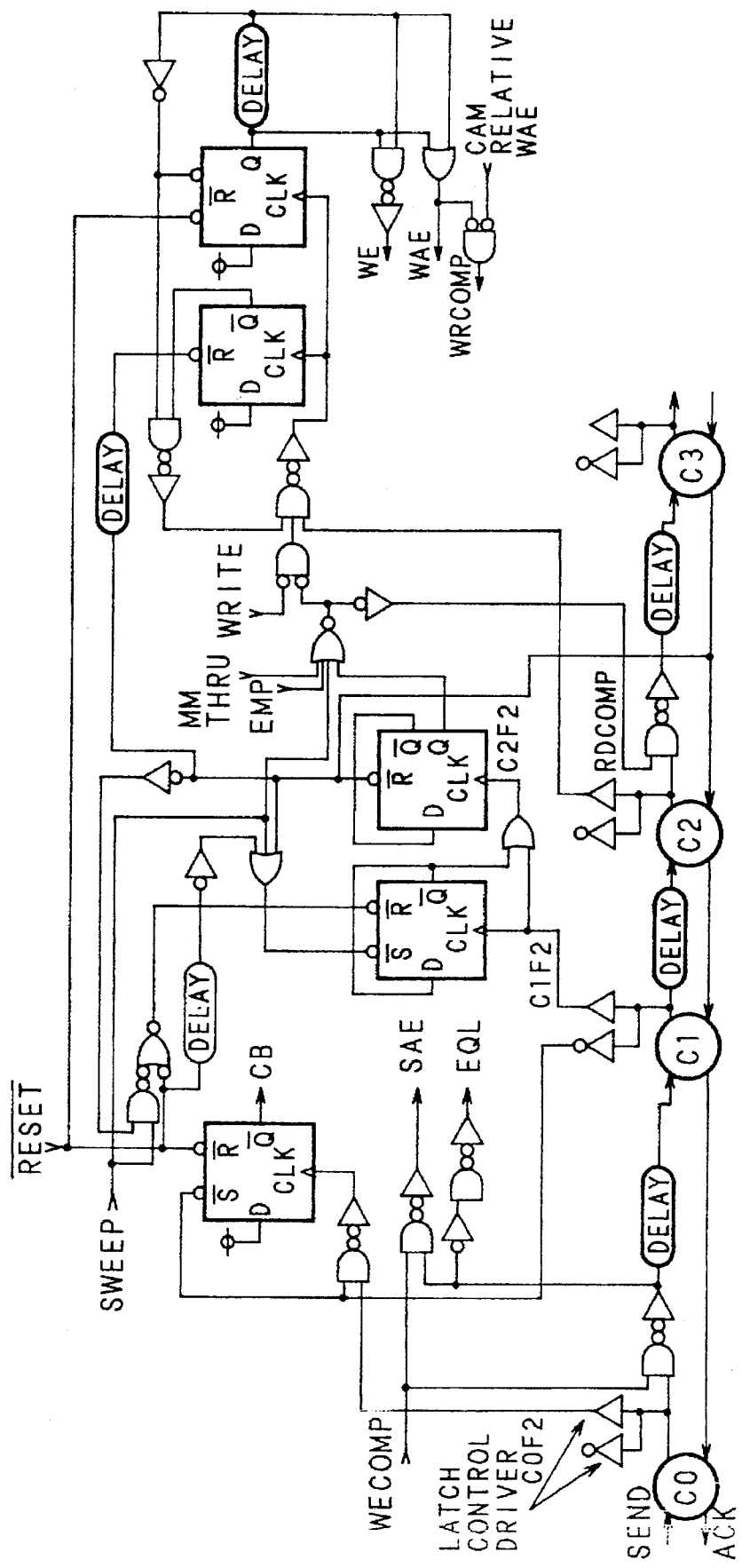
FIG. 29 is a circuit diagram showing the configuration of the logic circuit for memory access control of the hash memory.

FIG. 29 shows a logic circuit for generating a control signal for memory reading/writing. In the diagram, C0 to C3 denote data transfer control circuits. They are responsible for data transfer between two latches self-synchronously by handshake of SEND, ACK signals. DELAY denotes a delay circuit.

Of the signal lines shown in. FIG. 29, SWEEP is a signal relating to the prior competition detecting mechanism described below, and is a control signal for exception process execution to prevent competition of hash memories. The control by this signal is described in relation to the prior competition detecting mechanism.

The control of memory reading and writing is described below while referring to FIG. 29.

In the first place, reading is executed while the input packet is transferred from the data transfer control circuit C0 to C1. Signals relating to reading are EQL, SAE, CB, which are fed to signal lines of the same names in FIG. 28. That is, the EQL signal equalizes and precharges the bit line, the SAE signal makes the sense amplifier active, and the CB signal latches the read data upon fall thereof. When the packet is transferred from the data transfer control circuit C0 to C1, first the EQL signal changes from "1" to "0", and the SAE signal changes from "0" to "1". As a result, equalizing and precharging are stopped, and the sense amplifier is driven, so that reading is started. Next, the CB signal once changing from "0" to "1" when the packet reaches the data transfer control circuit C0 then changes from "1" to "0" again when the packet reaches the data transfer control circuit C1. As a result, the data being fed in the read data latch in the "1" period of CB signal is established, and a series of operation of memory reading is over.

On the other hand, writing is executed while the packet is transferred from the data transfer control circuit C2 to C3. Signals relating to writing are WE, WAE, which are respectively fed to inverting logic HWE, HWA in FIG. 28. To the inverting logic HWE, however, the inverting logic of WE signal is supplied. The WE signal drives the writing driver, and the WAE signal changes over from reading address to writing address. When the packet reaches the data transfer control circuit C2, except when there is no succeeding packet (EMP=1), the succeeding packet reaches the data transfer control circuit C1, and writing into memory and transfer into data transfer control circuit C3 wait for completion of memory reading. Such control is executed, of course, only in the case of memory writing packet in which the inverting logic WRITE signal is "0", and the packet passing through the matching memory unit MM is not caused to wait. Data transfer is stopped by RDCOMP signal. When memory reading of the succeeding packet is over, first the WAE signal changes from "0" to "1". In consequence, the address given to the memory is changed to the write address. Next, after completion of address decoding and after the delay time Da required for rise of specific word line, the WE signal changes from "0" to "1". Thus, the write driver is driven and data writing into the memory is executed. Afterwards, after the delay of Db, both WAE and WE signals change from "1" to "0", thereby completing memory writing action. During memory writing while WAE signal is "1", the WRCOMP signal becomes "0", and the succeeding data is not transferred from the data transfer control circuit C0 to C1, nor is memory read out.

Figure 30:
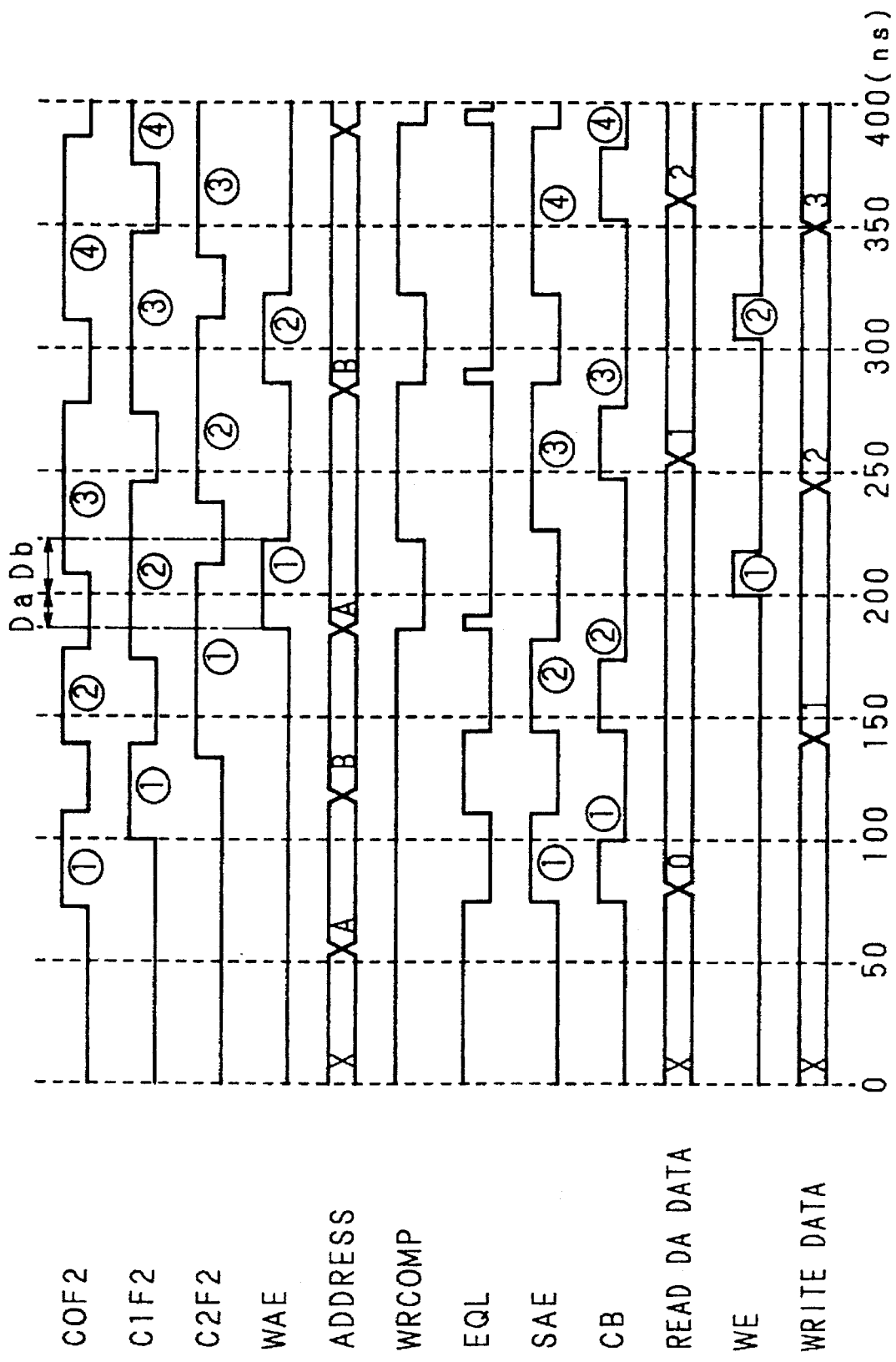
FIG. 30 is a timing chart of control signals of the hash memory.

This series of operation of control signals is shown in the time chart of FIG. 30.

To begin with, the first packet (1) reads out the value 0 from address A. Then, until the second packet (2) reads out the value 1 from address B, writing of the first packet must wait. When writing of the second packet is over, the first packet writes the value 1 into address A. After writing of the first packet, the third packet (3) reads out the value 1 from address A. After completion of reading of the third packet, the second packet write the value 2 in address B. Similarly thereafter, memory reading/writing will be done exclusively on continuously entering packets.

(4) Prior Cmpetition Detection of Hash Address

Figure 31:
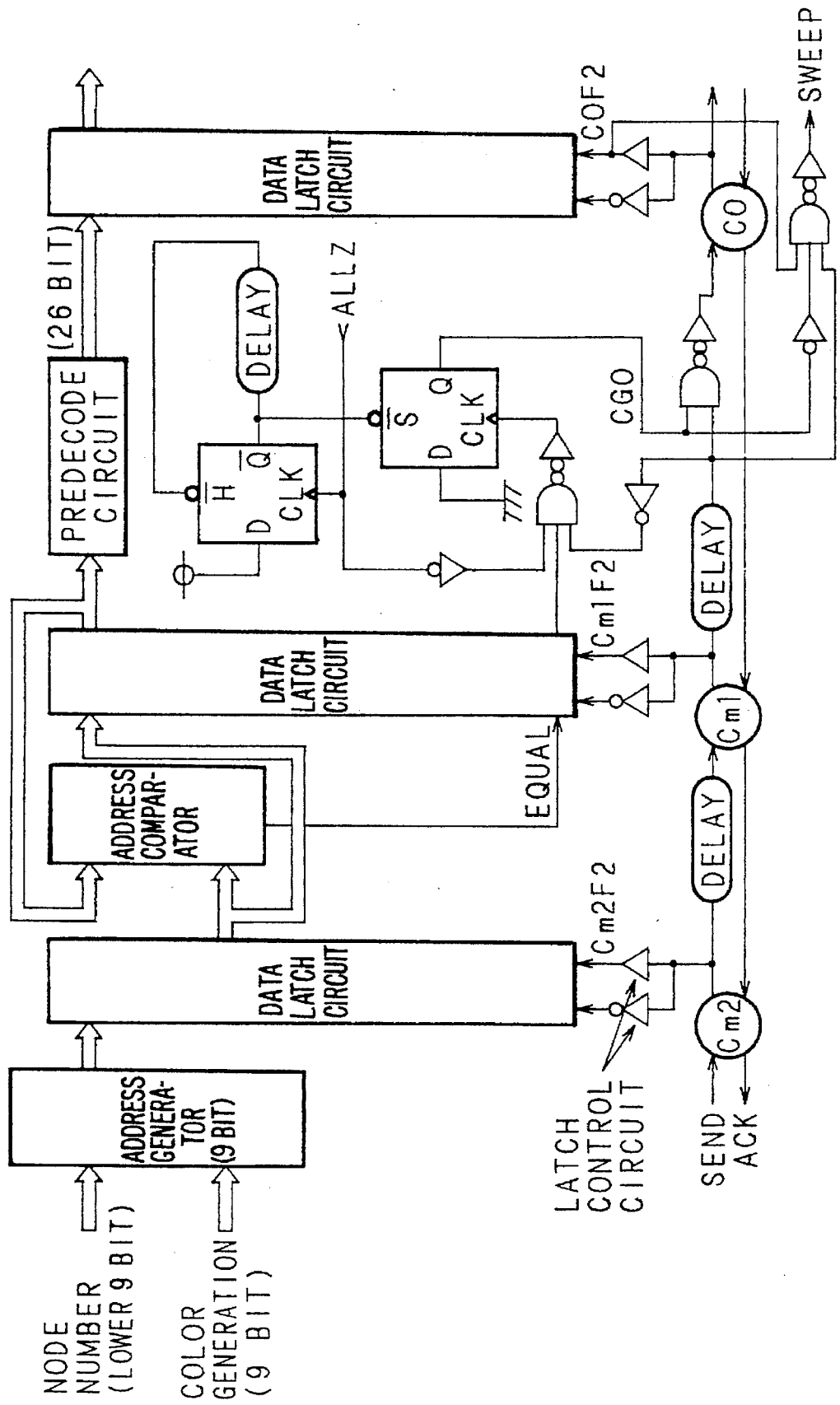
FIG. 31 is a circuit diagram showing the configuration of a prior competition detecting circuit of the hash address in the hash memory, FIG. 32 a schematic diagram for explaining the function of associative memory of the matching memory part.

The prior competition detection circuit of hash address is shown in FIG. 31. This processing is executed in three stages of the pipeline before the pipeline responsible for memory access as shown in FIG. 31.

First stage (Cm3): Generation of hash address

Second stage (Cm2): comparison of hash address

Third stage (Cm1):
(1) Pre-decoding of hash address
(2) Prior competition avoiding of hash address.

First relating to generation of hash address, it is generated by, out of the tag information of input packet, lower 9 bits of 21 bits of destination node number, and 9 bits of color/generation. That is, the lower 9 bits of the destination node number and 9 bits of color/generation are inverted in upper and lower positions, and EXNOR is obtained in each bit, thereby generating 9-bit hash address. By so setting, the hash address space of the destination node number during execution of single-generation program can be extended to the upper limit of 9 bits. What is more, since the bit positions of color/generation are inverted in upper and lower positions, in the case where the generations are fed continuously, the generated has address is more dispersed, and it is expected to reduce the hash conflicts between adjacent generations. By this hash address creating method, since hash conflict is expected to be suppressed, the capacity of the associative memory Which is the overflow receiving tray of hash conflict may be reduced to 32 words.

As for comparison of hash address, it is intended to compare between the 9-bit hash address latched in the data transfer control circuit Cm2 and the 9-bit hash address the preceding packet latched in the data transfer control circuit Cm1. In the data transfer control circuit Cm2, it is latched in the data latch circuit of transparent type, while it is latched in the data latch circuit of edge trigger type in the data transfer control circuit Cm1. The 1-bit EQUAL signal indicating whether the comparison is matched or not is latched in the data latch circuit of transparent type in the data transfer control circuit Cm1. In this address matching detection, in addition to address comparison, it is also detected that the both preceding and succeeding packets are dyadic operation instruction execution packets, and the EQUAL signal is "1" only when the addresses are matched and the both are dyadic operation instruction execution packets.

In the data transfer control circuit Cm1 stage, prior competition avoiding processing of hash address is executed together with pre-decoding of hash address. Pre-decoding of hash address consists of Y-decoding of 2 bits out of 9 bits of hash address and pre-decoding of 4 bits. Therefore, a total of 26 bits are delivered, that is, 4 bits of Y-decoding result, 16 bits of pre-decoding result, and 6 positive bits and 6 negative bits of 3 bits of undecoded address.

On the other hand, relating to the prior competition avoiding processing of hash address, when packets are successively coming into the matching memory unit MM, in the case where the same hash address is accessed consecutively, an error of reading out wrong data occurs because the priority is given to the reading of the succeeding packet in the matching memory unit MM even if the hash address must be read out after writing, in principle. To avoid this, preliminarily, two addresses accessed consecutively are compared, and when they are matched, the succeeding packet is temporarily withheld from inputting the reading stage until writing of the preceding packet is over. This is explained in the logic circuit diagram in FIG. 31, in which the ALLZ signal to show there is no preceding packet at all in the matching memory unit MM is 0 (preceding data present), the EQUAL signal to show matching of the comparison of hash addresses is "1", and the CGO signal becomes "0" when the preceding packet passes through the data transfer control circuit C0, thereby inhibiting the entrance of the succeeding packet attempted to access the same hash address as the preceding packet into the data transfer control circuit C0 stage. Then, as the writing of the preceding packet is over and the ALLZ signal changes from "0" to "1", the CG0 signal changes from "0" to "1", permitting the entrance of the succeeding packet into the data transfer control circuit C0 stage, so that memory reading is executed.

As mentioned above, in the matching memory unit MM, writing of the preceding packet must await the completion of reading of succeeding packet. Accordingly, the prior competition avoiding process of hash address mentioned above is contradictory. To solve this problem, as exceptional processing, SWEEP signal is used. More specifically, setting the CG0 signal to "0" for the succeeding packet to prohibit data transfer, and only when the succeeding packet is actually waiting, the SWEEP signal is set to "1" and the memory writing of the preceding packet is executed by force (without waiting for completion of reading of the succeeding packet). Thus, hash address competition may be preliminarily avoided without causing dead lock.

The associative memory in FIG. 22 is explained below.

(1) Function of Associative Memory

The associative memory is used as the overflow receiving tray of the packet causing hash conflict when creating operand pair by using the hash memory. That is, the packet causing hash conflict awaits in the associative memory, and the operand pair is generated. Access to the associative memory is done parallel to access to the hash memory. That is, reading is executed at the fourth stage of the pipeline stages, and writing is executed at the sixth stage. Processing of memory reading at the fourth stage is executed every time the packet is entered in both hash memory and associative memory, but processing of memory writing at the sixth stage is executed only on either hash memory or associative memory. Of course, memory writing is not executed on the packet passing through the matching memory unit MM. To which memory to write at the sixth stage is judged at the fifth stage. This judgment is based on the memory reading result at the fourth stage, and the result of comparison of tag information of hash memory and tag information of input packet at the fifth stage. The determination table of processing used as the basis of this judgment is shown in FIG. 32.

In FIG. 32, in generation of operand pair in the column of processing content at the sixth stage, of the content of the read-out memory, the operand information is merged into the packet to generate the operand pair. At this time, to clear the memory word being read out, writing of "0" is executed on PB of the word. This is the same in both hash memory and associative memory. Therefore, even in the case of processing for operand pair generation, memory writing is executed.

(2) Configuration of Associative Memory

Figure 33:
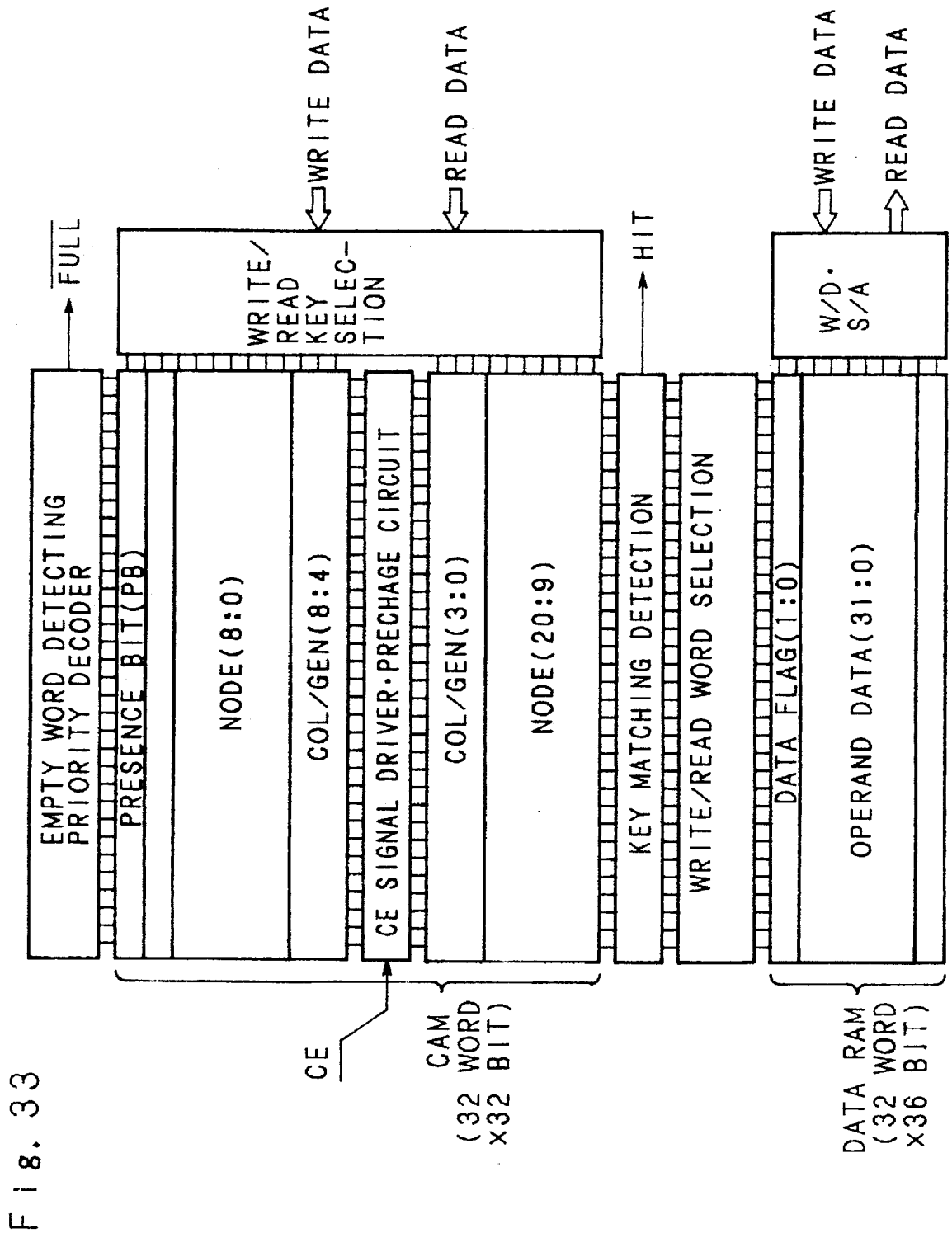
FIG. 33 is a block diagram showing the configuration of the associative memory.

The configuration of associative memory is shown in FIG. 33.

As shown in FIG. 33, the associative memory is composed of CAM unit of 32words×32 bits, and data RAM unit of 32 words×36 bits. By the CAM unit and the key matching searching unit, it is judged whether the information equal to the given 32-bit tag information (key) is present in the already written 32 words. The data RAM unit is connected to the CAM unit in the word line direction, and the operand information corresponding to the key of the CAM unit is stored. Connection of CAM unit and data RAM unit is changed by the write/read word line selector, and when reading out the match line of the CAM unit and the word line of the data RAM unit are connected and when writing in the both word lines are connected to the word line determined by the empty word detection priority decoder.

(3) CAM Unit

Figure 34:
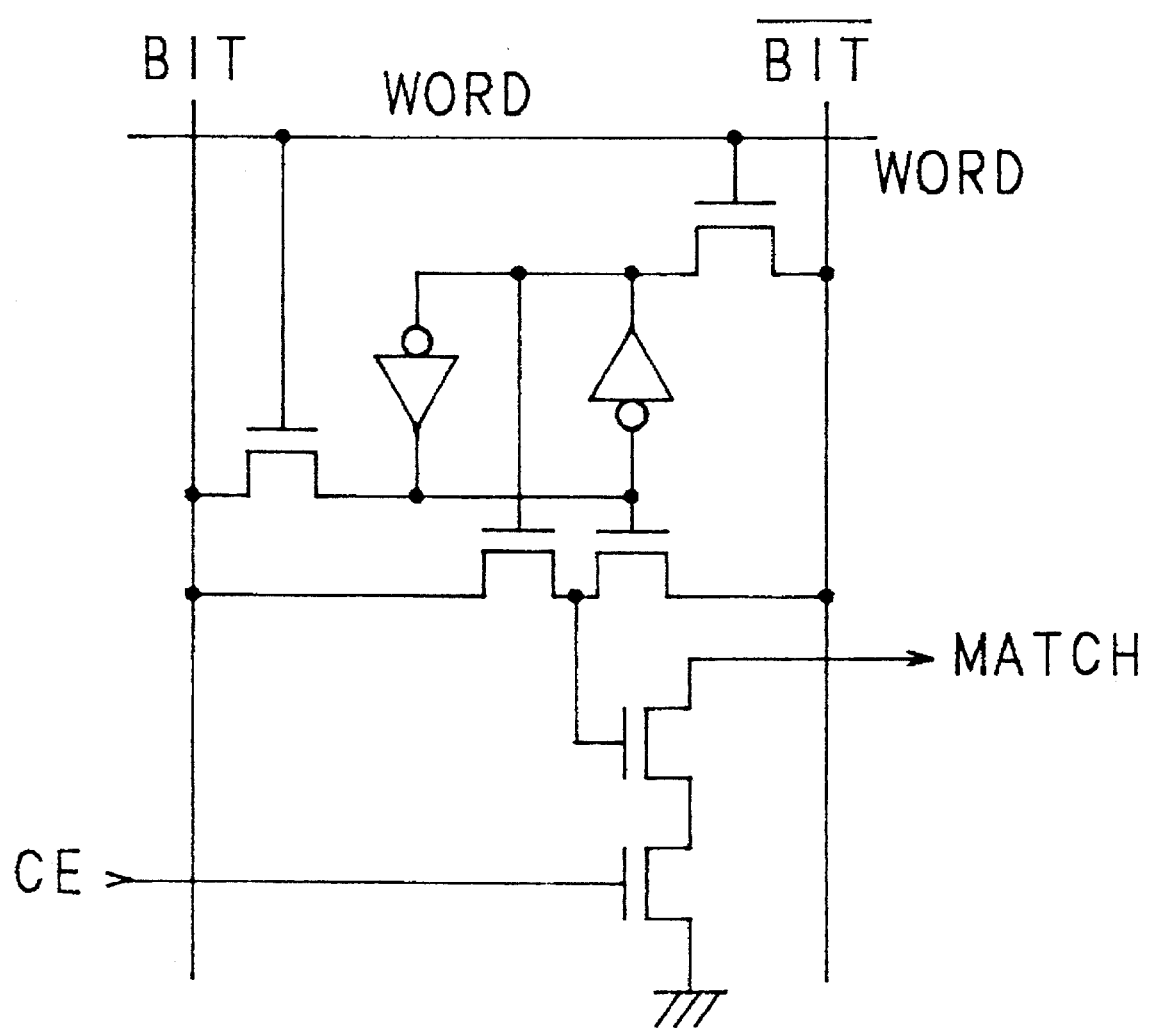
FIG. 34 is a logic circuit diagram of a CAM memory cell of the matching, memory part.

The information given to the CAM unit as keys consists of a total of 32 bits, comprising 1 bit of presence bit (PB), 21 bits of destination node number (NODE), 8 bits of color/generation (COL/GEN), and 1empty bit. There keys must be changed over when writing and when reading, which is executed by the write/read selector. The PB given as key is always "1" when reading, but when writing it is different between the case of writing the input packet into the associative memory and the case of generating the content read out from the associative memory and operand pair. That when writing the input packet, "1" is written in, and when generating the operand pair, two is written in. Every bit of the given key is compared by the full-CMOS CAM cell as shown in FIG. 34. Match lines are connected for the portion of 32 bits in the word line direction, and when all bits on a same word line are matched, the coincidence is detected when the precharged match line is not discharged. Control of precharge and discharge of match lines for detecting coincidence is executed by CE signal (see FIG. 35). That is, when CE=0, the connection of the data RAM unit side of the match line is cut off, and the match line is precharged. When CE=1, the data RAM unit side of the match line is connected, and the CE inputs of all CAM cells are set to "1", and the match line is discharged. The driver and precharging circuit for every word of CE signal are attached to the middle of the match line of the CAM unit.

(4) Empty Word Detection Priority Decoder

Figure 36:
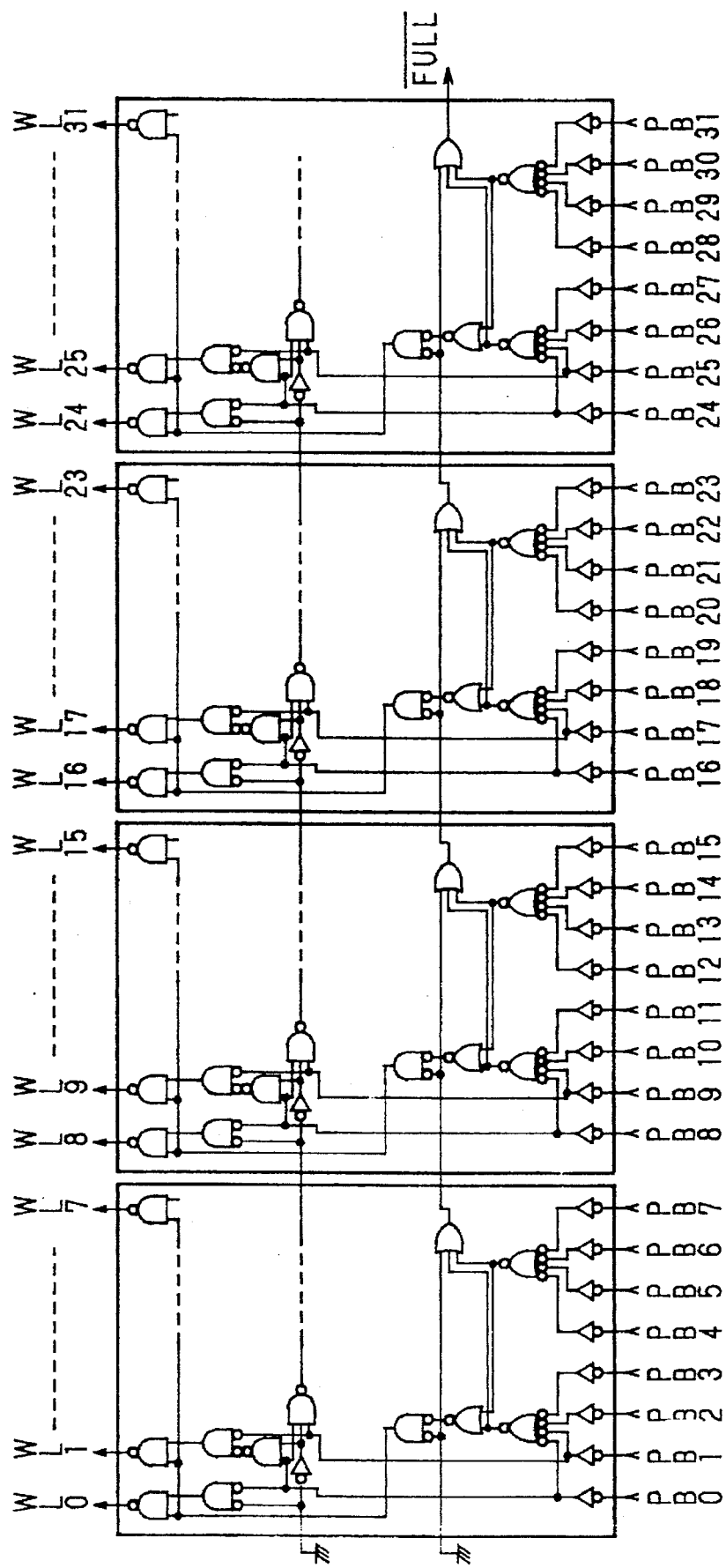
Figure 37:
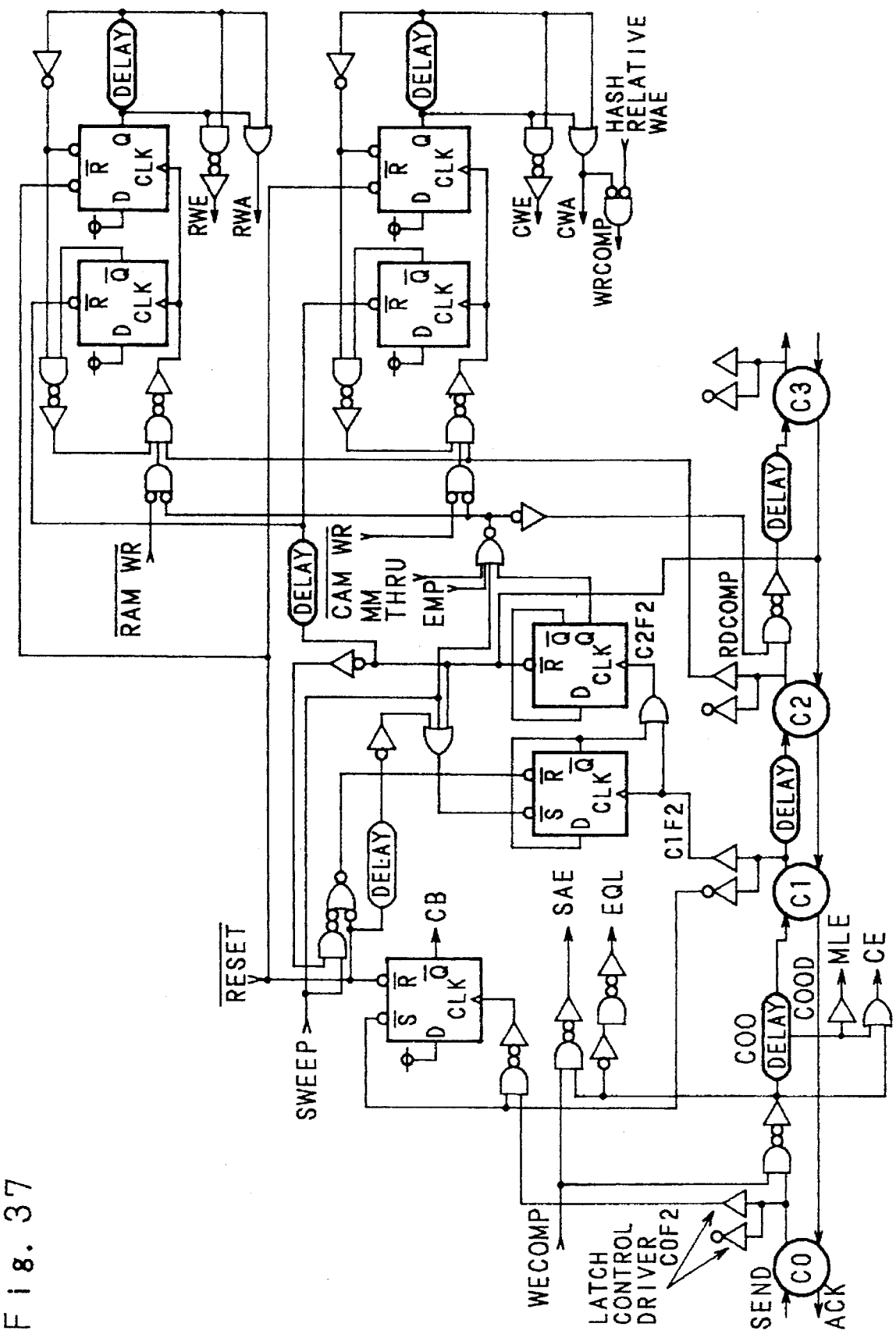
FIG. 37 is a logic circuit diagram of a memory access control signal generating circuit to the associative memory.
Figure 38:
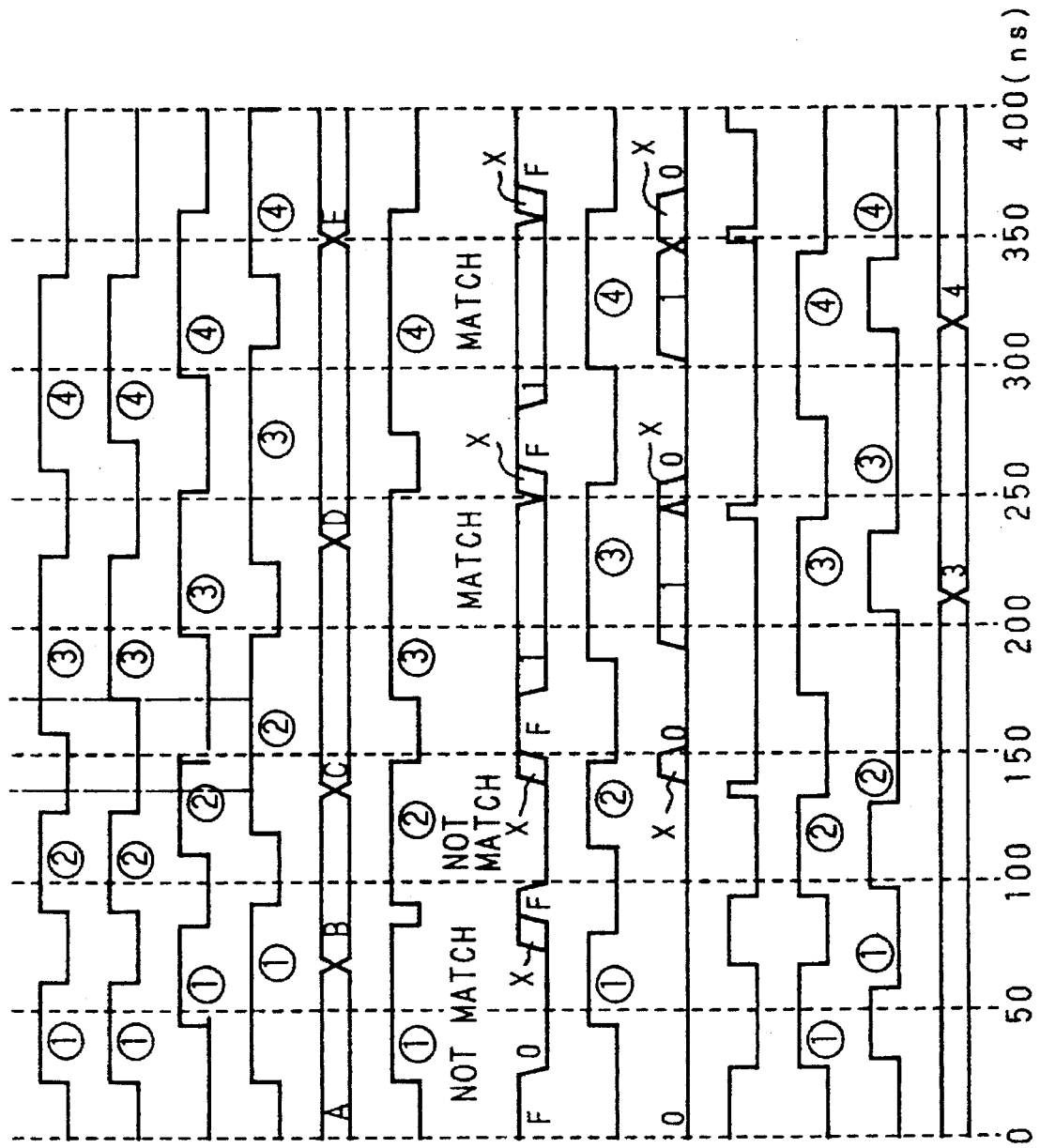
FIG. 38 is a timing chart of reading out the associative memory by the memory access control signal generating circuit on the associative memory.

For selecting word to which key is written in, an empty word detection priority decoder is used as shown in FIG. 36. This circuit is designed to select the leftmost word of empty words by observing the PB of each word. To suppress delay due to propagation of carry, 32 words are divided into four blocks of 8 words each, and the presence of the priority decoder in every block and empty word in every block is retrieved simultaneously, and the priority decoding result of the block having an empty word at the leftmost side is employed. When empty word is not found in any block, the inverting logic FULL signal tells that the associative memory is full. This result of processing is latched by the data latch of edge trigger type at rise of the data transfer control signal C2. When writing the associative memory, this latched result is directly coupled to the word lines of both CAM unit and data RAM unit.

(5) Key Matching Retrieval

In the key matching retrieval unit, it is checked in the case where the same key as the key assigned to the associative memory has been already written in or not, and when found, the HIT signal is set to "1". To the key matching retrieval unit, after precharging the 32 match lines bundled in every word in the CAM unit, the compared data is entered after being latched in the data transfer control circuit C1. Among the inputted 32 match lines, even when one line is not discharged, the. HIT signal is set up and delivered. This circuit is realized by NOR-NAND-NOR circuit.

(6) Data RAM Unit

In the data RAM unit is stored the operand information corresponding to the tag information written as the keys in the CAM unit at the time of writing into the associative memory of the input packet. In every word, 32 bits of operand data and 2 bits of data flag are stored, or 34 bits in total. The memory peripheral circuits, that is, the equalize-percentage circuit, sense amplifier, read data latch and write driver are exactly the same as the peripheral circuits of the hash memory. In the data RAM unit, since it is designed to access the word lines directly by the match line output of the CAM unit, address decoder is not used.

(7) Connection of CAM Uit and Data RAM Unit

Figure 35A:
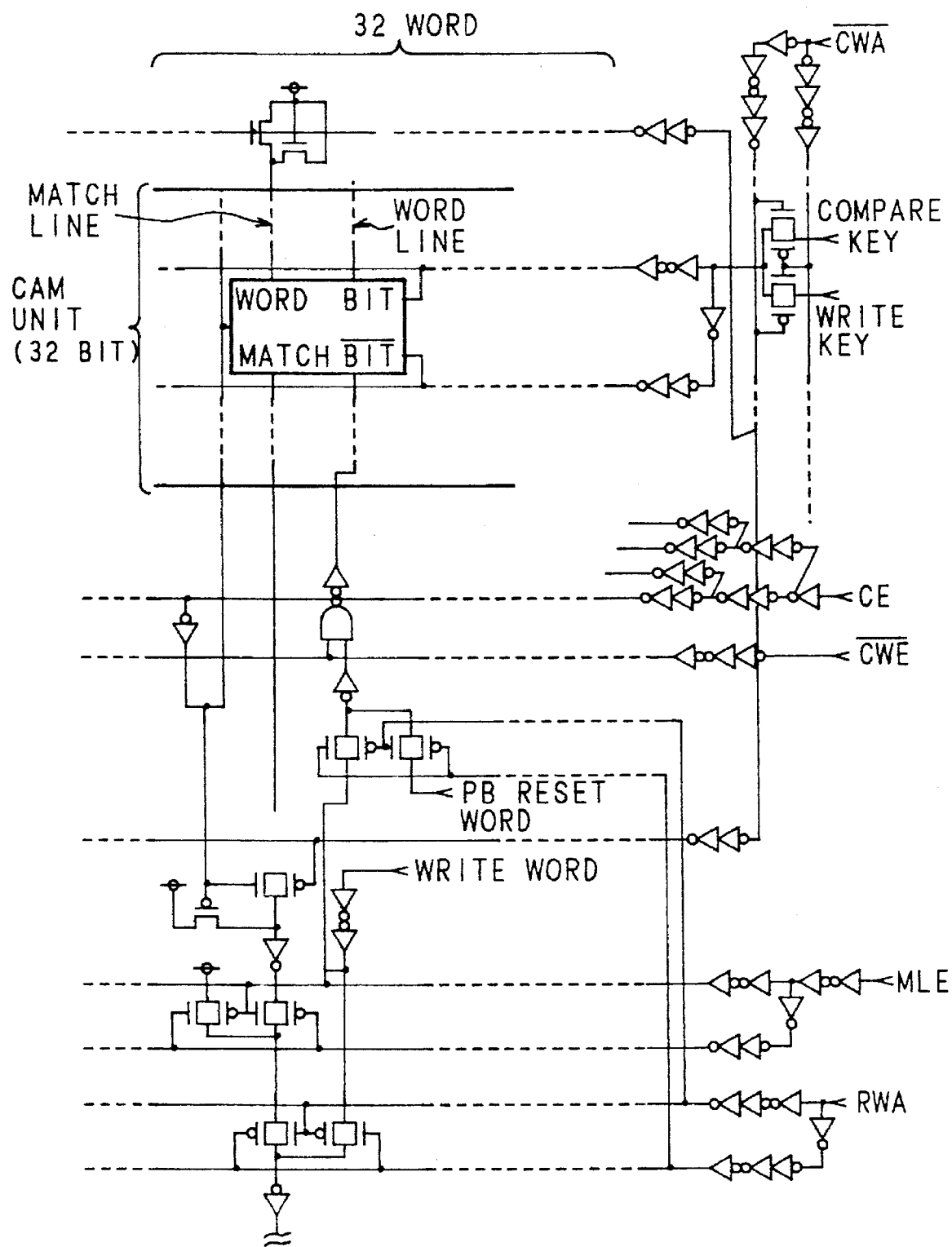
Figure 35B:
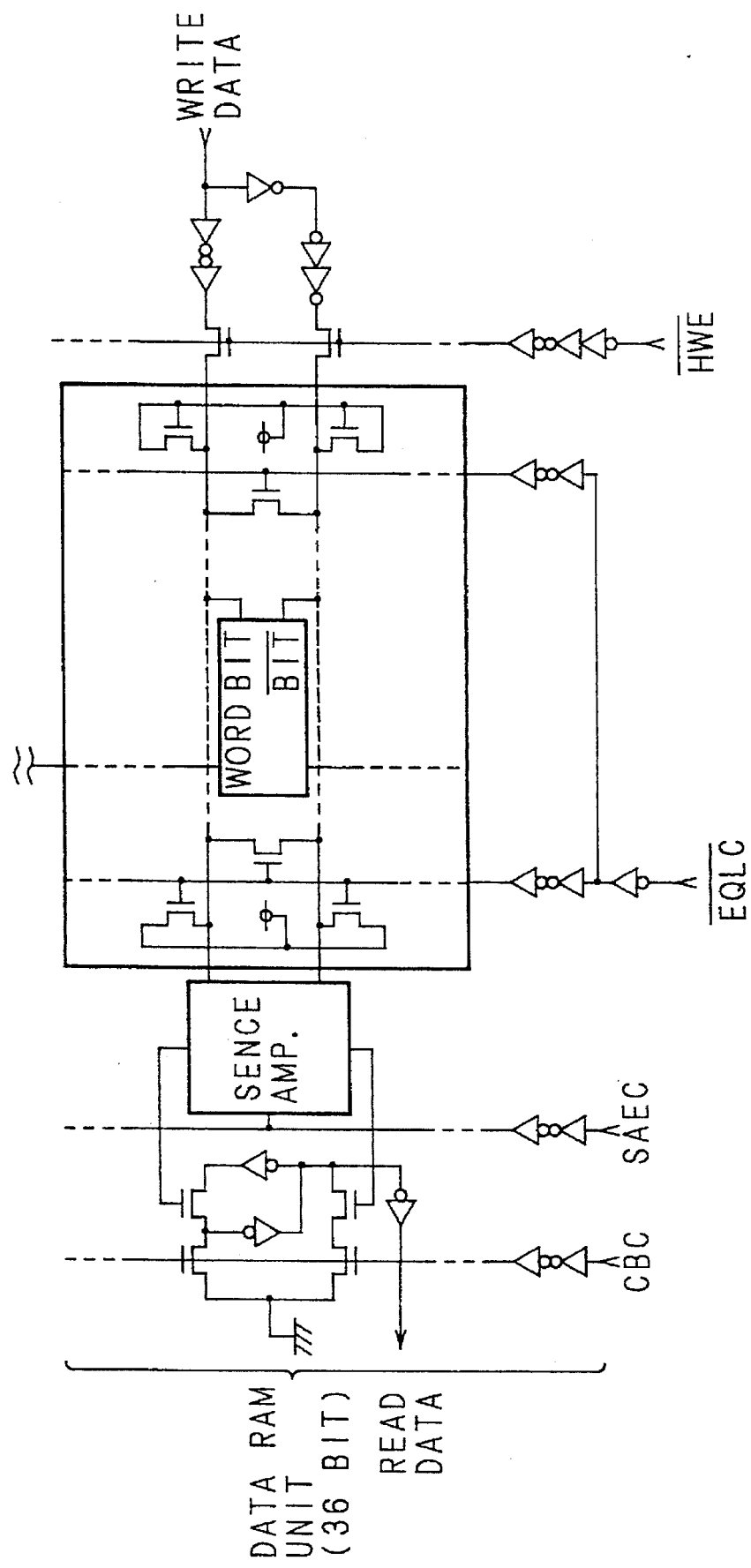

The CAM unit and data RAM unit mentioned above, and their connection to be described below are shown in FIG. 35.

This circuit is basically designed to connect the match line of the CAM unit and the word line of the data RAM unit when reading out by RWA signal (RWA=0), and to connect with the write word determined by the empty word detection priority decoder when writing (RWA=1). When reading at RWA=0, all 32 match lines of the CAM output are once precharged to level "1". Accordingly, in the case where the match line of the CAM unit and the word line of the data RAM unit are merely connected, all word lines of the data RAM unit are started up, and the data in the data RAM unit are destroyed. Therefore, the match line of the CAM unit and the word line of the data RAM unit must not be connected unless discharge of match lines in the CAM unit is completely over. Discharge of match lines in the CAM unit is started by the rise of the CE signal. It is therefore controlled to cancel the match line output of the CAM unit by the signal MLE which is started up after a delay corresponding to the complete termination of the discharge of match lines from the rise of CE signal, and lowered in synchronism with the fall of the CE signal.

Changeover of the word line input on the CAM unit is executed by the RWA signal, same as in the data RAM unit. Accordingly, to the word line of the CAM unit, the output result of the empty word detection priority decoder is supplied when writing into the data RAM unit, and otherwise the result of latching the information of the match line used in key matching retrieval further in the data transfer control circuit C2 is given. In the latter case, the result of latching the information of match line used in key matching retrieval further in the data transfer control circuit C2 refers to the state of the match line discharged after key comparison in the CAM unit When the packet passing through the data transfer control circuit C2 and going to write in the memory or create operand pair has passed through the data transfer control circuit C0. Writing into the data RAM unit is executed only when writing the operand information of the input packet into the associative memory, and when generating the reading content of the associative memory and operand pair, writing into the data RAM unit is not executed.

On the other hand, writing into the CAM unit must be executed, not only when writing tag information of the input packet into the associative memory, but also when generating the reading content of the associative memory and operand pair. Writing into the CAM unit when creating the reading content of the associative memory and operand pair is to write "0" into the PB of the word reading out the associative memory to invalidate the information of that word. Which word is the word reading out the associative memory at this time is indicated by the result of latching the information of the match line used in the key matching retrieval in the data transfer control circuit C2 as mentioned above. Therefore, when generating the reading content of the associative memory and operand pair, by executing writing only on the CAM by setting PB to "0", the word of the associative memory being read out can be cleared.

(8) Timing of Associative Memory Control Signal

FIG. 30 shows a generating circuit of memory access control signal on the associative memory.

As for EQL, SAE, CB of control signals relating to memory reading out, the origins are common with the hash memory. As for CWA, CWE, RWA, RWE of control signals relating to memory writing in, the configuration of the generating circuit is same as the hash memory, but between the hash memory and the CAM unit and data RAM unit, the generating conditions of these control signals are different, and they are provided independently. That is, the condition of becoming active of CAMWR (inverting), RAMWR (inverting) signals in FIG. 30 is different from the case of the hash memory.

Aside from the control signals also used in the hash memory as mentioned above, there are also control signals characteristic of the associative memory. These are the CE signal for controlling precharging and discharging of match lines of the CAM unit, and the MLE signal for controlling the connection of match line after discharge of match line and the read-out line of the data RAM unit. These signals are generated from the COO signal after gating the SEND output of the data transfer control circuit C0 by WRCOMP signal, and the COOD signal of delaying this signal by delay circuit DELAY. That is, at rise of COO signal, the CE signal changes to "1", and at rise of COOD signal after a certain delay, the MLE signal also changes to "1". Afterwards, at fall of the COOD signal, both CE and MLE signals change to "0".

The time chart of reading out the associative memory by this associative memory control signal generating circuit is shown in FIG. 31. Four inputted are entered sequentially, and in the first two packets keys are not matched and nothing is read out, while in the latter two packets, word 1 and word 2 are matched respectively, and data 3 and data 4 are read out.

The data memory unit DM mentioned above is additionally explained below. The data memory unit DM incorporates a memory of, for example, 32 bits×1k word inside the chip. To control the memory access, four address generators are incorporated. The operation of the data memory unit DM may be roughly classified into the normal mode and bank mode, and the form of use of memory varies in each mode. FIGS. 30 and FIG. 31 are schematic diagrams showing the connective relation of the address generator and built-in memory in each operation mode.

Figure 39:
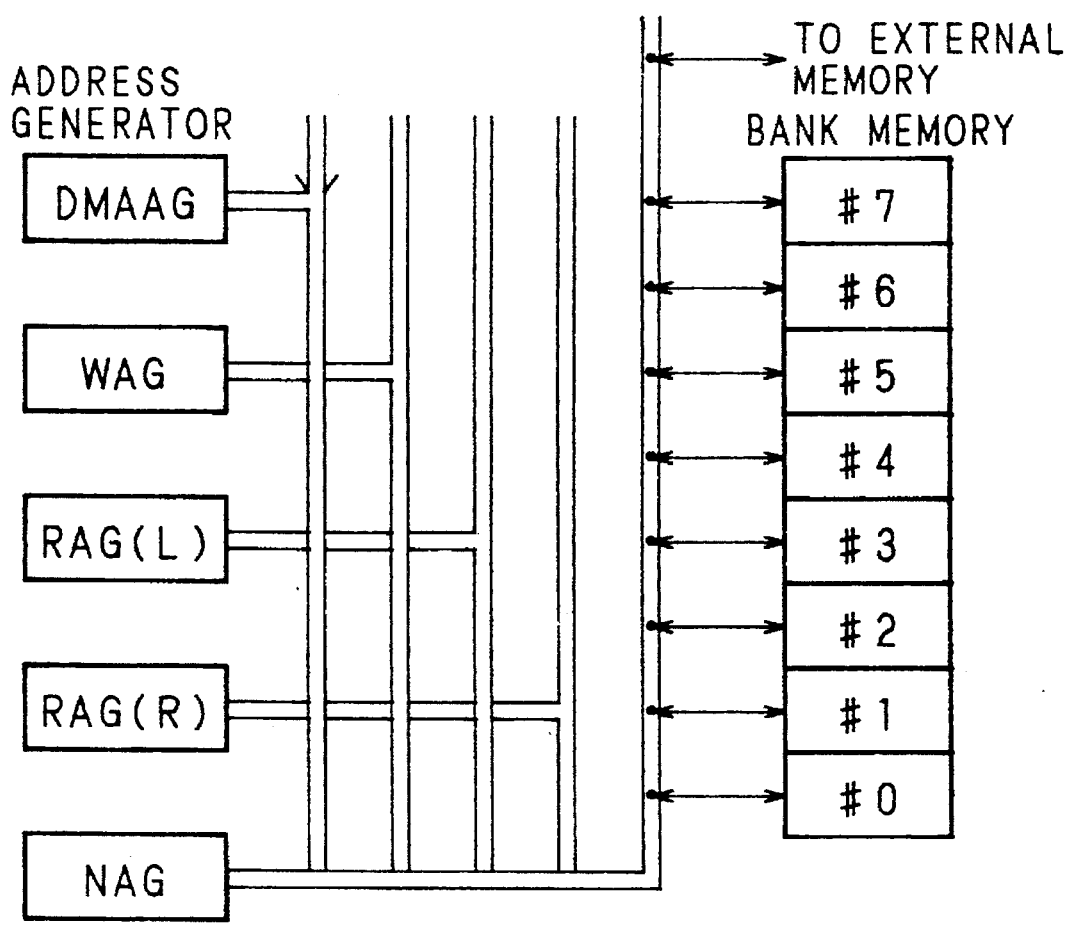
FIG. 39 is a schematic diagram showing the mode of use of memory in normal mode in the data memory part, FIG. 40 schematic diagram showing the state of use of memory in bank mode in the data memory part.

(1) Normal Mode (see FIG. 39)

Under the normal mode, the built-in 1k word memory is used as a single memory. By one packet inputted in the data memory unit DM, memory access is done once (scalar access).

An address space exceeding 1 k word can be extended to outside.

Figure 40:
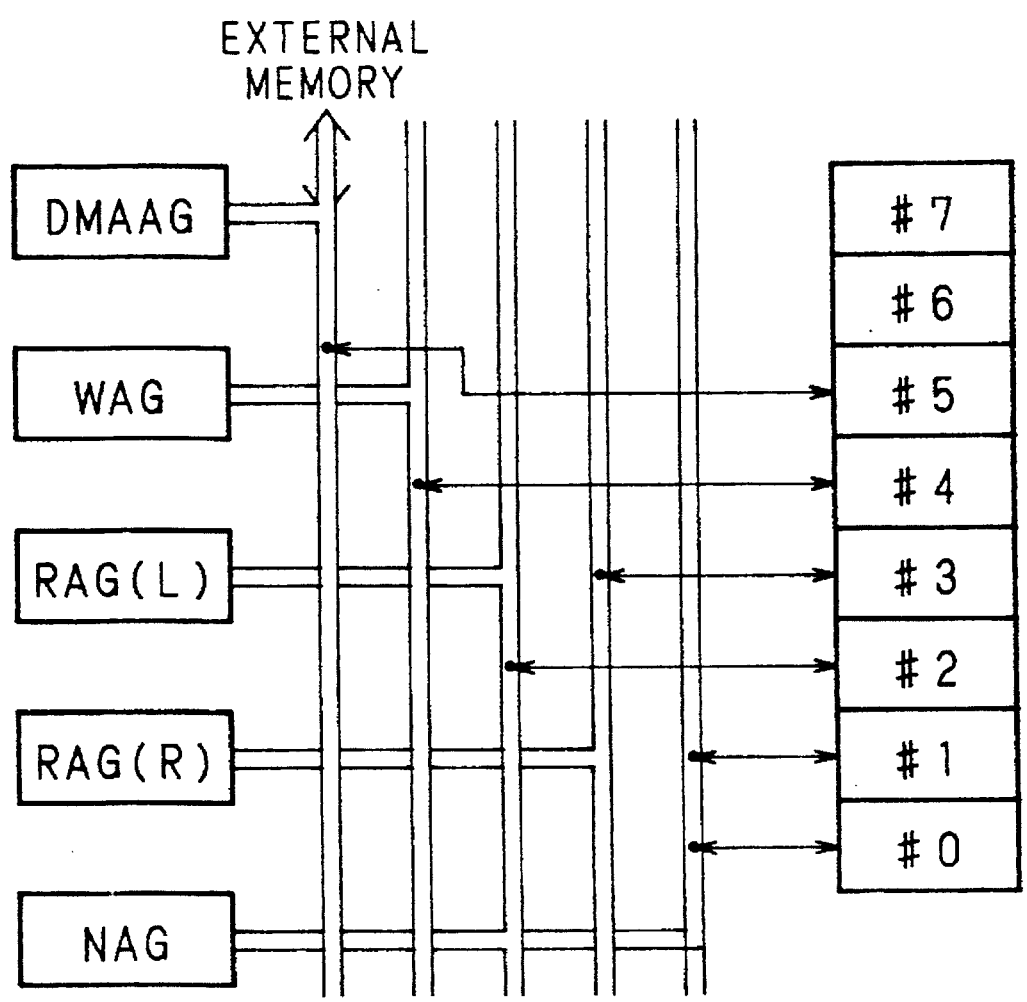

(2) Bank Mode (see FIG. 40)

Under the bank mode, the built-in memory is divided into banks of 128×2 words, 128×3 words, and so forth in the units of 128 words each, and these banks are connected to any one of the address generators, so that plural memory accesses can be executed simultaneously in the data memory unit. By making use of this function, the vector operation is realized. Practically, the vector operation is realized by using each bank as the so-called vector register.

In the vector operation, the data to be operated are sequentially read out and operated from the specified bank, and the operation result is stored, the data is transferred from the external memory to fill up the bank memory, and the data is written out from the bank memory to external memory (DMA transfer), which can be all executed simultaneously.

The scalar access can be executed simultaneously, but the address space is limited to 256 addresses (address 0 to address 255), and when a packet accessing other address is inputted, the packet flag (MEM_ACCESS_VIOL bit of selection code) is set up, and the memory access is disabled.

The address generator built in the data memory unit DM and its role are explained below. Here, referring to the address generators shown in FIG. 13, the names representing their functions are attached.

A normal address generator (NAG) is intended to access a memory by specifying the address, which controls the scalar access. (Corresponding to AG3 in FIG. 13)

A read address generator (RAG) is to control continuous reading of the vector operation data under the bank mode, and for dyadic operation, two memory banks may be assigned for a first operand and second operand. (Corresponding to AG1 and AG2 in FIG. 13)

The write address generator (WAG) is to control storing of the vector operation result under the bank mode. (Corresponding to AG4 in FIG. 13)

The DMA address generator (DMAAG) is to control DMA transfer with external memory in the bank mode. (Corresponding to AG5 in FIG. 13)

Figure 41:
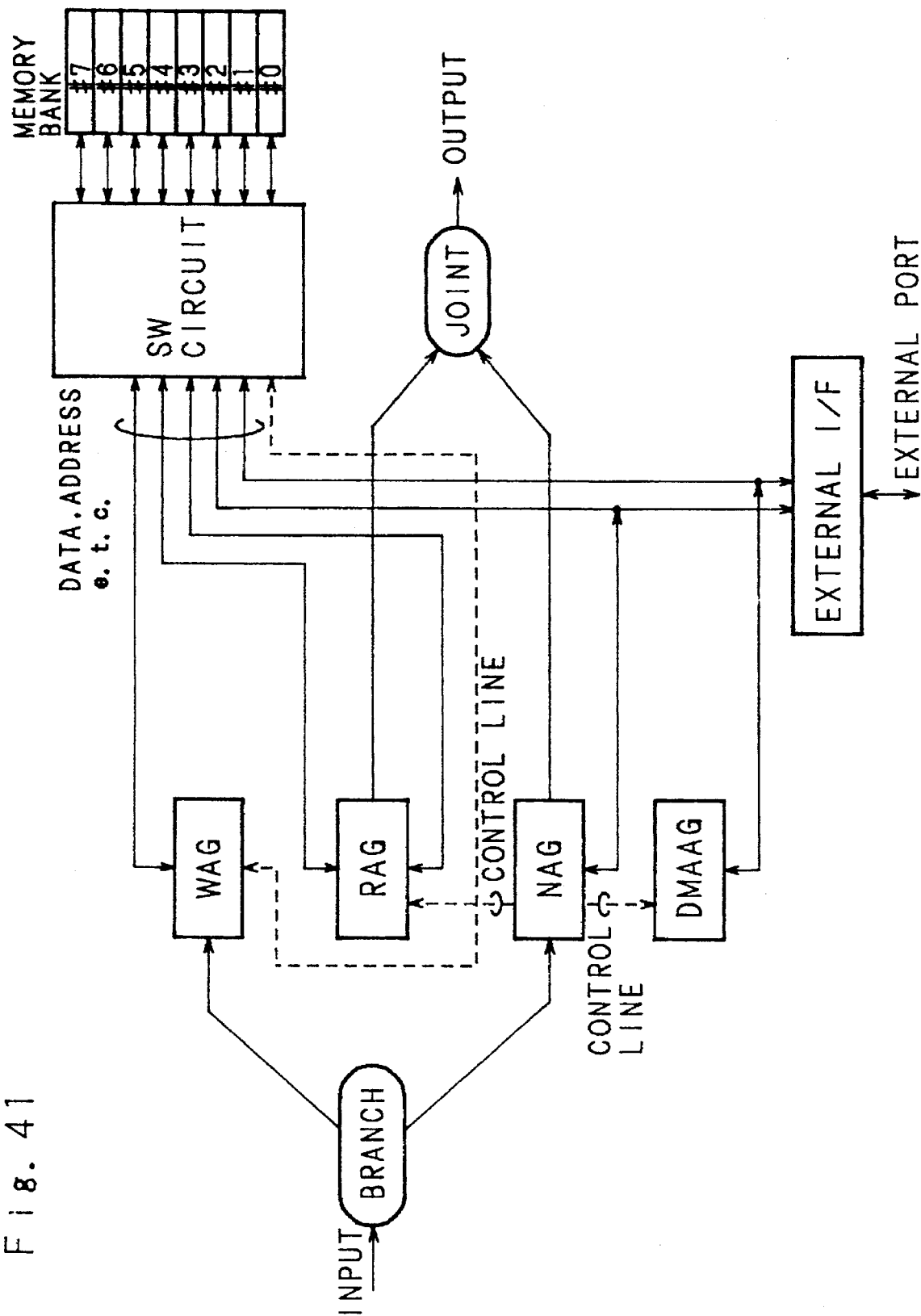
FIG. 41 is a block diagram for explaining the operation of the data memory part.

A block diagram of data memory unit DM is shown in FIG. 41. FIG. 41 is a block diagram drawn by paying attention to the relationship of the address generators and the self-synchronous data transfer lines, and is equivalent to the block structural diagram of the data memory unit DM shown in FIG. 13.

In FIG. 41, the data memory unit DM comprises #0 to #7 memory banks of 128 words each, a data transfer path extending from the input unit through the branch unit, NAG and joint unit to reach the output unit, a data transfer path extending from the input unit through the branch unit to terminate at the WAG, a data transfer path starting from the RAG and running through the joint unit to reach the output unit, address generators NAG, RAG, WAG, DMMAG, five sets of address bus and data bus for connecting SW circuit and external I/F circuit, address bus and data bus coming in and out from address generators, and SW circuits for specifying the connection of memory banks. The branch unit branches the input packet into WAG when the VECT flag value of the input packet (corresponding to the special flag in FIG. 50) is "1", and transfers to the NAG side otherwise. Meanwhile, the control register file shown in FIG. 13 is not displayed here because it is inside the address generators and SW circuit.

The SW circuit in FIG. 41 corresponds to two matrix switch circuits in FIG. 13. The joint unit in FIG. 41 corresponds to the arbiter in FIG. 13.

When a packet of which VECT flag value is "1", that is, a vector operation packet is inputted, this packet branches off to the WAG side with VECT=1 as the branching condition in the branch unit, and the vector data is written into the memory bank. At this time, the inputted packet is erased after the writing process.

On the other hand, when a packet of which VECT flag value is 0, that is, a scalar operation packet is inputted, this packet is transferred to the NAG in the branch unit, and is processed according to the operation code, and is delivered through the joint unit.

When a trigger instruction (details given later) which is a read start instruction of the data to be operated for vector operation is issued, continuous reading of memory bank is started by the read address generator RAG, and the data being read out is combined with tag information such as operation code in the operation unit FALU to form packet data, which is transferred to the joint unit. In the joint unit, the scalar operation packet transferred from the normal address generator NAG and the vector operation packet transferred from the read address generator RAG are jointed in one data transfer route to be delivered through the output unit. Setting of each address generator and control register in the SW circuit is executed by SETAG instruction. The SETAG instruction is executed by the normal address generator NAG, but the set data in each register is transmitted to each register through the data bus connected to the normal address generator NAG.

Shown below is the relation between the state of the SW circuit shown in FIG. 41 and the operation mode of the data memory unit DM.

FIG. 39 denotes the mode of use of memory under the normal mode state.

Under the normal mode, the 1k word built-in memory can be accessed only by the normal address generator NAG, and the input packet can access a single memory up to 1k word inside as the memory, and also access the memory space of 16M words at maximum after 1k word outside the chip.

FIG. 33 shows an example of bank mode state.

Under the bank mode, the memory can be allocated to each address generator in the bank unit of 128 words, except for the exclusive banks (banks #0, #1) connected only to the normal address generator NAG.

In FIG. 33, banks #2, 3 are allocated to the road address generator RAG, bank #4 to write address generator WAG, and bank #5 to DMA address generator DMAAG. In FIG. 6, meanwhile, BK1 to BK8 correspond to banks #0 to #7 respectively in FIGS. 34, FIG. 32, FIG. 33.

The instruction execution condition of the data memory unit DM is explained below. The data memory unit DM refers to the selection code aside from the operation code, and, does not execute the instruction when the selection code value is other than the combinations below even when the operation code of the input packet is DM instruction.

DM instruction execution prohibit condition:
IM=0 AND (HASH=1 OR (PE=1 AND PM_Thru=0))

FIGS. 35 and FIG. 36 show lists of specifications of data memory access related instructions (DM instructions). The DM instructions may be classified as follows.

(A) Memory Access Instruction

*Data Memory Write/Read Instruction

In this instruction, the address can be specified by the immediate value buried in the operand field, program. In the bank mode, checking the address to be accessed, and when accessing an address exceeding 256 words, the MEM_ACCESS_VIOL bit of the selection code is set, and the memory access is not executed. The packet in which MEM_ACCESS_VIOL bit is set is not processed on the ring until returning to the normal mode after termination of vector operation, but only circulates. The addressing modes also include the base address addition mode.

*Test and Set Instruction

This instruction is realized by sequentially executing two instructions, TST&LOC, SET&ULOC, and shared resource control is enabled. The shared resource is represented by one address in the data memory unit DM, and it is controlled so that only the task successful by this instruction in this address can gain the resource.

*Memory Automatic Access by Selection Code

When the selection code satisfies the following condition, the data memory unit DM interprets the right data as the pointer of the memory, and replaces with the content indicated by the pointer.

(1) When the selection code satisfies the condition of IM=1 AND HASH=0, the value adding the base address to the right data is used as the address, and the result of reading out the data memory unit DM is stored in the right data.

(2) When satisfying the condition of PE=0 AND PM_Thru=1, the right data is used as the address, and the data memory unit DM is read out, and the result is stored in the right data. At this time, PM_Thru→0.

*Distributed Shared Memory Access Mechanism

In the multiprocessor system, the address possessed by the packet for accessing the distributed shared memory is composed of 32 bits in total, consisting of upper 8 bits for the PE identification number and lower 24 bits for physical address.

When large-scale data is distributed in each PE and processed, the process of accessing the data memory unit DM of different PE on the basis of the result obtained by address calculation and returning to the own PE is supported in the hardware.

This mechanism is the coordinated operation with not only the data memory unit DM but also other blocks, and the detailed operation is explained later.

The data memory unit DM operates as follows.

A packet for distributed shared memory access is inputted, the data memory unit DM is accessed, and upper 8 bits (return end PE number) of the left data are saved into upper 8 bits of right data.

The packet of which selection code is PE=1 AND PM_Thru=0 is passed by NOP.

(B) Vector Operation Related Instruction

*Address Generator Mode Register Setting Instruction (SETAG)

This instruction is intended to specify the parameter under bank mode.

This is to set the address generator group for controlling the vector operation, the number of times of reading and addressing mode and others for RAG, WAG, DMAAG, and specify allocation of memory bank to the address generators.

The register addresses (specified by the right data field) 70h to f-th are reserved for peripheral chips such as DMAC, and the bit pattern of the left data is directly delivered from the data port.

*Address Generator Trigger Instructions (TRGRB, TRGRB2, TRGDMA)

The instruction is intended to specify start of continuous memory accesses to the address generator, and one or both of RAG and DMAAG.

*Address Generator Check Instruction (CHAG)

This instruction checks When the memory accesses by the number of times specified by RAG, WAG, DMAAG by SETAG instruction are over or not, and the moment this instruction is issued, the running state of the address generator is stored in the left data (see footnote to FIG. 33).

The corresponding relation of address generator and memory bank is explained below.

Under the bank mode, it is necessary to set the mode register in the address generator and the bank register for specifying the bank memory allocation, by the SETAG instruction. Here, the specification of the address generator, and setting method of mode register required to be set in the bank mode are explained.

(A) Allocation of Memory Bank

Figure 44:
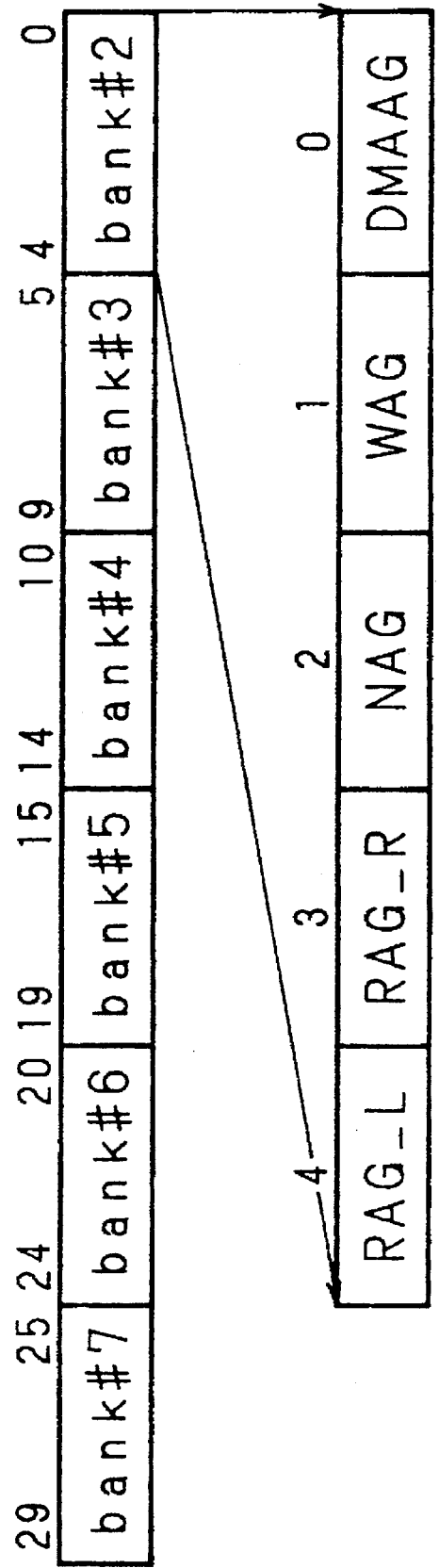

In order to allocate a memory bank to be accessed by the address generator, it is necessary to set the bank register. The bank register is a 30-bit register, having a format as shown in FIG. 44.

Of 5 bits of field bank #n, only the bit of the address generator allocated with the bank #n is set to "1", and the others are set to "0" (n=2 to 7). Meanwhile, banks #0, #1 are always allocated to the normal address generator NAG.

When initializing, all banks are allocated to the normal address generator NAG. That is, when initializing, the mode is normal.

To set the bank register, by SETAG instruction, the right data (register address) is inputted by 50h, and the left data, by feeding 30-bit pattern bottom-justified.

This setting is intended to control the switch circuit (MS in FIG. 13, SW circuit in FIG. 41) for connecting the address and data lines to the desired memory bank in the hardware.

(B) Setting of Bank Number

Figure 45:
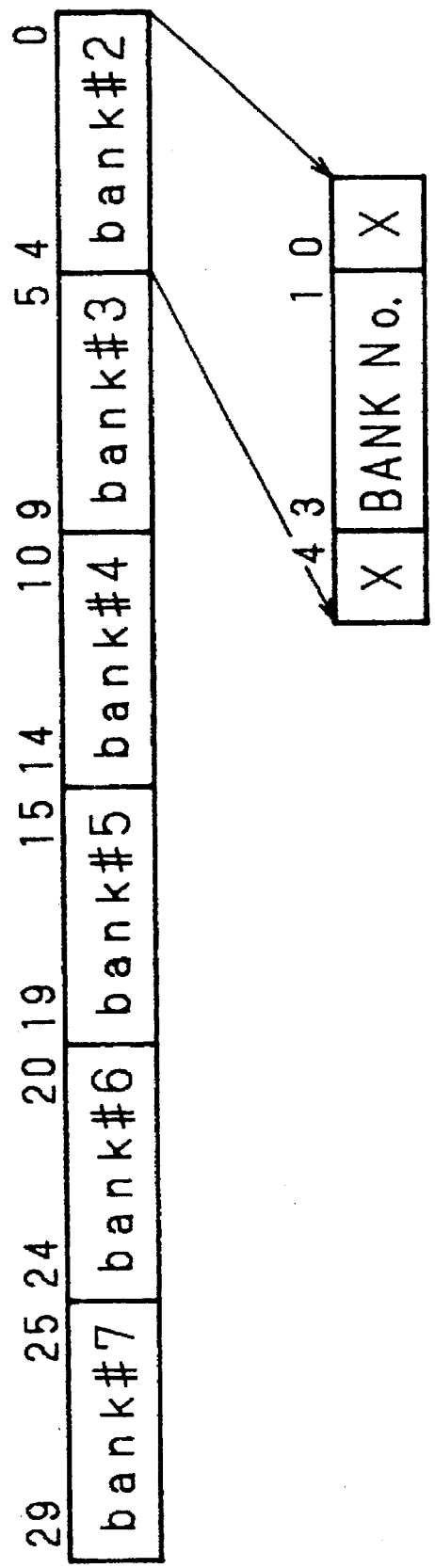
FIG. 45 is a schematic diagram showing the format of bank number register in the data memory part.

When plural memory banks are allocated to the same address generator, in order to distinguish the bank memory, the bank number register is determined. The bank number register is a 30-bit register, of which format is as shown in FIG. 45.

In three bits of bits 1 to 3 of the field bank #n, the bank number of bank #n is set. At the time if memory access, the set bank number is compared with the upper 3 bits of the address generated by the address generator, and only when matched, the memory access is executed. The details of memory access are given below.

At the time of initializing, (n+2) is set in 3 bits of the bank number field of the field bank #n. That is, when initializing the mole is normal (however, n=0, 1, 2, are allocated to two banks exclusive for the normal address generator NAG.

To set the bank number register, by SETAG instruction, the right data (register address) is inputted by 51h, and the left data by 30-bit pattern bottom-justified.

(C) Function of Address Generator and Register Setting

The function of the built-in address generator is explained. FIG. 46 is a list of mode setting registers in the address register.

Address registers relating to vector operation, RAG, WAG, DMAAG, can be allocated a plurality of memory banks, respectively. The generated address is composed of 10 bits, of which upper 3 bits express the ID number indicating the memory bank, and lower 7 bits denote the physical address of the memory bank specified by the ID number. In each bank memory, the field corresponding to the own bank out Of the above bank number registers is held, and the memory access is executed only in the memory bank matching in the ID number and bank number. The ID number to be generated varies depending on the value of the bank memory access mode flag linkfl. The generated address is shown below, and its situation is explained.

(1) When the bank memory access mode flag is "0": ID number (address upper 3 bits)=k provided $128*(k-1) \leq base+step*(i-1) < 128*k$, $1 \leq i \leq repeat$, where k is a natural number.

The above address denotes the address generated the i-th time from start of address generation by the address generator.

(2) When the bank memory access mode flag is "1": ID number (address upper 3 bits)=1+{i mod linkhum} As the lower 7 bits of the generated address, meanwhile, in both cases (1) and (2), the lower 7 bits in the number expressed in "base+step*(i−1)" are delivered.

In these formulae, base: base address, step: increment of address, repeat: number of repetitions linknum: number of bank memories allocated, linkfil: bank memory access mode flag, and x mod y: remainder of dividing x by y (x, y both natural numbers).

Figure 47A:
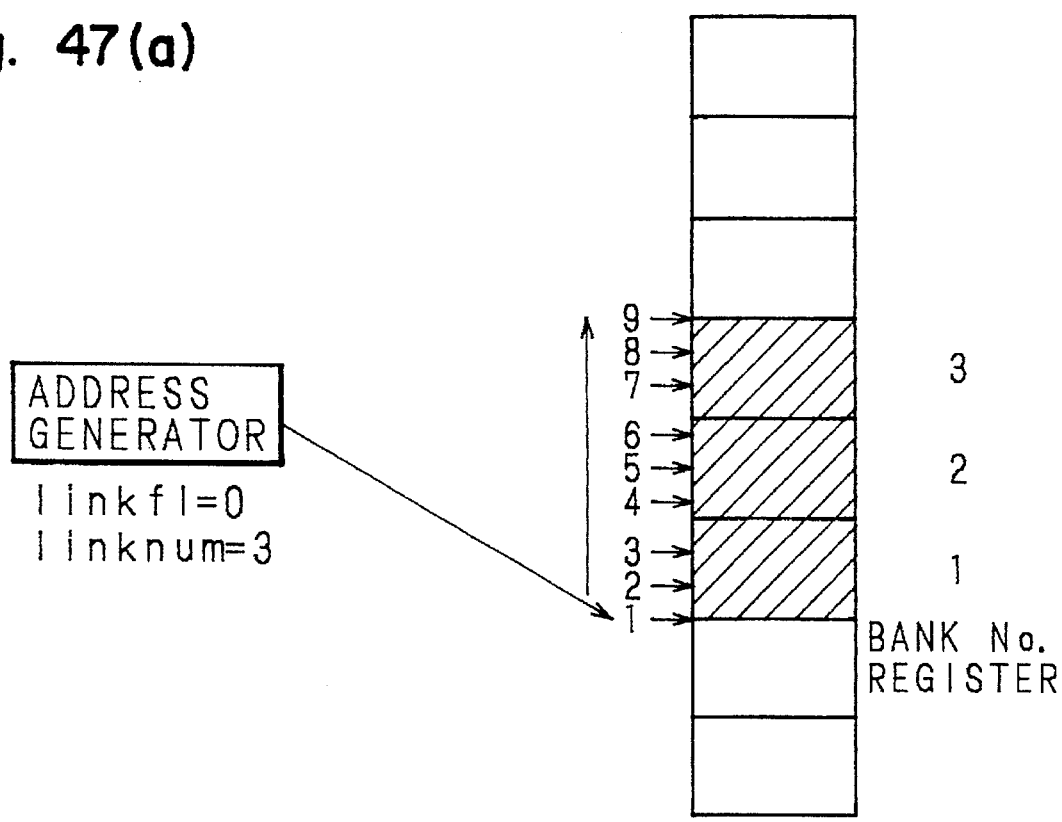
FIGS. 47a–b are schematic diagram for explaining the concept of the addressing mode in the data memory part.
Figure 47B:
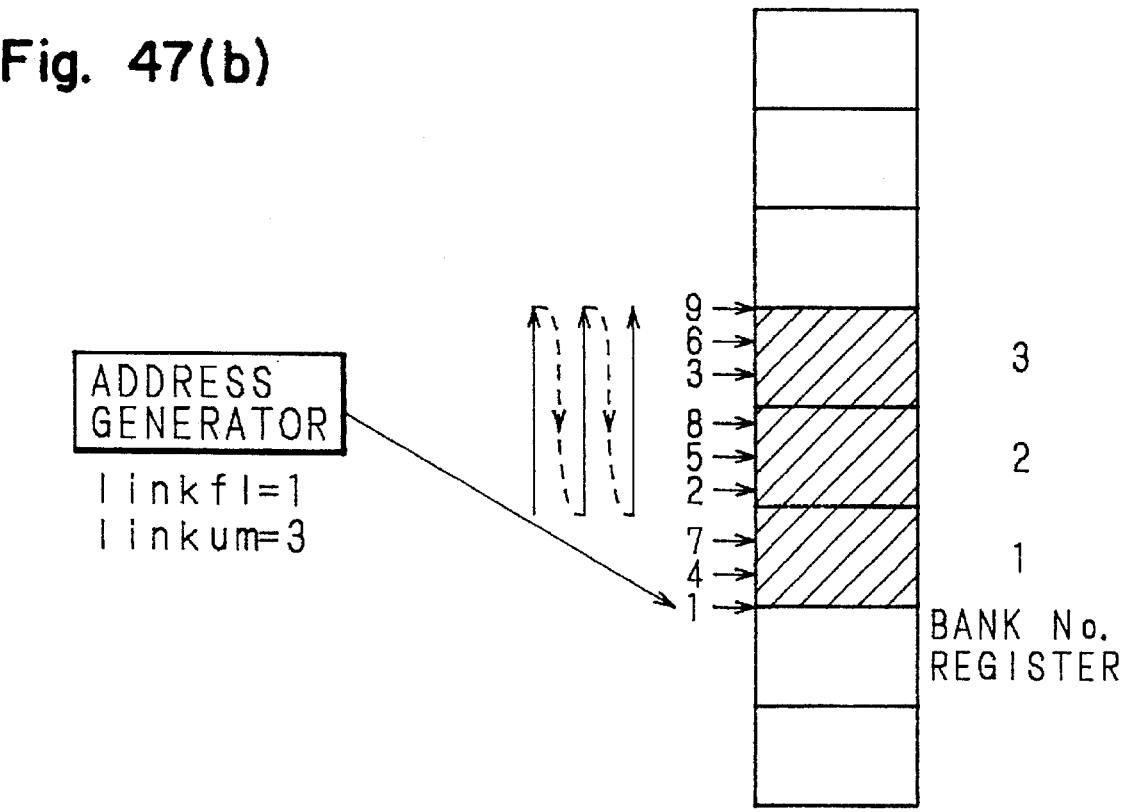

FIG. 47 explains the concept of the above addressing mode.

In the case of (1) it is the mode of connecting allocated plural memory banks in linear form and accessing as memory of 128 multiple words, while (2) relates to a mode in which the memory bank to be accessed varies cyclically every time accessing the memory.

The normal address generator NAG has 24-bit base address register (nbase), which is used when the data memory access packet of base address addition mode is inputted.

The logical address generated by the normal address generator NAG is 24 bits long, and is expressed as follows.

Logical address=ϵ×nbase+(bit 2 to bit 23 of data field in which address is stored)

where ϵ=1: in the case of mode for adding base address (DMRB, DMRIB, DMWB, DMWIB, DMWBA and DMWIBA), or ϵ=0: in the case of mode for not adding base address (DMR, DMRI, DMW, DMWI, DMWA and DMWIA).

In the case of accessing the external memory (logical address>1k word), the normal address generator NAG checks the value of logical address, and when exceeding 1k words the external memory is accessed via the port of the data memory unit DM. The physical address delivered from the port is equal to a logical address.

When accessing the internal memory (logical address<1k word), same as the read address generator RAG, etc., the address to be generated is a total of 10 bits consisting of 3 bits of ID number and 7 bits of physical address in the memory bank. The generated address is as follows.

ID number=bit 7 to bit 9 of logical address

Memory bank physical address=lower 7 bits of logical address

The content to be set in the mode setting register each address generated and its register address are shown. For setting, SETAG instruction is used, and the setting content is set in the left data in the packet, and the address in the right data.

(1) The register of RAG is set by three sets of data as shown in FIG. 4.

Figure 49:
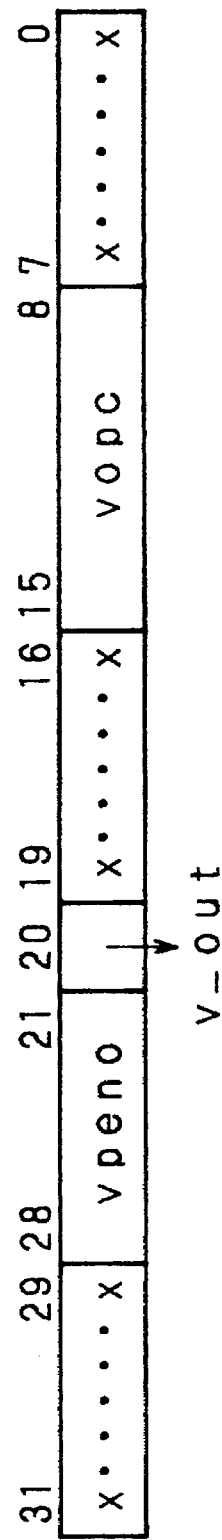
FIG. 49 is a schematic diagram showing the content set in the acknowledge packet of RAG in the explanation of data memory part.

(2) In the acknowledge packet of RAG, the content is set by the two sets of data as shown in FIG. 49.

(3) The register of WAG is set by the two sets of data shown in FIG. 50.

There are certain coordinated operates that cannot be explained by independent action of the functional blocks composing this processor. The coordinated operates relating to the data memory unit DM are explained below.

(1) Memory Access by Immediate Address

Same as in the Neumann type processor, also in this processor, the immediate address of the data memory unit may be stored and used in the program. Two functions are supported to control as follows.

(1.1) When Using IM Bit of Selection Code

When generating a program code, by setting IM=1, the upper 8 bits of the selection code field of the program can be used as the immediate address.

1) In the program memory unit PM, of the values read out from the program memory at the time of updating the tag, in the case where the IM bit of the selection code is "1", the remaining 8 bits of the selection code are interpreted as the address of the data memory unit DM in which the constant data is stored, and these 8 bits are stored from bit 2 to bit 9 of the right data field (since the scalar access is by byte address, the value expressed in the selection code field is two-bit shift). In the field of the corresponding 8 bits of the selection code of the packet delivered from the program memory unit PM, the selection code value of default is stored.

2) Since the IM bit of the selection code is "1" the packet delivered from the program memory unit PM reaches the data memory unit DM after passing through the output block, input block and MM block by NOP.

3) In the data memory unit DM, since IM bit is "1", the right data field of the packet is interpreted to be the address, and the content of the base address register nbase and this address are added up, and the result is used as the address to read out the memory, and the read-out data is stored in the right data field.

In the processes 1) to 3) the partner constant of the operation is fetched.

(1.2) When Using Program Combination PM_Thru=1, PE=0

When generating a program code, the bits of the select code are used in combination of PM_Thru=1, PE=0), PAIR=1, L/R̄=1 (the combination of PAIR=1, L/R̄=1 indicates a monadic operation packet, which is the processing for passing the MM block by NOP).

Besides, by storing the immediate address of the data memory unit DM as the constant in the next address of the program code, the 24-bit full bit may be used as the immediate address.

1) In the program memory unit PM, by the control bit of the program, the immediate address of the data memory unit DM is stored as the constant in the right data field of the packet.

2) In the output block, since the selection code is the combination of PM_Thru=1, PE=0, the packet is not put outside the chip, but is delivered to the MM block.

since the selection code is the combination of PAIR=1, L/R̄=1, the MM block allows this data packet to pass by NOP.

3) In the data memory unit DM, since the selection code is the combination of PM_Thru=1, PE=0, it is interpreted that the address of the data memory unit DM is Stored in the right data field of the packet, and the memory is read out by using the right data as the address, and the result is stored in the right data field and delivered. At this time, by changing the flag to PM_Thru→0, processing of the tag updating is prevented from being prohibited in the next PM block.

At this time, when the operation mode of the data memory unit DM is the bank mode, in the case where the reading address exceeds 258 words, as mentioned above, the memory access is not executed by setting the MEM_ACCESS_VIOL flag of the selection code.

(2) Distributed shared memory access mechanism

To process large-scale structural data in a multiprocessor system, a transparently accessing mechanism through the data memory unit DM of each processor element (PE) is provided.

A logical address is 32 bits, and its upper 8 bits are for the PE number, and the lower 24 bits are for the physical address (local address) of the data memory of each PE.

1) The address (32-bit logical address) matched in the matching memory unit MM and the packet of paired data are updated in the program memory unit PM. At this time, the program is coded so that the combination of selection code may be PE=1, PM_Thru=1, OUT/ĪN=1, PAIR=1, L/R̄=1 (in the case of memory writing; in the case of memory reading, the first matching processing of one-input instruction is not necessary).

2) In the output block, by the combination of PE=1, PM_Thru=1, the destination PE number is interpreted to be found in the upper 8 bits of the left data field, and (a) when equal to the own PE number, without putting out of the chip, it is delivered to the matching memory unit MM, or (b) when not equal to the own PE number, the PE number stored in the upper 8 bits of the left data is stored in the PE number field of the packet running across the PEs of three-word type, and the own PE number is saved in the upper 8 bits of the left data and delivered outside the chip. Being routed to the MM block of the own PE in the case of (a) or to the PE having the destination PE number in the case of (b) through the network, it reaches the MM block via the input block of the destination PE.

Whether in case (a) or (b), the selection code is the combination of PE=1, PM$_{\_Thru=}$1. in the case of (a), except that the destination PE number and return PE number are identical, it may be considered same as in the case of (b). Therefore, only case (b) is explained here.

The above processings of 1) and 2) are the process at the origin PE of memory access requesting.

4) In the MM block of the destination PE, the selection code is the combination of PAIR=1, L/R=1, and this packet is interpreted to be a packet for monadic operation, and the packet is passed by NOP and delivered to the DM block.

(5) In the DM block, accessing the data memory according to the operation code of the packet, the value of the upper 8 bits of the left data (that is, the return PE number) is, after execution of instruction, saved in the upper 8 bits of the right data which is the vacant field, and is delivered to the PM, FALU block. In the DM block, meanwhile, the OUT/IN flag is always delivering "0". Therefore, the selection code of the packet for delivering the DM block is the combination of PE=1, PM$_{\_Thru=}$1, OUT/IN=0.

6) The operation unit FALU allows to pass by NOP because the operation code is DM instruction. The program memory unit PM passes the input packet by NOP because the flag is PM$_{\_Thru=}$1.

7) In the output block, When the selection code of the input packet is the combination of PE=1, PM$_{\_Thru=}$1, OUT/IN=0, unconditionally, the flag value is changed to PM$_{\_Thru\rightarrow}$0. Concerning the same packet, moreover, it is interpreted that the destination PE number is stored in the Upper 8 bits of the right data, and when this destination PE number is different from the own PE number, the upper 8 bits of the right data is stored in the PE number field of the packet running between PEs, and the packet is delivered to the network outside the chip. This packet is routed in the network, and returns to the origin PE of data memory access requesting.

The processes 4) through 7) are the processing of the memory access requesting side PE.

When the destination PE number is equal to the own PE number, without delivering the packet outside the chip, it is transferred to the MM block (such case may occur because the requesting side PE and destination PE are identical in case (a) in 3)), and the processing after the MM block in the data memory access requesting side PE is all the same in any case, as explained in 8 to 10 below.

8) The packet passing through the input block of the return PE (the memory access requesting PE) through the routing network is interpreted to be a monadic operation packet because the combination of the selection code is PAIR=1, L/R=1, and the MM block is passed by NOP, and transferred to the DM block.

9) In the data memory unit DM, When the combination of selection code is PE=1, PM_Thru=0, the packet is passed by NOP.

10) In the operation unit FALU, since the operation code is DM instruction, data processing is not done. In the program memory unit PM, the ordinary tag updating is executed, and the instruction of the node to be executed next is read out.

Next is explained the program memory unit PM.

The functions Of the program memory unit PM may be roughly classified as follows.

(1) Updating of Tag Portion (Selection Code, Instruction Code, Destination Node Number)

The connection information of nodes of the data flow graph, and the instruction code executed in nodes are stored in the program memory unit PM. The packet inputted to the program memory unit PM accesses the memory using the node number as the address, and updates the tag.

(2) Execution of Special Instruction Accompanied by Operation of Tag Portion

A special instruction accompanied by operation of tag portion is executed in the program memory unit PM in order to lessen the hardware load of the operation unit FALU installed parallel to the program memory unit PM. For example, the true gate "TG" instruction judges true or false the value stored in the right data, and reads out the memory when true, and destroys the packet when false.

(3) Reading of Constant Data (4) Copying of Packet

Figure 51A:
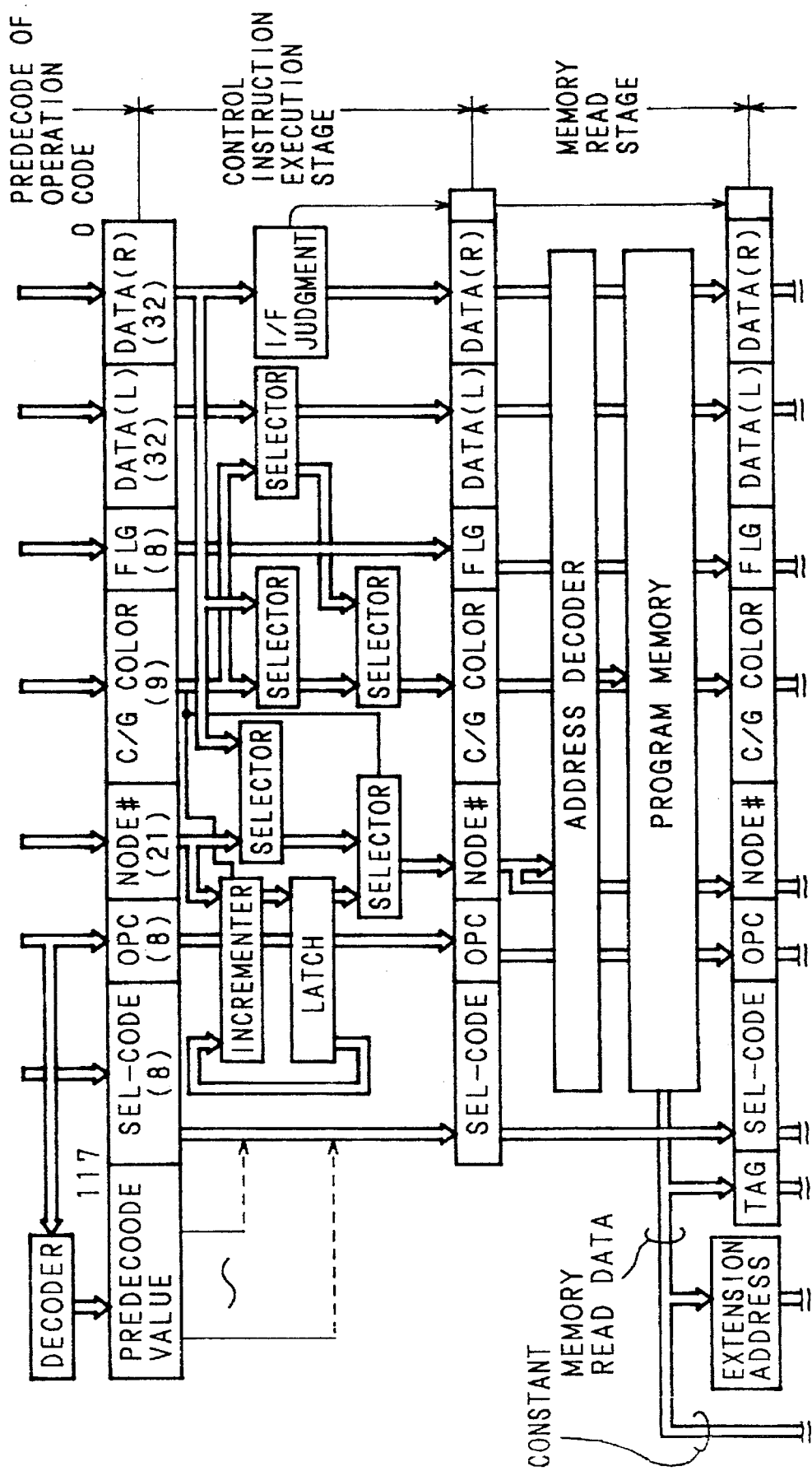
FIGS. 51a–b are a block diagram showing the configuration of a program memory part.
Figure 51B:
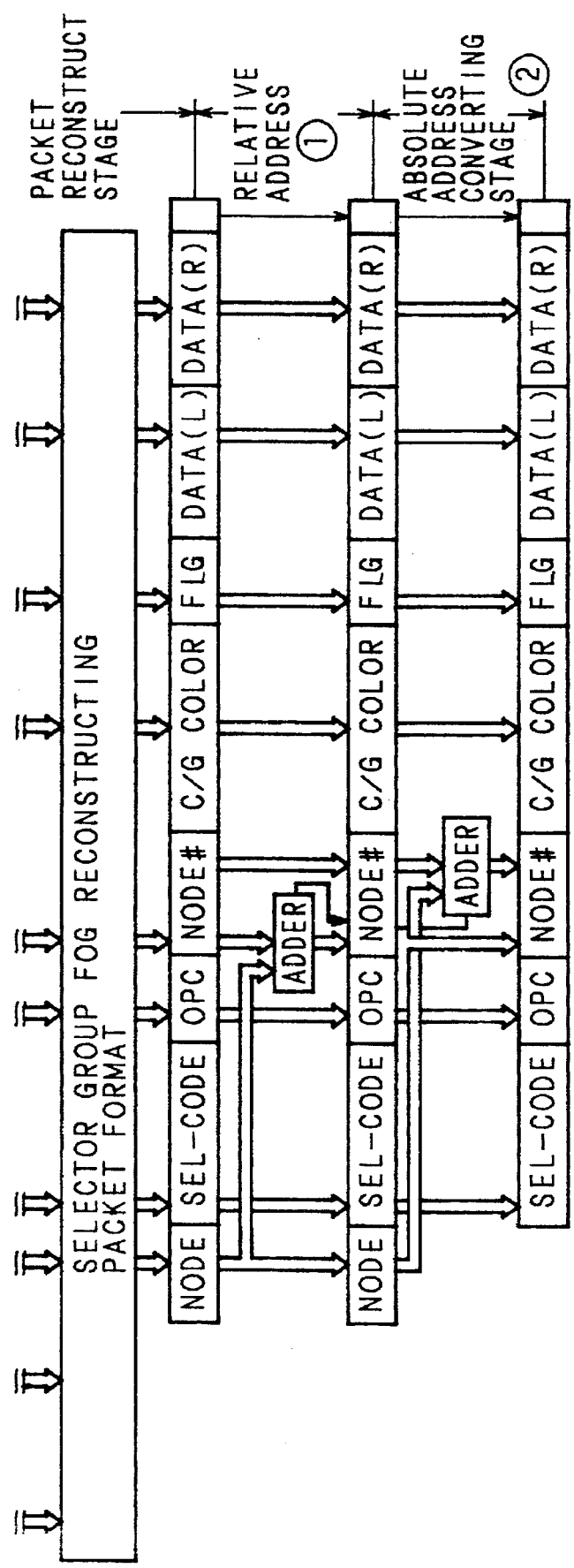
Figure 53:
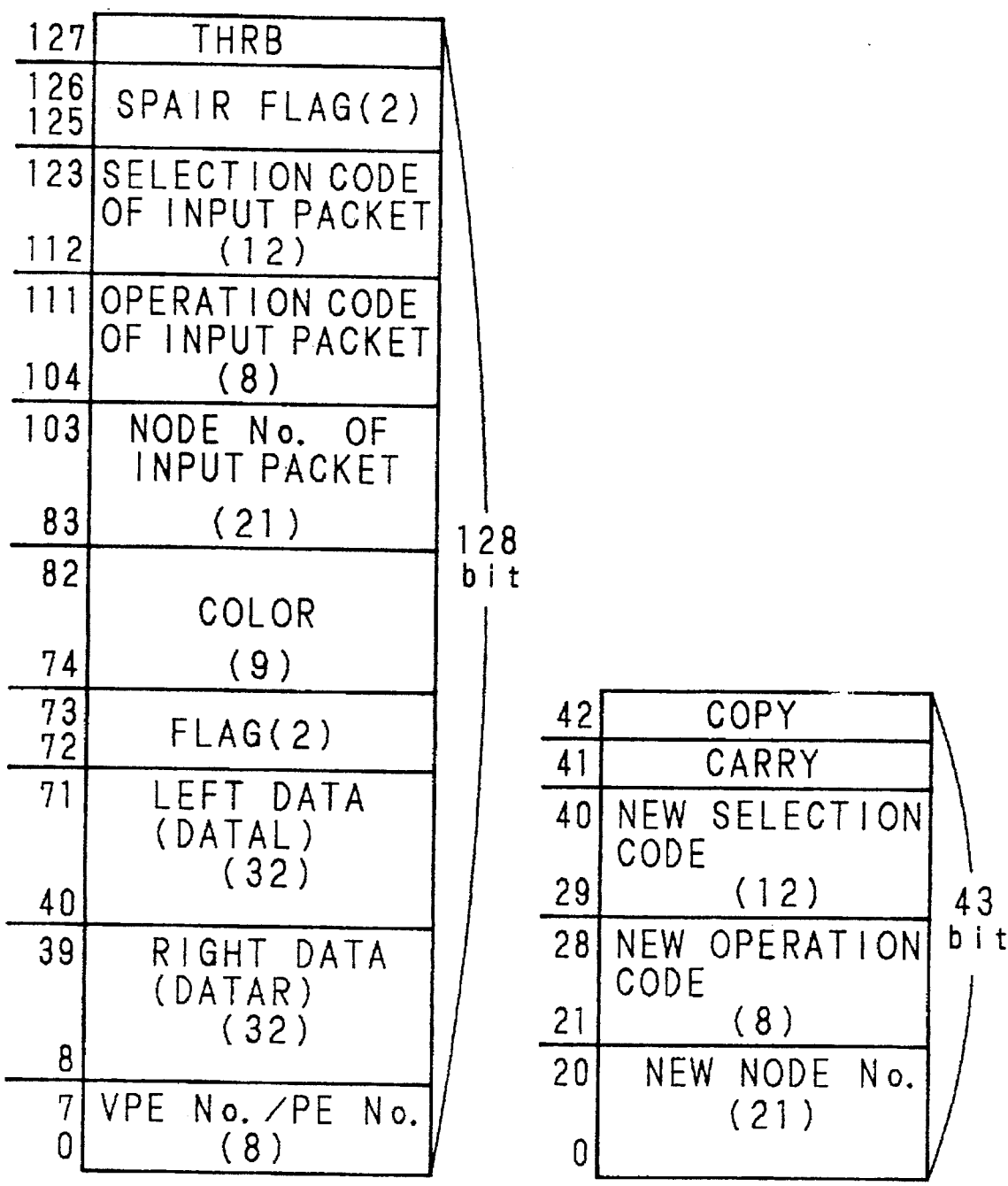
FIG. 53 is a schematic diagram showing the format of packet outputted from the program memory part.
Figure 56A:
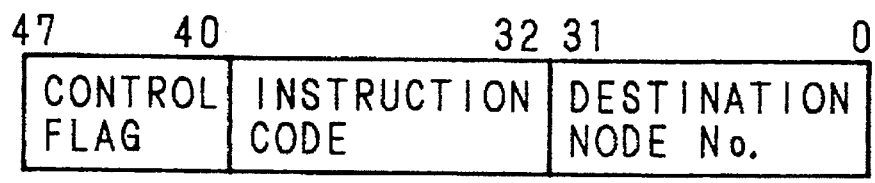
FIG. 56a–b are a schematic diagram showing the configuration of one word in the conventional program memory part, and the configuration of one word in the program memory unit of the data microprocessor of the invention.
Figure 56B:
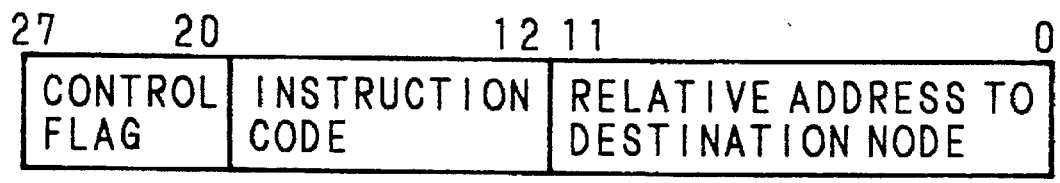

A block diagram of the program memory unit PM is shown in FIG. 51. The entire program memory unit PM is composed of six stages of pipeline as shown in FIG. 51. The content of execution Of each stage is shown below.

First stage: Pre-decoding of OPC.

Second stage: Execution of control instruction.

Third stage: Writing/reading of program memory.

Fourth stage: Packet reorganization When program memory continuous read occurs number.

Fifth, sixth stages: Calculation of destination node

The packet format inputted to the program memory unit PM is shown in FIG. 52, and the output format in FIG.

For example, the running procedure of TG instruction is shown below while tracing the pipeline stages.

First stage: Pre-decoding of OPC=TG.

Second stage: Judgment of truth or falsehood of right data. When false, ABS bit (PM internal bit) is set up. (The ABS bit is explained later in relation to other function, "PM internal bit.") At this time, the input packet runs through the program memory unit PM, and in the KCOPY unit, since the ABS bit is 1, the packet is eliminated When true, the tag portion is updated in the program memory unit PM, and is delivered from the KCOPY unit.

Third stage: Reading out the program memory, the tag portion is updated (regardless of trough or falsehood of the right data).

Fourth stage: The packet is reorganized when the program gram memory continuous read occurs.

Fifth, sixth stages: The destination node number is calculated,

The program memory is described below, (1) Field Allocation of Program Memory

The program memory unit PM comprises a program memory of 32 bits×512 words. The configuration of program memory is shown in FIG. 54. Each field is briefly described below.

AAN (1bit): Control flag for memory continuous reading.

CPY1 (1bit): Control flag for memory continuous reading.

CPY0 (1bit): Control flag for memory continuous reading.

SEL (9 bits): Selection code. The bit alignment in this code is as shown in FIG. 55.

OPC (8 Bits): Operation code.

NODE# (12 bits): Destination node number (singed 12 bits).

(2) Relative Addressing Method

The node number stored in the Program memory is interpreted as relative address when the DISP/ABS bit of the selection code in the program memory is "1", and it is added with the node number of the input packet, and the destination node number is obtained. The relative addressing method is explained below.

In the program memory unit PM aside from the instruction code, it is necessary to store the address (destination node number) in which the instruction to be executed next to this instruction is stored. Accordingly, the number of memory bits per instruction increases, and it is a serious restriction for storing the entire program in one chip and processing at high speed. In this processor, accordingly, the node number stored in the program memory unit PM is a relative address, and the bit width is compressed. For example ample, supposing the control flag to be 8 bits, the instruction code to be 8 bits, and the area for storing the destination node number to be 32 bits, in the conventional system, the bit width per instruction is 48 bits. By contrast, in the case where the relative address can be expressed in 12 bits, assuming that the address of the destination node be given as the difference of the address of the present node and the storing address of the destination node, the bit width per instruction is 28 bits, so that the bit width of the program memory may be compressed significantly.

This method is based on the nature that the connection between instruction nodes is generally local so that the relative address to the destination node rarely requires a large value.

FIG. 46 shows the configuration of one word in the program memory unit of the prior art and the configuration of one Word in the program memory unit of the present system.

(3) Extension Address

In the case where the relative address cannot be expressed in 12 bits, that is, when the difference between the address storing the instruction of the destination node and the present address is out of the range of $-2048(=-2^{11})$ to 2047 $(=2^{11}-1)$, the overflow digit is stored in the next address, and this region is set as an extension address. Or by adding a control flag (CPY1, CPY0), the presence of extension address is indicated.

In such program memory unit PM, as a result of reading out the address N of the program memory unit PM, when the relative address is R and the control flag indicates the presence of extension address, the next address is read out consecutively to obtain the extension address E. At this time, the next destination node number D is given as $$D=N+(R+E*2^{11})$$

where the sum in parentheses is a binary bit row coupling of E and R, and actual addition is required only once.

Besides, in the multiprocessor configuration, there is certainly a case in which the destination node is mapped in other PE. Accordingly, PE# is stored in the upper 8 bits from the MSB of the extension address. By reading this PE# and attaching to the packet, the packet may be routed in other PE.

(4) Absolute Addressing

The node number stored in the program memory is interpreted to be the absolute address when the DISP/ABS bit of the selection code in the program memory is "0" and the node number (11 bits) read out from the program memory is directly used as the destination node number. At this time, the node # (21 bits) of the packet delivered from the PM is code-extended.

(5) Mapping of Constant Data

The state of mapping the constant data in the program memory is shown in FIG. 54. The MSB of the constant data is mapped in the LSB of the SEL code, and the remaining 31 bits are stored in the extension address field. The MSB of the constant data and remaining bits are coupled in the packet reorganization stage. The reading method of constant data is explained later.

Next, the memory load/dump is described below.

Load/dump of program is executed by PMWT (PM WRITE), PMRD (PM READ) instruction.

When executing PMWT instruction, the program memory unit sets up the ABS (ABSORB) bit, and outputs the input packet directly to the copy unit KCOPY. The copy unit KCOPY eliminates the packet according to this ABS bit. As for the ABS bit, it is explained in the paragraph on the PM internal flag later.

The memory continuous reading is explained below.

The program memory is read out continuously in the following cases.

(1) Copying of packet (2) Generation of extension address (3) Reading of constant data When plural destination node numbers are assigned for one result of operation, it is necessary to read out program memory continuously for one input packet.

In this processor, at the time of program loading, the continuous reading flag (D_COPY) is preliminarily read into the program memory unit PM, and when reading out the program memory, this continuous reading flag (D_COPY) is read out, and when the program memory unit PM receives the input packet, it is judged immediately whether necessary or not to read out the address continuously, so that the processing speed may be enhanced. When memory reading for the input packet is over, at the same time, reading of next address may be started. It is similarly controlled when reading out the extension address and constant data.

The function of control flag of the program memory unit PM is shown in detail below.

(1) PM Internal Flag

In the program memory unit PM, three bits, THR, ABS, COPY, are available as internal flag. The function of each flag is shown below.

THR: Through flag. This is a signal of OR (executed in the first stage) of PM_Thru, MEM_ACCESS_VIOL, VECTOR_INSR, HASH_CONFLICT, out of the selection code of the PM input packet.
When this flag is 0, the program memory unit PM holds the input packet and passes the content through.

ABS: Packet elimination flag. This is a signal of OR of ABS flag of PM input packet and the packet elimination condition inside PM (When PMWT instruction is executed). This flag is outputted from the program memory unit PM to the copy unit KCOPY. The copy unit KCOPY eliminates the packet when the ABS flag is "1".

COPY: Copy flag. When a copy packet is generated, the program memory unit PM sets this flag to "1" and outputs. When this flag is "1", the copy unit KCOPY prohibits ACK signal to the operation unit FALU.

(2) Determination of Destination PE Number

The value of VPE of PM input packet (8-bit vector processor number, attached in the data memory unit DM) usually passes through the program memory unit PM, and is outputted as the value of PE of PM output packet. However, when the PE number is read out by accessing the extension address by program memory unit PM, this value is delivered as the PE number.

(3) Handling of Selection Code (3.1) The selection code of the PM input packet is explained below.

In D_COPY, when this bit is "1", the program memory unit PM gets into the memory continuous reading mode.

Five bits of PM_Thru, HEM_ACCESS_VIOL, VECTOR_INSTR, HASH_CONFLICT are referred to in order to set up the PM internal flag THRB.

Four bits of MEM_ACCESS_VIOL, VECTOR_INSTR, HASH_CONFLICT are outputted through the PM inside.

(3.2) The selection code of memory reading data is described below.

In DISP/ABS, when this bit is "1", the destination node number being read out is interpreted to be relative address, and the addition result of the destination node number of the input packet and the relative address (singed) is attached to the packet as a new destination node number.

In IM, when this bit is "1", the upper 8 bits of the selection code being read out are interpreted to be the immediate address of the data memory unit DM, and stored in the right data field and outputted from the program memory unit PM. Meanwhile, in the empty field of the right data, "0" is stored.

When this packet reaches the data memory unit DM, the data memory is accessed using the right data value as the address, and the read data is stored as the immediate value, so that an operable packet is obtained. Accordingly, the immediate reading packet using IM flag does not require extra memory access for reading out the immediate value in the program memory unit PM, nor is it necessary to wait for the packet in the matching memory unit MM, so that the instruction may be executed by the same pipeline control as in the one-input instruction.

Incidentally, the upper 8 bits of the selection code of the packet delivered from the program memory unit PM are set as the default value shown in FIG. 57.

Next, as a result of reading out the memory, consequently, when the value of AAN is "1", the operation is as follows.

Figure 58:
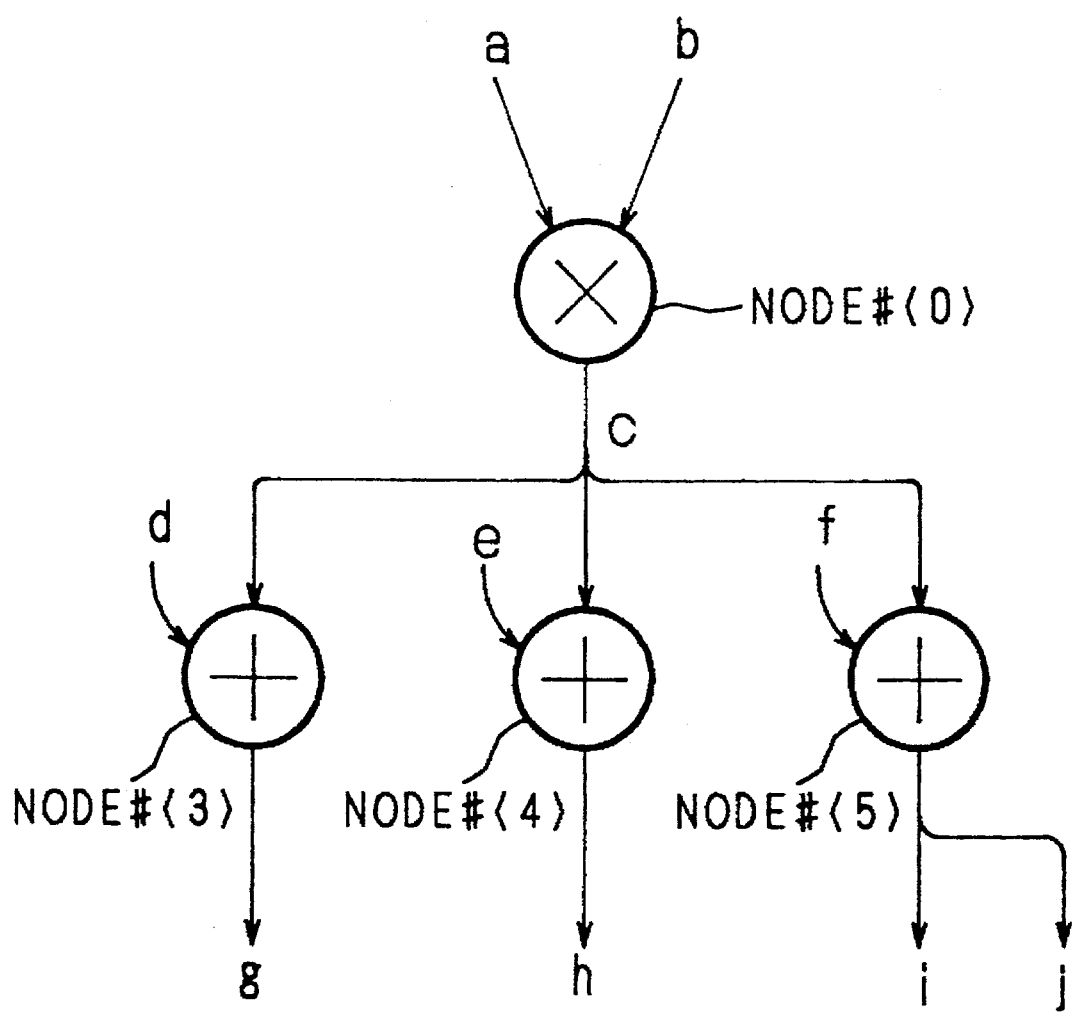
FIG. 58 is a schematic diagram showing an example of program data (flow graph) for reading out seriously.

It is assumed, for example, to execute a program as expressed in the data flow graph in FIG. 58. This program is intended to multiply data a and b, copy the result data c in three packets, sum up data d, e, f, and obtain result data g, h, i and j.

Figure 59:
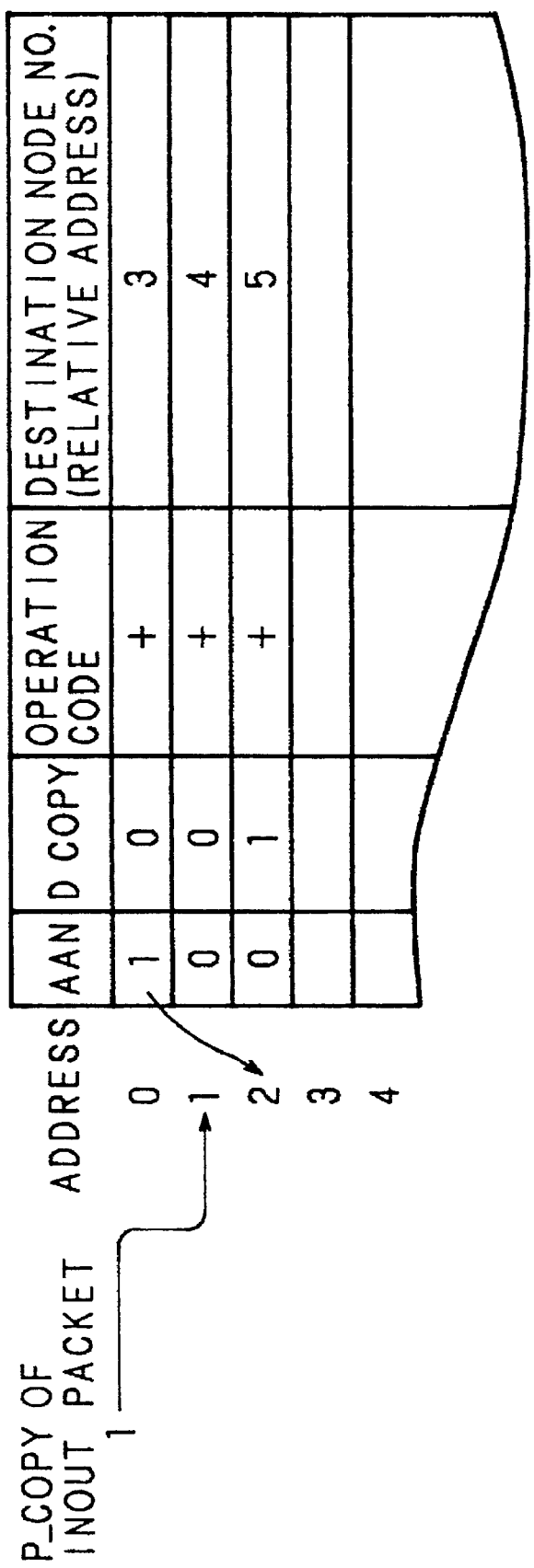
FIG. 59 is a schematic diagram showing the content to be stored in the memory of the program shown in the data flow graph.

The state of loading this program in the program memory of the program memory unit PM is shown in FIG. 59. The operation is explained while referring to FIG. 59. In this example, since the value of D_COPY of the input packet is "1", address "1", or address "2" due to AAN of address "0", is read out continuously. The node number of the packet entered in the program memory unit PM is "0". In the memory reading stage, according to the node number "0", the address "0" is read out. Parallel to this memory reading, the next memory reading address is generated.

When reading of the address "0" is over, reading of address "1" is immediately started. Since the result of reading the address "0" was ANN=1, parallel to reading of address "1", the next memory reading address, that is, "2" is generated.

When reading of address "1" is over, same as above, reading of address 2 is started. Since the result of reading out address "1" was ANN="0", address "3" is not read out continuously.

Next, the copy unit KCOPY is explained.

Figure 60:
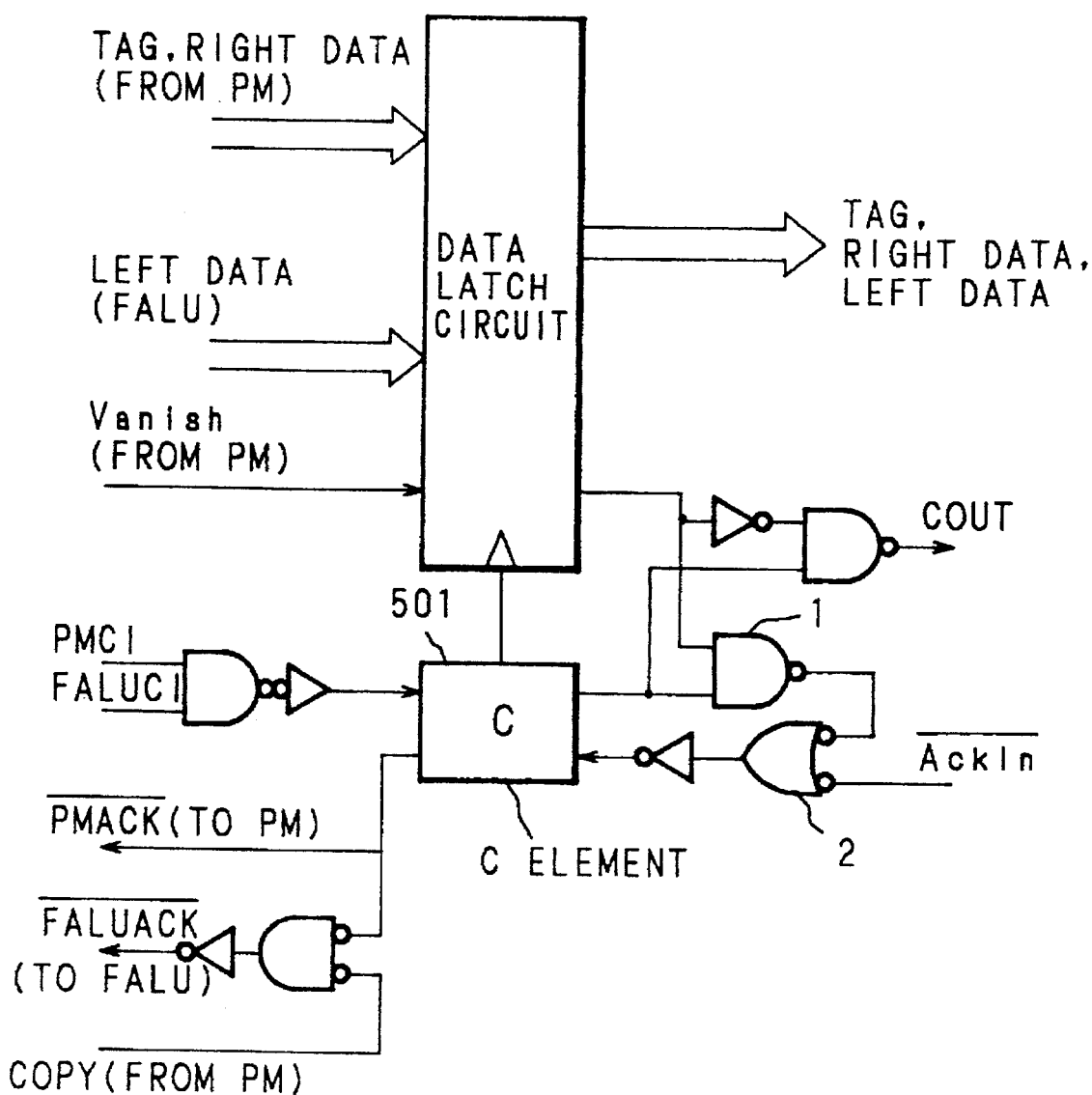
FIG. 60 is a block diagram showing the configuration of unit of the data flow microprocessor of the invention, copy unit of the data flow microprocessor of the invention.

A constitutional example of the copy unit KCOPY is shown in FIG. 60. The copy unit KCOPY is basically composed of one data latch circuit and one C element (transfer control element). The detail of C element is given earlier and is omitted herein. The copy unit KCOPY realizes the following three functions by inserting several logic gates to four input and output wires corresponding to the C element as shown in FIG. 60.

(1) Merge Function of Packet

The tag and right data sent from the program memory unit PM, and the left data sent from the operation unit FALU (in which the operation result is stored) are combined into one packet in the data latch circuit, and outputted. By controlling the C element with the AND of the C signal sent from the program memory unit PM (PMCI) and the C signal sent from the operation unit FALU (FALUCI), the data of two systems given to the data latch circuit are Correctly merged.

(2) Copy Function of Packet

When a copy operation of packet is instructed, one operation result sent from the operation unit FALU is combined with plural pieces of tag information read out for copying, and a desired number of packets are sent out from the data latch circuit. An acknowledge signal ($\overline{\text{FALUACK}}$) given to the operation unit FALU is composed in the logic circuit as shown in FIG. 60, so that the acknowledge signal is not returned to the operation unit FALU in the case where a next copy packet is present. As a result, as far as the copy operation continues, the operation unit FALU continues to output the single data (operation result). Meanwhile, "COPY" in FIG. 60 indicates that a copy packet is successfully present after the packet presently in the process of transfer.

(3) Erase Function of Packet

In the case where an indication of ABS (meaning to eliminate the packet presently in the process of transfer, without sending to next stage, together with the left data sent from the operation unit FALU) is given to the control bit sent from the program memory unit PM, the corresponding tag, right data, and left data (operation result) are all erased. As a result, the packet is sucked.

More specifically, when the ABS signal is given from the program memory unit PM, COUT (C output signal) is not sent from the copy unit KCOPY to the next stage. Of course, acknowledge signal cannot be accepted, but as a substitute signal, a signal is supplied from logic gate 1 and logic gate 2 for clearing the C element. Since the acknowledge signal to the program memory unit PM and operation unit FALU is returned as usual, so that the packet is substantially vanished in the copy unit KCOPY.

Hereinafter the features and effects of this data flow microprocessor are summarized below.

(1) Vector Operation Function

The data memory unit DM of this processor has independently operating five sets of address generators, and eight memory banks. Of the address generators, one set is used in ordinary memory access, while the other four sets are used in vector operation. That is, using two sets of address generators, two operands (data to be operated) are continuously read out, and are sent into the operation unit FALU together with the preset instruction code to execute vector operation. The resultant (result data) outputted from the operation unit FALU reaches the data memory unit DM after passing through the copy unit KCOPY, input/output interface unit IF, and matching memory unit MM, and continuously written into the memory bank for storing the result. Another set of address generator is used in the block data transfer between the memory bank and external memory, and reading of data necessary for next vector operation or the like is executed.

(2) Architecture of Distributed Shared Memory

This processor has local data memories (built-in: 1 kw, outside $2^{22}$w), and when composing the multiprocessor, a local memory of other processor can be transparently accessed. The data memory address is composed of PE (processing element) number field of upper 8 bits, and local memory address of 24 bits, and the packet having an instruction code of memory access is automatically transferred to the destination PE according to the PE number, and is automatically returned to the original PE after memory access.

The distributed shared memory is accessed through packet communication path between processors, and extra communication path is not necessary.

(3) Efficiency of Immediate Reading

By storing the immediate data from address 0 to address 255 of the data memory unit DM, it is possible to process without disturbing the flow of the pipeline. Considering it in the conventional microprocessor, it may be compared to the constant stored in the register, and it is enabled to process without extra cycle usually, since the immediate data is buried in the program memory unit PM, to read the immediate value it is required to read the program memory unit PM twice or more, which was the cause of stopping the flow of pipeline and lowering the efficiency.

(4) Application to Dynamic Multitask

Considering dynamic multitask execution, it is necessary that the program is relocatable. In this processor, since the destination node number (corresponding to the jump destination address) in the program is stored in the relative address to the node number being executed, the task can be dynamically loaded in an arbitrary address and executed. Since the bit width of the relative address (for example, 11 bits) is smaller than that of the absolute address (for example, 21 bits), it is effective also to curtail the capacity of the program memory unit PM.

Of course, jumping to fixed address is also supported, and system call resident in memory is also enabled.

(5) Realization of Exclusive Control Using Test and Set Instruction

When the multitask shares the history (e.g. file) or resource (vector operation function), it is necessary to control to use them exclusively. For such purpose, test and set can be issued to each address of the data memory unit DM. The test and set instruction is actually executed as being divided into two instructions n this processor of the invention, that is, test and lock instruction and set and unlock instruction, for the word of the data memory representing the shared resource. These two instructions are interlocked, and for example after successful accomplishment of test and lock instruction of task A, it is controlled so that execution of test and lack instruction by other task (e.g. task B) may result in failure, regardless of whether the object shared resource is identical or not, until the corresponding set and unlock instruction is executed. Furthermore, until the word set by the set and unlock instruction of task A is reset after use of shared resource, it is controlled so that the test and lock instruction on the same resource (that is, the same word) may be unsuccessful (6) Application to Dynamic Load Distribution Using an instruction (PMRD) for reading out the content of the program memory unit PM and an instruction (PMWT) for writing, the program can be moved to other PE (process migration). By using SEND instruction for copying the second operand (the value of the right data) to the destination node number field, the input packet may be sent out to an arbitrary address of other PE.

By using these two functions, it is possible to realize the process migration, which is an advanced dynamic load distribution method.

(7) Fixed Delay Matching Memory Unit

As the method of composing matching memory unit MM, the parallel hash method is general. However, in the event of hash conflict, it is necessary to access the memory sequentially according to the pointer chain, and multiple hash conflicts occur on a same address, it means a major penalty to sacrifice time. This processor, to solve this problem, uses both hash memory and associative memory. The packet undergoing hash conflict is stored in the associative memory, and by searching the both memories for the input packet, it is possible to process matching at a certain delay, regardless of presence or absence of hash conflict.

(8) Memory Space of Practical Level

Program memory unit: built-in 512 w, outside $2^{21}$w

Data memory unit: built-in 1 kw, outside $2^{22}$w (9) Strengthening of Trace Function The content of the circulating packet can be monitored by means of external data memory connection port and external program memory connection port, and the content state may be easily traced at actual operating speed.

(10) Shortening of Pipeline Circulating Time

By parallel arrangement of operation unit FALU and program memory unit PM, the number of stages of cyclic pipeline is suppressed, and the maximum performance may be easily picked up, while response to single-shot input has been enhanced.

(11) Use of Self-Synchronous Clock System

To solve problems of high speed clock (clock skew, ringing noise, distortion of clock waveform, etc.), data transfer between pipelines is realized by self-synchronous clock system without using external clock.

The features listed above are supplemented below.

[1] The characteristic operation of the program memory unit PM is explained below.

Figure 61:
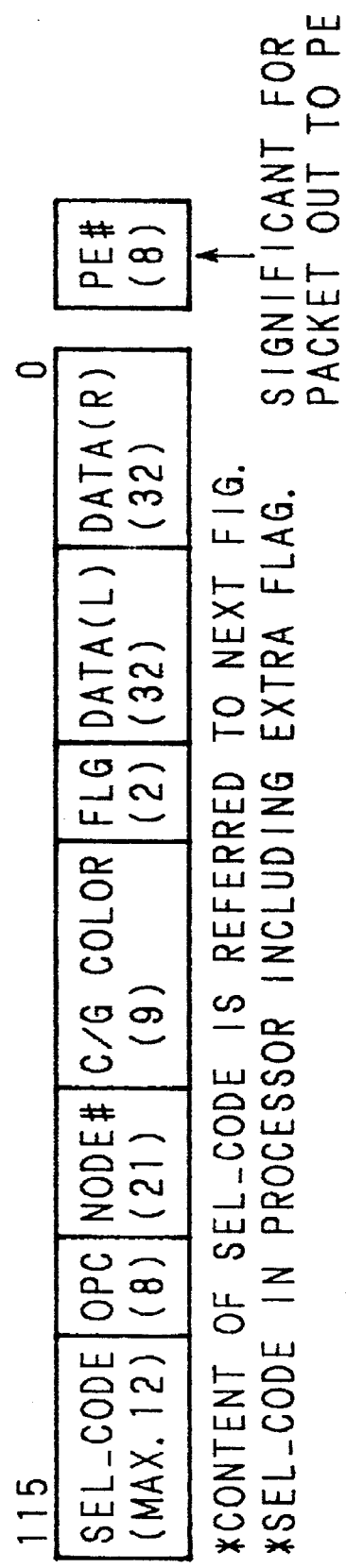
FIG. 61 is a schematic diagram showing a packet format inside the processor in an embodiment.

[1—1] Actions of reading of extension address, copy of packet, reading of immediate value (constant) from program memory unit PM The internal packet format of the data flow microprocessor is as shown in FIG. 61. The detail of Sel_Code (selection code) in FIG. 61 is shown in FIG. 62. In the program memory unit PM, the packet responsible for actions of reading of extension address, copying of packet and reading of immediate value (constant) is called case 1 packet.

The outline of the motion of case 1 packet is as follows.

Case 1 packet inputted in the data flow microprocessor (RAPID) behaves same as the input packet up to the entrance to the program memory unit PM.

(a) That is, in the input/output interface unit IF, the case 1 packet inputted from outside the processor is joined with the packet finishing a circulation of the ring pipeline. In the case where the case 1 packet has circulated the ring pipeline, it is outputted to outside according to the selection code, or is joined with the packet inputting from outside and is put again into the ring pipeline.

(b) In the matching memory unit MM, it is the packet waiting place (in the case of dyadic operation instruction). The operation in the matching memory unit MM has been described in detail above, and only the packets delivered from the matching memory unit MM are briefly summarized herein.

(1) Packet running through program memory unit PM A packet of which any one bit of PM_Thru, HEM_VIOL, HASH_CON of selection code is 1.

(2) Packet not running through program memory unit PM The selection code is other than in (1), and the following two cases are available. A dyadic (two-input) operation packet completed in waiting of right and left operands. A monadic operation (one-input) packet. The packet of (1) undergoes no operation at all in the program memory unit PM.

(c) In the data memory unit DM, the vector operation instruction packet and vector operation setting packet are processed. Other packets are passed through. In the program memory unit PM, the predetermined operation of case 1 packet is carried out. Of these operations, what is common to all packets is updating of tag portion (selection code, operation code, node number). It must be understood together with the function of the operation unit FALU installed parallel to the program memory unit PM.

That is, the operation unit FALU executes the operation according to the operation code of the packet inputted to the program memory unit PM and operation unit FALU. On the other hand, the program memory unit PM, parallel with the operation of the operation unit FALU, reads out and updates the tag portion (selection code, operation code, node number) necessary when the packet is inputted from the program memory unit PM to the next program memory unit PM and operation unit FALU, using the input node number as the memory address.

(d) The case 1 packet outputted from the program memory unit PM is operated as specified as for the copy packet in the copy unit KCOPY. The other case 1 packets are merged with the operation result data in the copy unit KCOPY.

(e) The case 1 packet inputted again in the input/output interface unit IF is delivered from this processor according to the content of the selection code, or is put into the matching memory unit MM again to undergo operation after step 2 above.

[1-2] Explanation of Actions by Using Flow Graph

Figure 63:
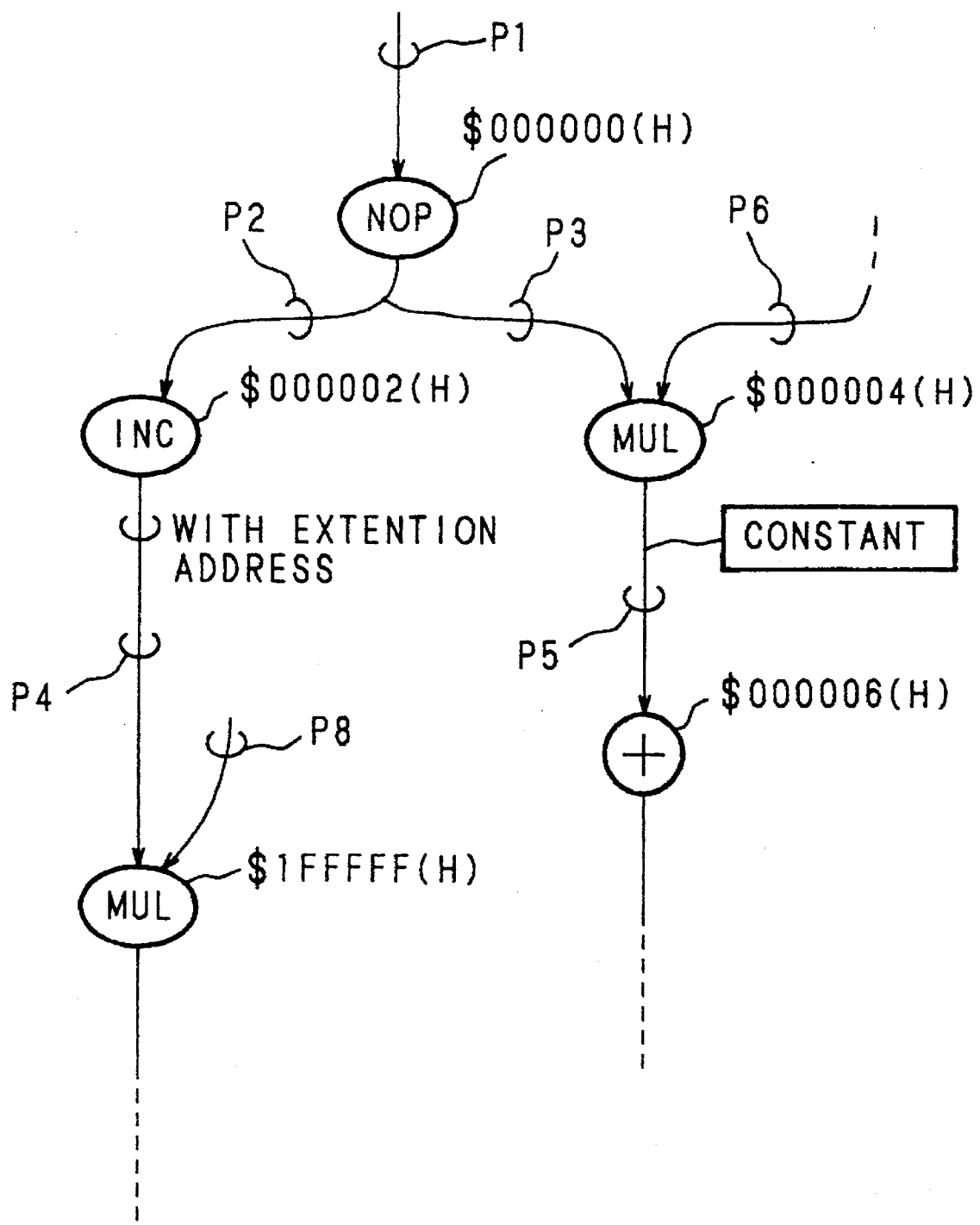
FIG. 63 is a schematic diagram of flow graph for explaining the operation of case 1 packet in the embodiment.

The flow graph for explaining the operations of case 1 packet is shown in FIG. 63. In the diagram, $**** denotes the node number, and P1 to P7 represent the packets outputted from each node. The formats of these packets P1 to P7 are shown in FIG. 64. The packet formats shown in FIG. 64 are seen right after outputted from the program memory unit PM. FIG. 65 shows the state of mapping the flow graph of FIG. 63 in the program memory of the program memory unit PM. Program mapping into the program memory of the program memory unit PM is executed by PMWT (PM WRITE) instruction. The node number written in the program memory unit PM is a relative node number. Therefore, the program memory unit PM adds the relative node number being read to the node number of the input packet to obtain the destination node number, which is stored in the node number field of the output packet of the program memory unit PM.

Now suppose that the packet P1 in FIG. 63 has just come out of the program memory unit PM. After coming out of the program memory unit PM, P1 is entered into the matching memory unit MM again after passing through the blocks of copy unit KCOPY and input/output interface unit IF, as mentioned in (d), (e) of [1—1]. The packet P1 is a one-input instruction, and is a non-vector operation instruction, and therefore it runs through the blocks of matching memory unit MM and data memory unit DM, and is inputted again to the program memory unit PM and operation unit FALU, so that processing of the node "$000000" is executed. In this processor, since the program memory unit PM and operation unit FALU are increased parallel, the operation execution is performed in the operation unit FALU, and updating of tag portion (selection code, operation code, node number) is executed in the program memory unit PM, simultaneously.

When executing the case 1 packet, the memory of the program memory unit PM must be read out continuously. This is controlled by the bit of S5:D_COPY (FIG. 63) in Sel_Code (selection code) in FIG. 62. That is, the packet of which S5:D_COPY of Sel_Code (selection code) updated by the program memory unit PM is "1" continuously reads the address represented by the node number when inputted to the next program memory unit PM and the address increased by one from the node number. Meanwhile, whether the address increasing by two from the node number is continuously read or not is controlled by the value of AAN shown in FIG. 65 when reading the program memory of the program memory unit PM, but detailed description is omitted herein.

Succeedingly, the operation of this processor is explained below while following up the nodes in FIG. 63.

1) Node "$000000"

The packet P1 inputted to the program memory unit PM undergoes updating of tag portion and copying of packet. Refer to FIG. 65. The node number of the packet P1 is "$000000", and therefore the address "000000" of the program memory in the program memory unit PM is read, and the tag portion of packet P1 is updated as a result and is outputted as packet P2 from the program memory unit PM. In succession, the address is increased by one and the address "000001" is read consecutively, and the tag portion of the packet P1 is updated again to be outputted as packet P3 from the program memory unit PM. This P3 is the copy packet.

In other words, seeing at the input end and output end of the program memory unit PM, there are two output packets for one input packet. One point must be noted here. The tag portion of the copy packet is updated by the read content of the memory, but the other fields of the packet (c/g, DATAR, DATAL) are unchanged and the content of the input packet of the program memory unit PM is directly the content of the output packet of the program memory unit PM. The packet formats of P2, P3 outputted from the program memory unit PM are shown in FIG. 64.

The packets P2, P3 outputted from the program memory unit PM are then put into the copy unit KCOPY. In the copy unit KCOPY, they are merged with the operation result data, and the following operation is simultaneously executed on packet P3 which is the copy packet. The fields of c/g, DATAR, DATAL of packet P3 must be identical with those of the packet P2. Accordingly, when the packet P2 is inputted to the copy unit KCOPY, the data transfer completion signal ($\overline{Ack}$) which should be returned, in principle, to both operation unit FALU and program memory unit PM is returned only to the program memory unit PM. Accordingly, at the operation unit FALU, it is interpreted that the transfer of packet P2 is not complete, and it keeps outputting the content of c/g, DATAR, DATAL of packet P2. On the other hand, in the program memory unit PM, it is interpreted that the transfer of packet P2 is complete, and the packet P3 is transferred. In this way, the packet P3 comes to have the same content of c/g, DATAR, DATAL as the packet P2.

In the copy unit KCOPY, when the packet P3 is transferred from the program memory unit PM, this time, the $\overline{Ack}$ is returned to both operation unit FALU and program memory unit PM, thereby finishing the predetermined operation about the copy packet. This operation at the copy unit KCOPY corresponds to the note warned above. As for DATAL, however, there are some exceptions, but they are not particularly explained here. (For example, when reading a constant from the program memory unit PM, the constant is stored in the DATAL. In this case, therefore, the DATAL of the program memory unit PM, not of the operation unit FALU, is selected by the copy unit KCOPY.)

2) Node "$000002"

The packet P2 delivered from the program memory unit PM is inputted into the input/output interface unit IF via the copy unit KCOPY. In the input/output interface unit IF, the packet P2 is judged to be inputted to this processor again, and is fed into the matching memory unit MM. In the matching memory unit MM, since the packet P2 is a one-input instruction (when S7:PAIR=1 of selection code, it means a one-input instruction), the packet P2 is passed through. In the subsequent data memory unit DM, too, the packet P2 is passed through because it is not a vector operation instruction.

In this way, the packet P2 is put into the program memory unit PM and operation unit FALU, and INC instruction is executed in the operation unit FALU, and the tag portion is updated in the program memory unit PM. The node number updated at this time is provided with extension address.

Refer now to FIG. 64 and FIG. 65. The node number of the packet P2 is "$000002", and hence the address "000002" is read. Consequently, the extension address and the address "000003" for storing the PE number are read, and as a result the selection code and OPC=MUL, node number with extension address, and PE number are updated. These operation may be explained below in the manner of flow chart.

(1) The address "000002" is read. According to the read content, the selection code and operation code are updated. The value of the node number "7FD" is held. The read PE number is stored in the PE number field.

(2) The address "000003" is read consecutively. The read extension address "3FF" is interlocked from the most significant bit of the node number "7FD" read out previously, and the relative node number ("1FFFFD", 21 bits) is obtained.

(3) Adding up the relative node number "1FFFFD" and the node number "000002" of the input packet P2 of the program memory unit PM, the destination node number "1FFFFF" is stored in the node number field of the output packet 4 of the program memory unit PM.

The packet P4 with extension address having the tag portion updated in this way is outputted from the program memory unit PM, and is merged with the operation result data in the copy unit KCOPY as mentioned above, and is fed into the matching memory unit MM through the input/output interface unit IF block, thereby waiting for the operand together with the packet P8 which is the right operand. The operation of the node "$1FFFFF" is not particularly explained herein.

3) Node "$000004"

The packet P3 delivered from the program memory unit PM is put into the matching memory unit MM through the blocks of copy unit KCOPY and input/output interface unit IF. In the matching memory unit MM, it waits for the operand with the packet P6 having the right operand. For the sake of simplicity, the operation of waiting is not explained herein, and only the packet format of the packet P7 after completion of waiting is shown in FIG. 64, together with the packet P6.

The packet P7 having awaited the operand in the matching memory unit MM is a non-vector operation packet and runs through the data memory unit DM, and is entered into the program memory unit PM. The packet P7 reads the address "000004" according to the node number "$000004". Refer now to FIG. 65. According to the read tag portion (selection code, operation code, node number), the tag portion of the packet P7 is updated as mentioned above. Special operation for reading the constant is as follows.

(1) As a result of reading the address "000004", the MSB of the constant is stored in obtained selection code S1. The content of this operation code S1 is held.

(2) In succession, the address "000005" is read. Here, the lower 31 bits of the constant are written. These lower 31 bits and the previously read MSB 1 bit are coupled to obtain the constant data of 32 bits.

(3) The 32-bit constant data obtained in (2) is stored in the DATAR field, and an updated tag portion is attached to the P5, which is delivered from the program memory unit PM. The operation MUL of packet P7 is executed in the operation unit FALU installed parallel to the program memory unit PM, and the result is merged in the copy unit KCOPY, and is stored in DATAL of packet P5.

Here is a supplemental explanation about the packet P5. The packet P5 is a packet for executing addition. An addition instruction is a two-input operation instruction, and it usually waits for operand in the matching memory unit MM. However, in the case where the operand is a constant read out from the program memory unit PM as in this example, it is not necessary to wait for operand in the matching memory unit MM, and addition is executed immediately. To carry out this operation, the selection code is set to S7:PAIR=1 (meaning one-input instruction). Thus, the matching memory unit MM does not wait for operand even in the case of the packet having an addition instruction which is essentially a two-input instruction.

So far is explained each operation of reading of extension address, copying of packet, and reading of immediate value (constant) (in the program memory unit PM). Meanwhile, AAN, CPY1, CPY2 of the memory core image of the program memory unit PM shown in FIG. 65 are control bits for reading continuously the memory of the program memory unit PM and control bits showing the attributes (to be copy or the like) of the content being read out.

[2] Next is explained about the access by immediate address specifying the data memory unit by referring to data flow graph.

Same as in the Neumann type processor, in this processor, too, the immediate address of the data memory can be stored in the program.

Figures 66A, 66B:
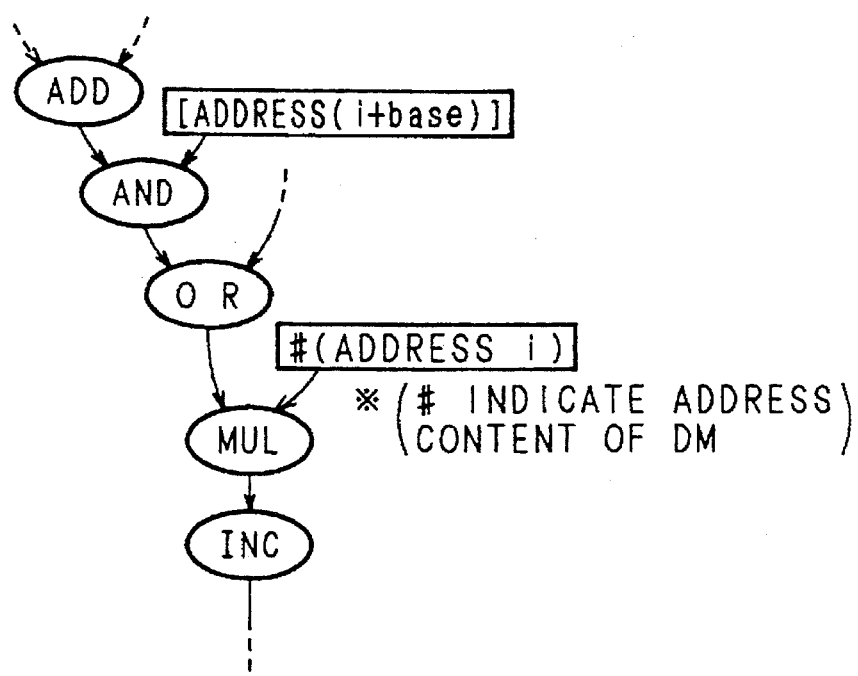
FIGS. 66a–b are a schematic diagram for explaining the immediate, address access of the data memory unit in the embodiment, FIG. 67 schematic diagram for explaining the global data memory access in the embodiment.

FIG. 66(a) denotes the program for accessing the data memory address by specifying the immediate value, and FIG. 68(b) shows the corresponding data flow graph. As shown below, two mechanisms are supported.

2.1) Method of Using IM Bit (S0) of Selection Code

As shown in FIG. 66(a) (#1 of program memory), by setting IM (S0)=1 when generating a program code, the upper 8 bits of the selection code field of the program can be used as the immediate address.

That is, considering on the dataflow graph (FIG. 66(b)), corresponding to the process conducted in the node #2, AND is operated on the result of ADD operation in the node #1, and the content of the data memory stored in the address "i+base" adding the base address set in the data memory unit DM in the immediate address "address i" specified in the selection code field.

The processing is described in detail sequentially.

(1) In the program memory unit PM, of the values read out from the program memory when updating the tag, in the case where the IM bit (S0) of the selection code is "1", bit 1 to bit 8 of the selection code field are stored from bit 2 to bit 9 of the right data field (two bits are shifted from the value expressed in the selection code field because the scalar access employs byte addresses). The default value is stored in the selection code field of the output packet.

(2) Since the IM bit (S0) of the selection code is "1", the packet outputted from the program memory unit PM reaches the data memory unit DM, passing by NOP through the output block, input block, and matching memory unit MM.

(3) In the data memory unit DM, since the IM bit (S0) is "1", the right data field of the packet interprets to be address, and adds to the preset base address, and reads out the memory by the generated address. The read data is stored in the right data field.

(4) In the operation unit FALU, the operation is executed according to the operation code "AND" attached to the packet. In the program memory unit PM, the tag is updated as usual, and the next operation information is given to the packet.

In operations (1) to (4), the constants which are operation partners of data are fetched, and the operation is executed.

2.2) Method of Using Selection Code PM_Thru (S3)=1, PE (S4)=0

As in #3 in FIG. 66 (a), when generating a program code, the bit of the selection code is set in the combination of PM_Thru (S3)=1, PE (S4)=0, PAIR (S7)=1, L/R (S6)=1 (the combination of PAIR=1, L/R=1 indicates a monadic operation packet, which is a process for passing the matching memory unit MM by NOP). Besides, by storing the immediate address of the data memory unit DM as constant in the next address of the program memory, the 24-bit full bit may be used as the immediate address.

In the data flow graph, corresponding to the processing at node #5, the MUL operation of the result of operation "OR" at the node #3 and the data memory content of the immediate address (address j) may be realized.

The processing is described in detail below sequentially.

(1) In the program memory unit PM, by the control bits of the program (AAN, CPY1, CPY0), the immediate address (address j) of the data memory unit DM is stored as constant in the right data field of the packet.

(2) In the output block, since the selection code is a combination of PM_Thru (S3)=1, PE (S4)=0, the packet is not delivered outside the chip, and is outputted to the matching memory unit MM. Since the selection code is a combination of PAIR (S7)=1, L/R (S6)=1, the matching memory unit MM is passed by NOP.

(3) In the data memory unit DM, since the selection code is a combination of PM_Thru (S3)=1, PE (S4)=0, it is interpreted that the address of the data memory unit DM is stored in the right data field of the packet, and the memory is read out using the right data as the address, and the result is stored in the right data field, and outputted. At this time, changing the flag to PM_Thru→0, it is arranged so that the processing of tag updating in the next program memory unit PM block may not be prohibited. At this time, when the operation mode of the data memory unit DM is the bank mode and the read address exceeds 256 words, the MEM_ACCESS_VIOL bit (C2) of selection code is set, and the memory access is not carried out.

(4) In the operation unit FALU, the operation is executed according to the operation code "MUL" attached to the packet. In the program memory unit PM, the tag is updated as usual, and the next operation information is attached to the packet (in the case where the MEM_ACCESS_VIOL bit has been set, it passes through the operation unit FALU and program memory unit PM by NOP).

[3] The Global Data Memory Access is Explained Below.

In order to process large scale structural data in the multiprocessor system, there is a mechanism for accessing transparently the data memory of each processor element (PE).

The logical address is 32 bits, of which upper 8 bits are for PE number and lower 24 bits are for the physical address (local address) of the data memory of each PE.

Figure 67:
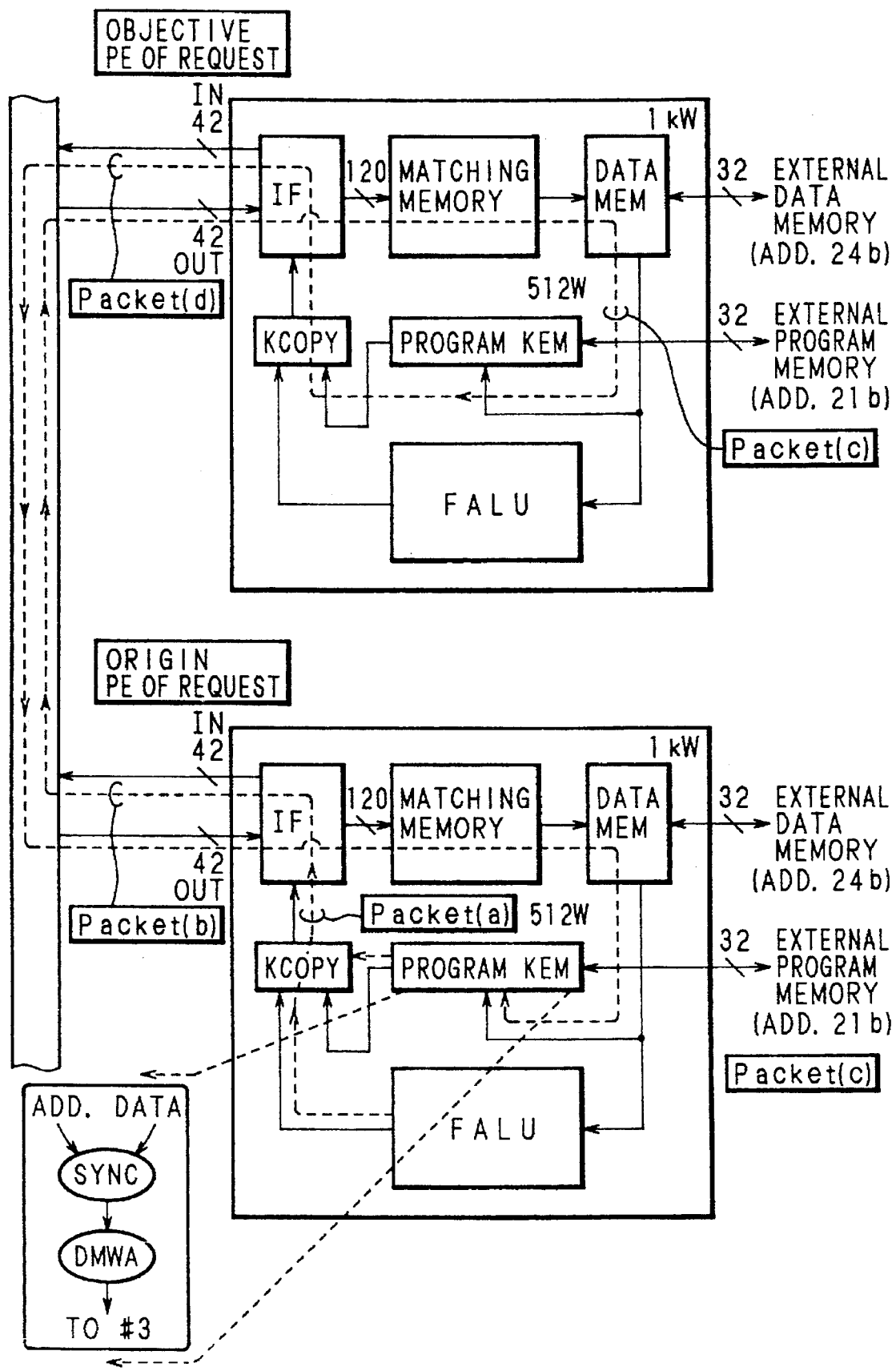

As shown in FIG. 67, when a transparent access request of the data memory occurs in a certain processor element (origin PE of access requesting), the packet is routed to the PE specified in the upper 8 bits of the logical address (requesting PE) through the network, and the data memory is accessed at the requesting PE, thereby returning to the requesting PE again.

Figure 68:
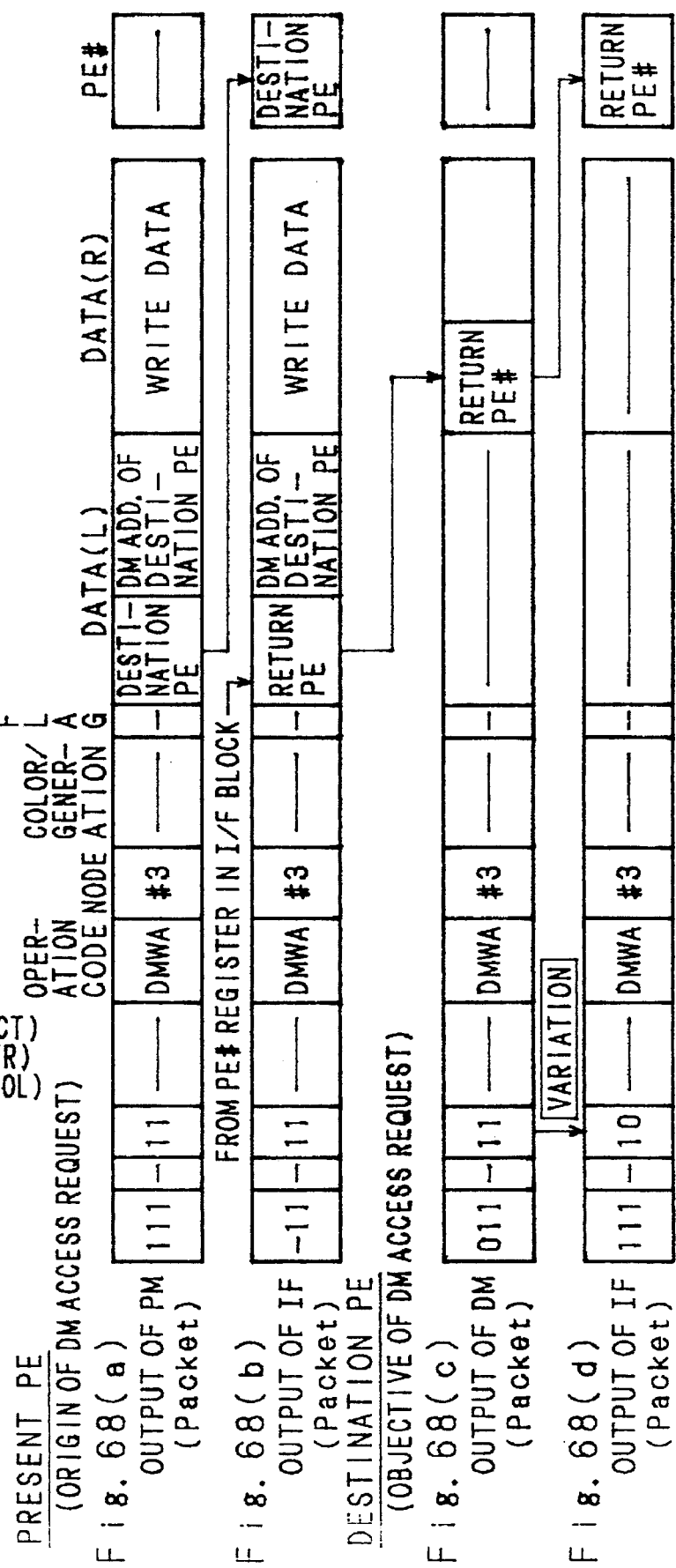
FIG. 68a–d are a schematic diagram for explaining the state change of the packet at the time of global data memory access.

As shown in FIG. 68, the packet changes as in (a) and (b) through this process.

The process of transparent memory accessing is shown below.

(1) The packet which is matched in the matching memory unit MM, and whose address (32-bit logical address) and the data are paired is updated in the tag portion at the program memory unit PM. At this time, the program is coded so that the combination of selection code may be PE=1, PM_Thru=1, OUT/IN=1, PAIR=1, L/R=1 (in the case of memory writing; in the case of memory reading operation, the first matching processing is not necessary). (FIG. 68(a))

(2) In the output block (I/F block), by the combination of PE=1, PM_Thru=1, it is interpreted that the destination PE number is in the upper 8 bits of the left data field, and (A) when equal to the own PE number, without outputting outside the chip, it is outputted into the matching memory unit MM block. (B) When not equal to the own PE number, the PE number stored in the upper 8 bits of the left data is stored in the PE number field of the packet passing between PEs of the three-word type, and the own PE number is regarded as the return PE number from the destination PE and is put aside into upper 8 bits of the left data and outputted to outside the chip. Being routed through the network to the matching memory unit MM block of the own PE in the case of (A), and to the PE of the destination PE number in the case of (B), it reaches the matching memory unit MM through the input block of the destination PE (the packet format is as shown in FIG. 68(b)).

Whether in case (A) or (B), the selection code is a combination of PE=1, PM-Thru=1. In the case of (A), except that the destination PE number and return PE number are the same, it may be considered same as in the case (B). Therefore only the case (B) is explained below.

The above processings (1) and (2) are the process at the origin PE of memory access requesting.

(3) In the matching memory unit MM of destination PE, because of the combination of PAIR=1, L/R=1, this packet is interpreted to be a packet of monadic operation, and the packet is passed by NOP, and is outputted to the data memory unit DM.

(4) In the data memory unit DM, accessing the data memory according to the operation code field of the packet, the value of the upper 8 bits of the left data (that is, the return PE number) is, after execution of instruction, saved in the upper 8 bits of the right data which is the field not in use, and is outputted to the program memory unit PM and operation unit FALU block. In the data memory unit DM, meanwhile, the OUT/IN flag always delivers "0". Therefore, the selection code of the packet outputted from the data memory unit DM is the combination of PE=1, PM_Thru=1, OUT/IN=0 (The packet format is shown in FIG. 68 (c)).

(5) The operation unit FALU is passed by NOP because the operation code is the data memory unit DM instruction. The program memory unit PM allows to pass the input packet by NOP because the flag is PM_Thru=1.

(6) In the output block, when the selection code of the input packet is the combination of PE=1, PM_Thru=1, OUT/IN=0, the flag value is unconditionally changed to PM_Thru→0. At the same time, the destination PE number is interpreted to be stored in the upper 8 bits of the right data, and when the destination PE number is different from the own PE number, the upper 8 bits of the right data are stored in the PE number field of the packet crossing between PEs, and the packet is outputted again to the network (FIG. 68(d)).

The processes (3) to (6) above are the processing of the memory access requested PE.

When the destination PE number is equal to the own PE number, the packet is not outputted to outside the chip, but is transferred to the matching memory unit MM, and such incidence may occur as in the case (A) at operation (2). It is the same anyway in the processing after the matching memory unit MM.

(7) The packet passing through the input block of the return PE (the origin PE of memory access requesting) through the routing network interprets that this packet is a monadic operation packet because the combination of the selection code is PAIR=1, L/$\overline{R}$=1, and passing through matching memory unit MM by NOP, it is transferred to the data memory unit DM.

(8) In the data memory unit DM, when the combination of selection code is PE=1, PM_Thru=0, the packet is passed by NOP.

(9) The operation unit FALU does not process the data because the operation code is data memory unit DM instruction. In the program memory unit PM, after usual tag updating, the instruction of the next node of the flow graph is read out.

[4] Vector Operation is Explained Hereinafter.

Supposing to perform vector operation $(a_i+b_i)c_i$ (where i=1 to 126)

in the following two steps of vector operation process.

[First Vector Operation]

By the read address generator RAG, the first operand ($a_i$) stored preliminarily in bank #2, and the second operand ($b_i$) stored preliminarily in bank #3 are read out continuously. By the write address generator WAG, the result ($a_i+b_i$) generated by the read address generator RAG and operated in the operation unit FALU is stored in the bank #4. At the same time, the data ($c_i$) is transferred by DMA from the external memory to the bank #5.

[Second Vector Operation]

After processing of the vector operation, the banks #4 ($a_i+b_i$), #5 ($c_i$) are allocated to the read address generator RAG, and bank #1 (in which final result is stored) to the write address generator WAG, and the read address generator RAG continuously generates operand pair [($a_i+b_i$), $c_i$], and the vector operation "$(a_i+b_i)\times c_i$" is executed in the operation unit FALU, and the result "$(a_i+h_i)\times c_i$" is stored in bank #1 by the write address generator WAG, thereby completing the above vector operation.

Figure 69:
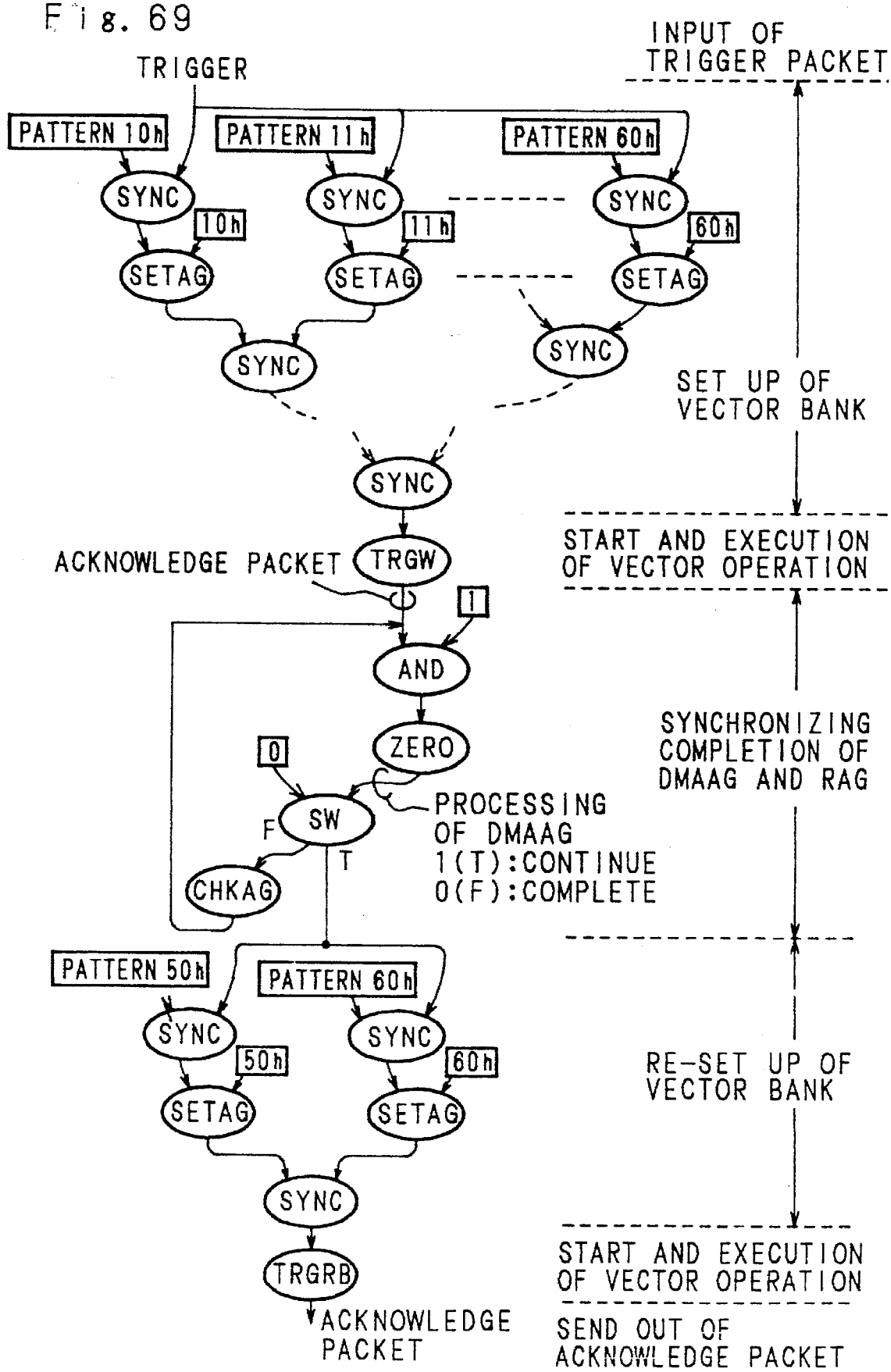
FIG. 69 is a schematic diagram of data flow graph for explaining the vector operation in the embodiment

This process is shown in the data flow graph in FIG. 69.

This data flow graph is started by the input of "trigger packet".

This process consists of (1) setup for first vector operation, (2) execution of vector operation, (3) detection of completion of vector operation, (4) setup for second vector operation, (5) execution of vector operation, and (6) send out of acknowledge packet.

Each step is described in detail below.

(1) Setup of Vector Bank

By SETAG instruction, setup of each address generator, and making relation of address generator and memory bank are executed. In pattern (1), 10h and others denote constants preset in the program memory unit PM (for details see the first paragraph). The trigger packet is copied by the number of SETAG instructions as required, and the bit pattern set by SYNC node (pattern (1) or the like in the diagram) is taken out of the program memory as the constant, and stored in the left data (*). Furthermore, the register address (10 h etc.) is taken out of the program memory unit PM as the constant, and stored in the right data, and SETAG instruction is executed (the argument of the SETAG instruction is the bit pattern to be set in the left data, and is the register address to the right data). (The content to be set is described below.)

The SETAG instruction is executed by the normal address generator NAG in FIG. 41, and writing of data to the each address generators, SW circuit and registers in the memory bank is controlled through control line.

(*) Essentially, when using the constants in the program memory, the constant value is stored in the right data, but by setting the combination of the selection code to PAIR=1, L/$\overline{R}$=0, the matching memory unit MM has the function of replacing the right data and left data. It is here assumed to use this function. Therefore, by SYNC node, the constant (pattern (1) or the like) is inputted as the left data.

(2) Execution of Vector Operation

By synchronizing all result packet of SETAG instruction (the values are meaningless) by SYNC node, that is, by assuring that all necessary SETAG instructions are executed, both the read address generator RAG and DMA address generator DMAAG are triggered by TRGW instruction to start vector operation. The read address generator RAG receives a trigger instruction issued by the normal address generator NAG, and generates addresses continuously. The address acts on the memory bank intended through SW circuit, and the data is read out, and it is further transmitted to the read address generator RAG through SW circuit again, and is stored in the right and left data fields of the packet. The tag portion (operation code, etc.) stores the content preset by SETAG instruction. The packet outputted from the read address generator RAG contains the selection code C1 (VECTOR INSTR). By this bit, the blocks except operation unit FALU process nothing on this vector operation packet. The packet returning to the data memory unit DM is branched off to the write address generator WAG because C1 is set in the branch unit, and the result is stored.

(3) Detection of Completion of Vector Operation

The read address generator RAG delivers an acknowledge packet when data reading of specified number of times is over. In this packet, the running state of each address generator is stored. (The state of the DMA address generator DMAAG is stored in the least significant bit of the left data.) To check in the case where the DMA address generator DMAAG has finished data transfer or not, the least significant bit of the acknowledge packet is tested by AND operation, and when not finished (the AND operation result is not "0"), the state of the DMA address generator DMAAG is checked again by CHKAG instruction, and the operation is looped till the end of DMA transfer. When the data transfer of the DMA address generator DMAAG is over, the second vector operation is set up. Meanwhile, the instruction "zero" outputs "T" (true) when the input data is "0", and "F" (false) otherwise.

(4) Setup of Second Vector Operation

Same as in (1), set up is executed by SETAG instruction. Here, the address generator sets only the register specifying the relation of the bank memory and address generator because the same addressing mode is executed.

(5) Execution of Vector Operation

Same as in (2), by synchronizing all result packets of SETAG instruction (the values are meaningless) by SYNC node, that is, assuring that all necessary SETAG instructions are executed, the read address generator RAG is triggered by TRGRB instruction to start vector operation.

(6) Sendout of Acknowledge Packet

After completion of the specified number of times of data reading, the read address generator RAG outputs an acknowledge packet. According to the destination node # of this packet, the packet indicating the completion of vector operation is outputted to the requesting side of vector operation. As the destination node number of acknowledge packet, meanwhile, the destination node number of the packet having the instruction for starting vector operation such as TRGRB is set.

[5] Explained below is the exclusive execution of the shared function "i" by test and set instruction.

It is one of the features of the data flow microprocessor that the shared function can be called and executed parallel simultaneously from plural positions in the program, by sharing the functions called plural times in order to compress the code size of the program and providing the data with color identification numbers.

However, when writing memory into the shared function, in order to assure the order of writing and reading, it is sometimes necessary to prohibit simultaneous execution and to execute exclusively. This is generally required in the process accompanied by history, and for example after checking the directory of the magnetic disk storage to make sure there is a vacant area, when writing the data given as argument in the vacant area of the disk, it is required in such a function to limit the number of functions called simultaneously to only one in order to assure the integrity of the processing. In other words, exclusive execution of function is needed.

Figure 70:
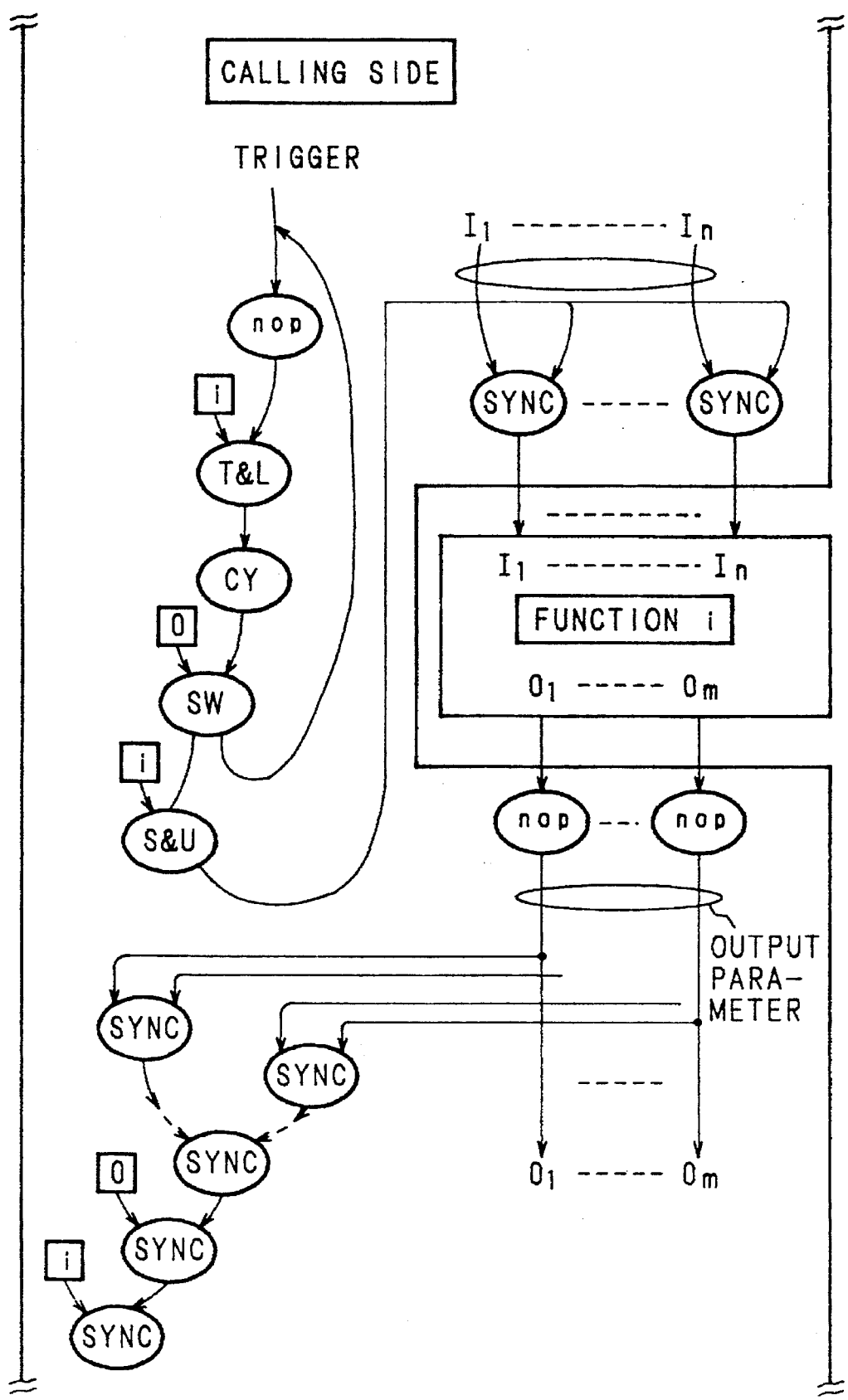
FIG. 70 is a schematic diagram of data flow graph for explaining the exclusive execution of function by test and set instruction in the embodiment.
Figure 74:
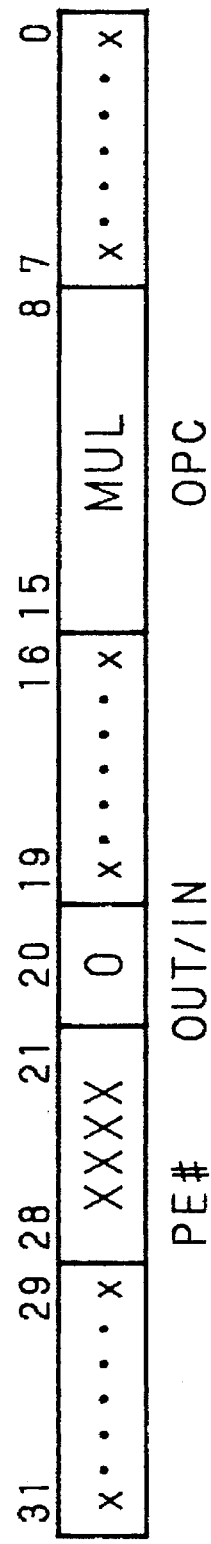
FIG. 74 is a schematic diagram showing the content set by SETAG instruction in the embodiment.

FIG. 70 is a data flow graph showing the program for exclusively executing the shared function "i". Meaning of each instruction is as follows.

nop: Instruction without data operation; one-input instruction.

SYNC: Two-input nop instruction. This is an instruction for synchronizing by detecting entry of two inputs, and the left input is stored in the left data field of packet, and the right input into the right data input, and outputted. Usually, the right data of the output packet is meaningless.

T&L: Test and lock instruction. When the content of the address of the data memory indicated by the value of the left input is "1" or when the value of the lock flag of data memory is 1, the carry flag of the packet is changed to "1". When the content of the data memory address indicated by the value of the left input is "0", the carry flag of the packet is set to "0", and the lock flag of the data memory is set to "1".

CY: The instruction for setting the value of left data to "1" when the carry flag is "1".

SW: The instruction for delivering the data to the right side arc when the right input is "1", and delivering the data to the left side arc when the right input is "0".

S&U: Set and unlock instruction. The content of the data memory indicated by the value of the left input is changed to "1", and the lock flag of the data memory is set to "0".

DMW: The instruction for writing the value of the right data input to the memory address indicated by the left data input.

From the calling side, the input argument and the trigger packet are sent out. The trigger packet executes the T&L instruction accompanied by the constant "i" corresponding to the function "i" by way of nop instruction.

When the result data of reading the address "i" of the data memory is "0", the lock flag is set to "1" so that execution of other T&L instruction may be unsuccessful, while the carry flag of the packet is set to "0" to tell that this T&L instruction is successful. In case the content of address "i" is "1" or the lock flag of the data memory is "1", this T&L instruction is unsuccessful, and the carry flag is "1".

The output of the T&L instruction node is checked by CY instruction node, and the value of the left data of the output packet of the CY instruction node becomes "0" or "1" depending on whether the carry flag is "0" or "1". In the SW instruction node, depending on the right data input, that is, whether the value of the left data of the output packet of the CY instruction node is "0" to "1", the packet is outputted onto the left output arc when "0", or onto the right output arc when "1". When the execution of T&L instructions unsuccessful, to execute T&L instruction again, the packet is sent to the nop node in which the trigger packet is inputted to the first place. On the contrary, when the T&L instruction is executed successfully, the packet is sent to the S&U instruction node, and the content of the address i of the data memory is changed to "1", and the lock flag of the data memory is cleared to "0".

After execution of S&U instruction, the input arguments $I_l$ to $I_n$ are transferred to the function "i" via the sync instruction node.

When execution of function "i" is over, the output arguments $O_l$ to $O_n$ are transferred to the calling side as a result of execution of function. The output argument after passing through the hop node is used at the calling side for next processing, and the output is synchronized at the sync node, and it is detected that all outputs are sent out. Finally, the packet having "0" as the left data is inputted to the DMW instruction node. The DMW instruction writes "0" in the address "i" of the data memory, and returns the other T&L instructions on address "i" (function "i") to a state so as to be successful.

In this way the exclusive execution of function is realized.

The hardware configuration, the flow chart showing the above processing, and method of realizing the test and set instruction are described in detail in the preceding application ("Microprocessor" filed Jan. 9, 1991).

The contents to be set by SETAG instruction are shown for reference in FIG. 71 to FIG. 74.

In the foregoing embodiments; the internal data memory having multiport function is realized by a memory of multi-bank configuration, but it is not limitative, and simultaneous parallel access of memory can be also realized, needless to say, by using a so-called multiport memory having plural bit lines and corresponding plural address decoders.

The connection of function blocks in the configuration of the data flow microprocessor explained herein is a mere example, and it is not limitative. For example, the operation unit FALU and the program memory unit PM are arranged parallel, but it is intended to shorten the delay time of execution of instruction, and these two function blocks may be also connected in cascade, and the operation processing and program reading may be executed sequentially in this order. When thus connected, meanwhile, the copy function of the operation result data is realized in the program memory unit PM, so that the copy unit KCOPY is not needed.

The number of address generators and memory banks shown in the foregoing embodiments is not fixed, but when desired to further enhance the performance by simultaneous multiplex DMA transfer, for example, the number of address generators, memory banks and external memory ports may be increased. Or for high speed vector operation, at least three address generators and three memory banks are indispensable.

The pipeline configuration of the data memory exhibited herein is not fixed, too, but the number of stages of pipeline for address generation is, for example, variable with the bit width of address or content of the function of the addressing mode (whether the bit inverting process of an arbitrary number of bits is included or not).

For the sake of simplicity of explanation of the above embodiments, the color and generation number identifiers for packets are omitted, but by using these identifiers, the dynamic data driving system may be realized, same as in the ordinary data flow computer.

Thus, according to the invention, the operation unit and program memory unit are disposed parallel, and the information updated in the operation unit and program memory unit is sent to the input/output interface unit, while the data memory unit capable of reading and writing data simultaneously, parallel and continuously is installed before the operation unit so as to read out the operand data from the matching memory unit continuously to the data memory unit and to send into the operation unit together with the preset instruction code to execute vector operation, and therefore reading of two sets of operand data for vector operation, writing of operation result data, and ordinary memory access processing can be done in a short access time, and simultaneously and parallel, so that an extremely high vector operation performance may be achieved.

Furthermore, by taking the data memory unit into the cyclic pipeline and installing in a stage before the operation unit, reading of data and execution of operation can be completed in one circulation of the cyclic pipeline, which enables an efficient program execution.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds thereof are therefore intended to be embraced by the claims.

What is claimed is:

1. A microprocessor, which executes a test and set instruction with a predetermined address, the execution of said test and set instruction resulting in at least first and second operations wherein other operations can be executed between said first and second operations, said first operation for selectively locking an addressing type memory, and a second operation for rewriting the content of said address of said memory and unlocking said memory, comprising:

means for storing first information or second information in the case where said memory is under unlock state or lock state respectively;

detecting means for detecting whether the value of data stored in said predetermined address of said memory is a first value or a second value;

means for writing said first information or said second information into said means for storing; and control means for controlling so as to write predetermined data into said predetermined address of said memory;

wherein, by executing a first instruction, said first instruction including said predetermined address, said means for writing writes said second information into said means for storing, only in the case where (a) the value of data stored in said address is detected as said first value by said detecting means and (b) said means for storing stores said first information;

wherein, by executing a second instruction, said second instruction including said predetermined address, said test and set instruction is executed by setting the value of data stored in said address to said second value by said control means, and by writing said first information into said means for storing; and wherein, by executing a write instruction, said write instruction including said predetermined address and write data, the value of data stored in said address is returned to said first value by writing said data in said address of said memory by said control means.

2. A data flow microprocessor, which executes a test and set instruction with a predetermined address, the execution of said test and set instruction resulting in at least first and second operations wherein other operations can be executed between said first and second operations, said first operation for selectively locking an addressing type memory, said second operation for rewriting the content of said address of said memory and unlocking said memory, comprising:

means for storing first information or second information in the case where said memory is under unlock state or lock state respectively;

detecting means for detecting whether the value of data stored in said predetermined address of said memory is a first value or a second value;

means for writing said first state or said second state into said means for storing; and control means for controlling so as to write predetermined data into said predetermined address of said memory;

wherein, by executing a first instruction, said first instruction including said predetermined address, said means for writing writes said second information into said means for storing, only in the case where (a) the value of data stored in said address is detected as said first value by said detecting means and (b) said means for storing stores; said first information wherein, by executing a second instruction, said second instruction including said predetermined address, said test and set instruction is executed by setting the value of data stored in said address to said second value by said control means, and by writing said first information into said means for storing; and wherein, by executing a write instruction said write instruction including said predetermined address and write data, the value of data stored in said address is returned to said first value by writing said data in said address of said memory by said control means.

3. A method for operating a computer, said computer having an input/output interface, an operation unit, a program memory unit, and a data memory unit, the method comprising:

receiving a plurality of data in said input/output interface, each of said data having an operand including a destination node number, an instruction code, and a tag;

detecting when a first data and a second data include destination node numbers which are equal;

generating a pair of said operands;

receiving, in said operation unit, said pair of operands, said operation unit operating on said operands based on said instruction code to produce a result, said result transferred to said input/output interface;

operating, in said program memory unit, on said pair of operands simultaneously with said step of receiving in said operation unit, said step of operating including addressing a data flow graph using said destination node number attached to said pair of operands;

updating said destination node number and said instruction code based on said data stored in said data flow graph; and determining whether said updated instruction code is a predetermined instruction, wherein said operands or pairs of operands previously stored in a data memory unit are read out and transferred to said operation unit along with said previously set instruction code;

wherein said operands and pairs of operands are generated out of sequential order.

* * * * *